Aug. 5, 1958    A. H. DICKINSON    2,846,008
CARD PUNCHING MACHINE
Filed Dec. 31, 1954    42 Sheets-Sheet 1

INVENTOR.
ARTHUR H. DICKINSON
BY
Joseph B. Taphorn
ATTORNEY

Aug. 5, 1958     A. H. DICKINSON     2,846,008
CARD PUNCHING MACHINE

Filed Dec. 31, 1954     42 Sheets-Sheet 2

INVENTOR.
ARTHUR H. DICKINSON
BY Joseph B. Taphorn
ATTORNEY

Aug. 5, 1958

A. H. DICKINSON 2,846,008

CARD PUNCHING MACHINE

Filed Dec. 31, 1954

INVENTOR.
ARTHUR H. DICKINSON

BY
Joseph B. Taphorn
ATTORNEY

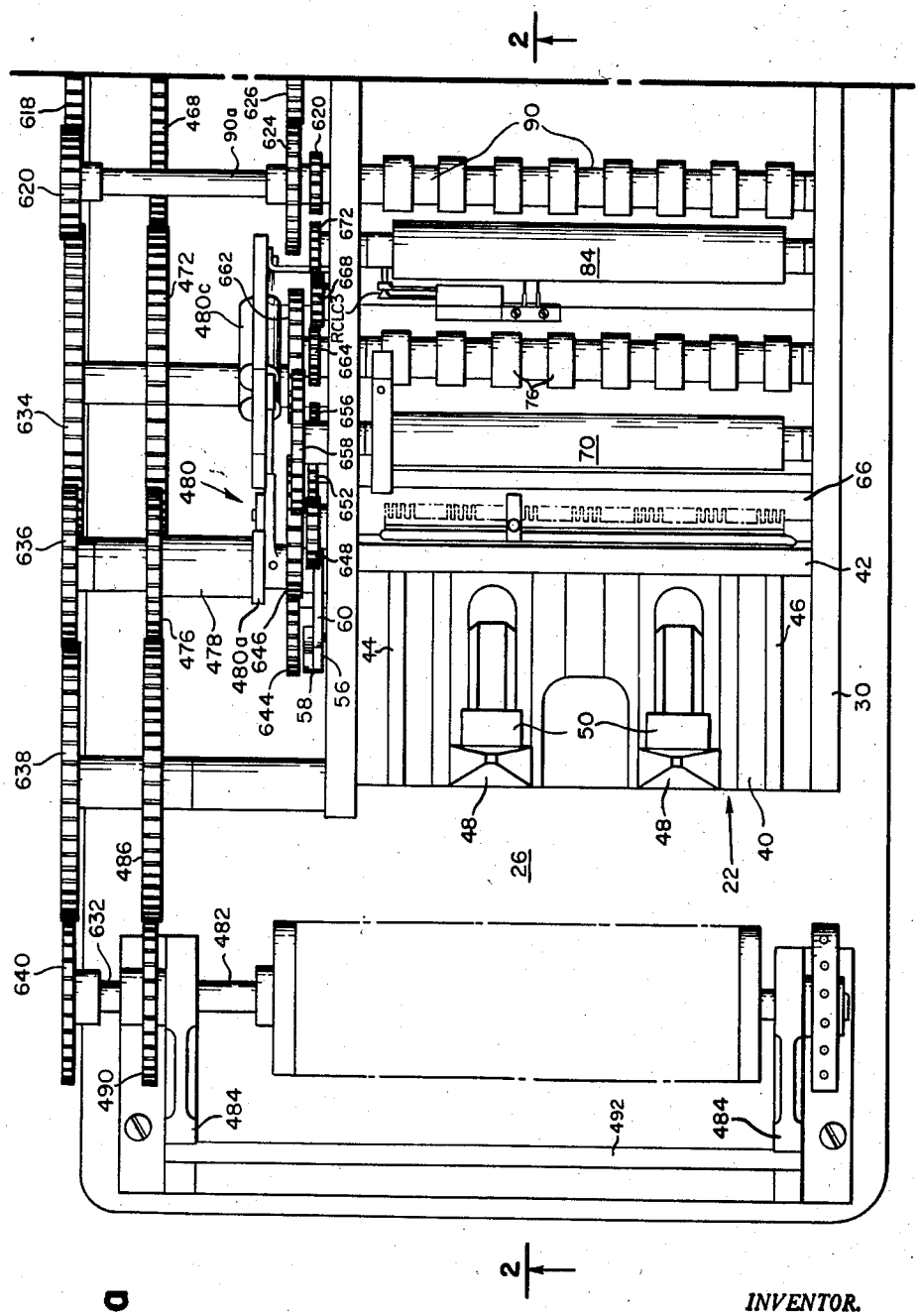

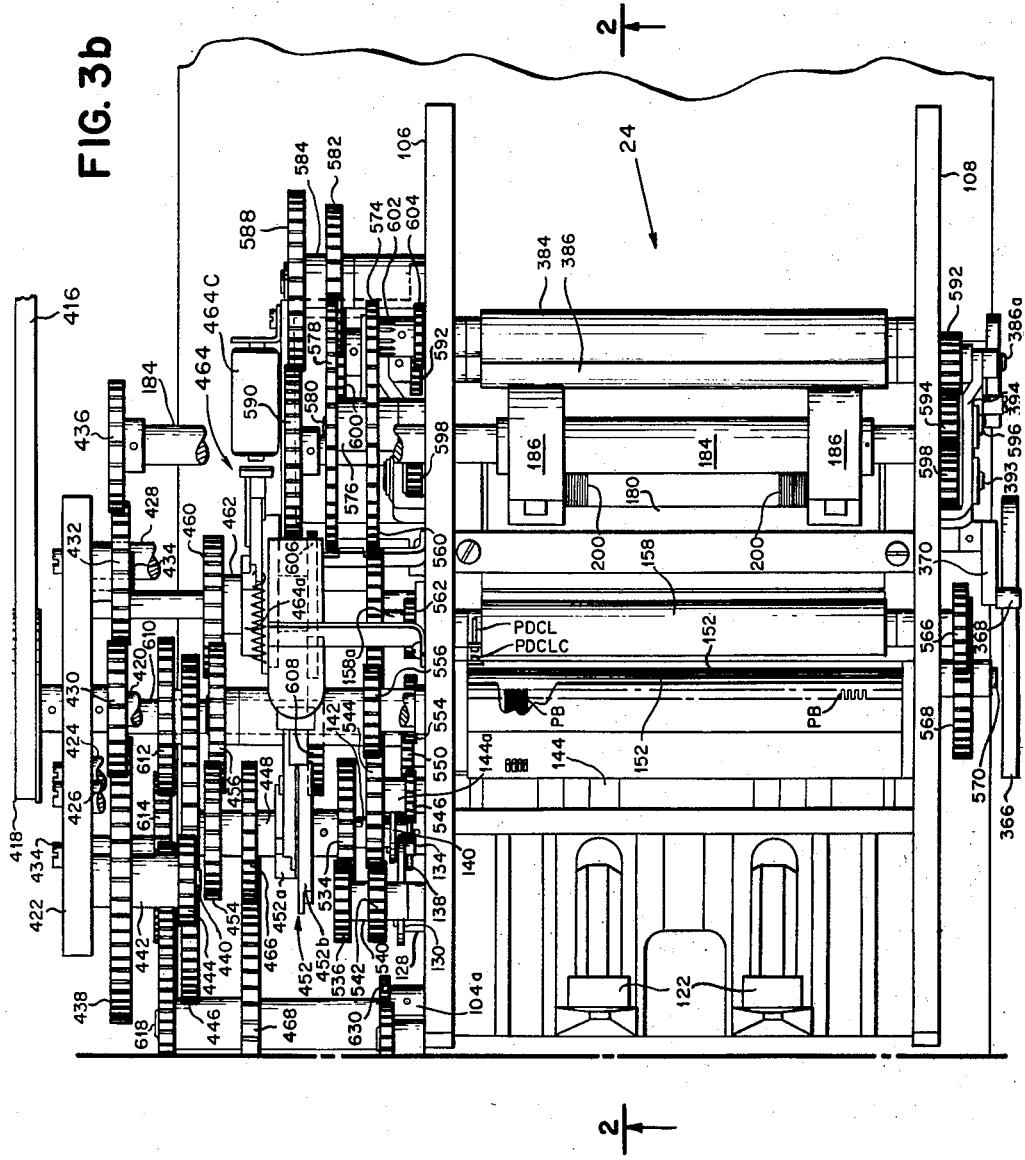

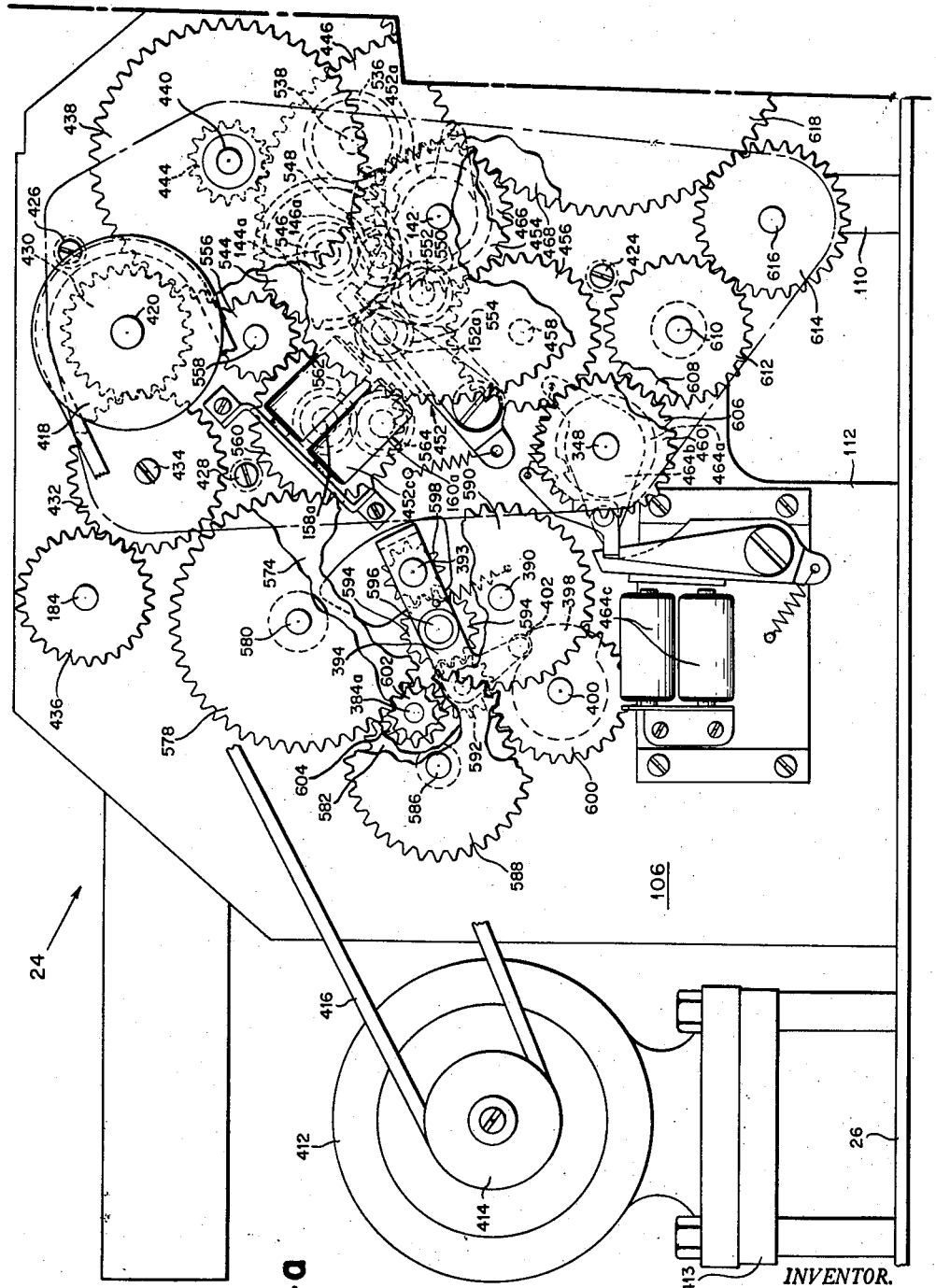

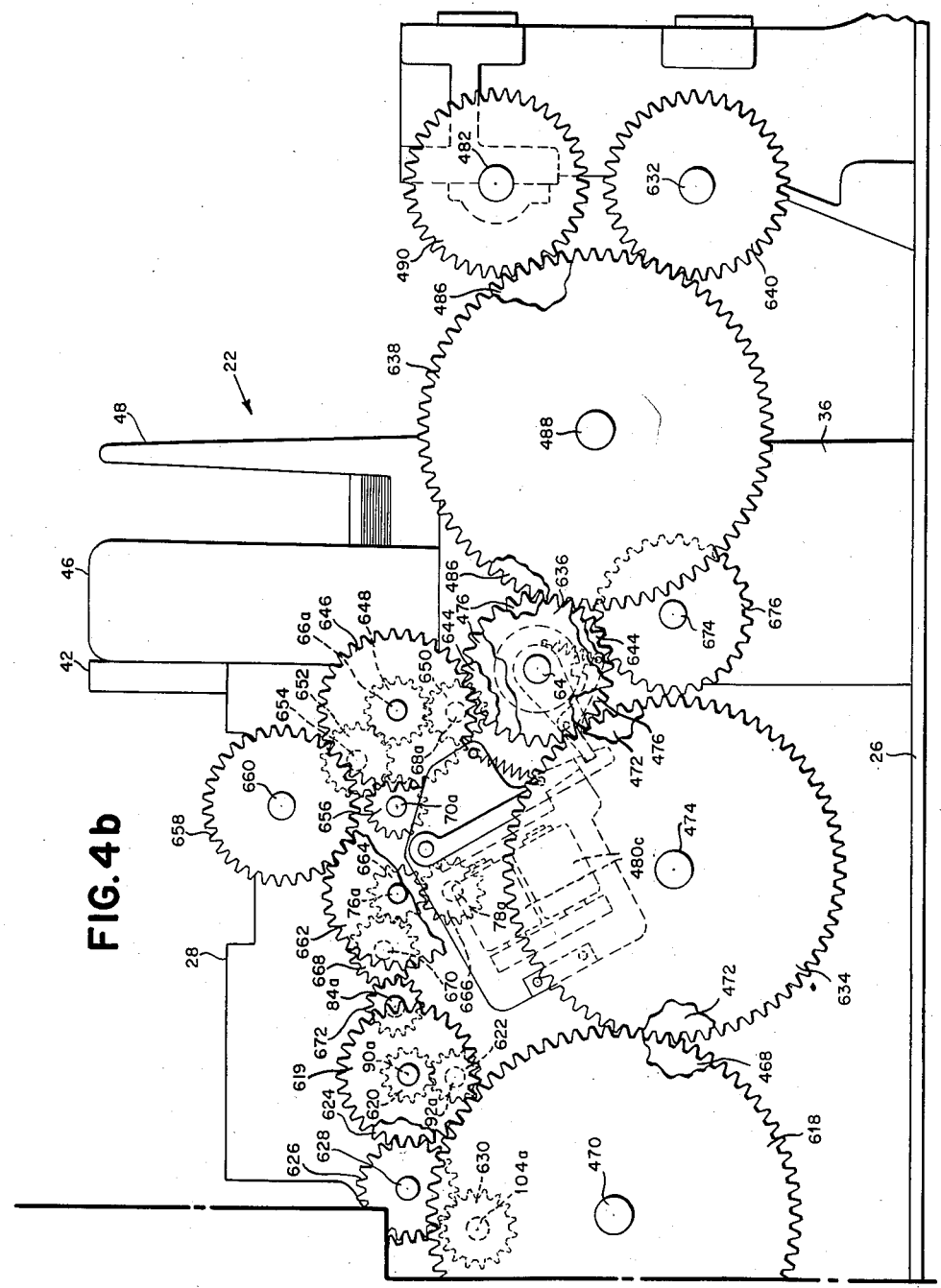

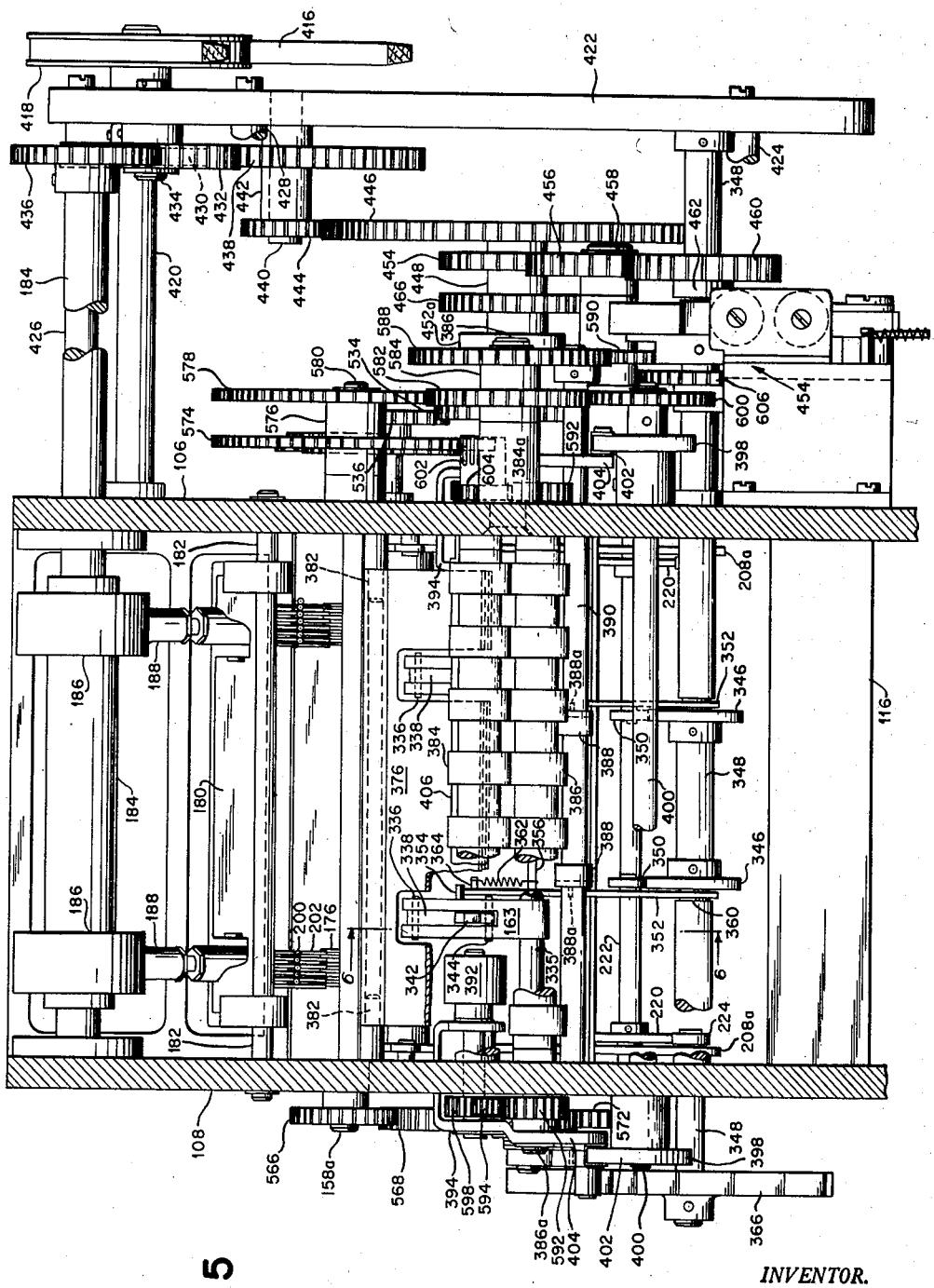

Aug. 5, 1958  A. H. DICKINSON  2,846,008
CARD PUNCHING MACHINE
Filed Dec. 31, 1954  42 Sheets-Sheet 9

INVENTOR.
ARTHUR H. DICKINSON
BY
Joseph B. Taphorn
ATTORNEY

Aug. 5, 1958

A. H. DICKINSON 2,846,008

CARD PUNCHING MACHINE

Filed Dec. 31, 1954

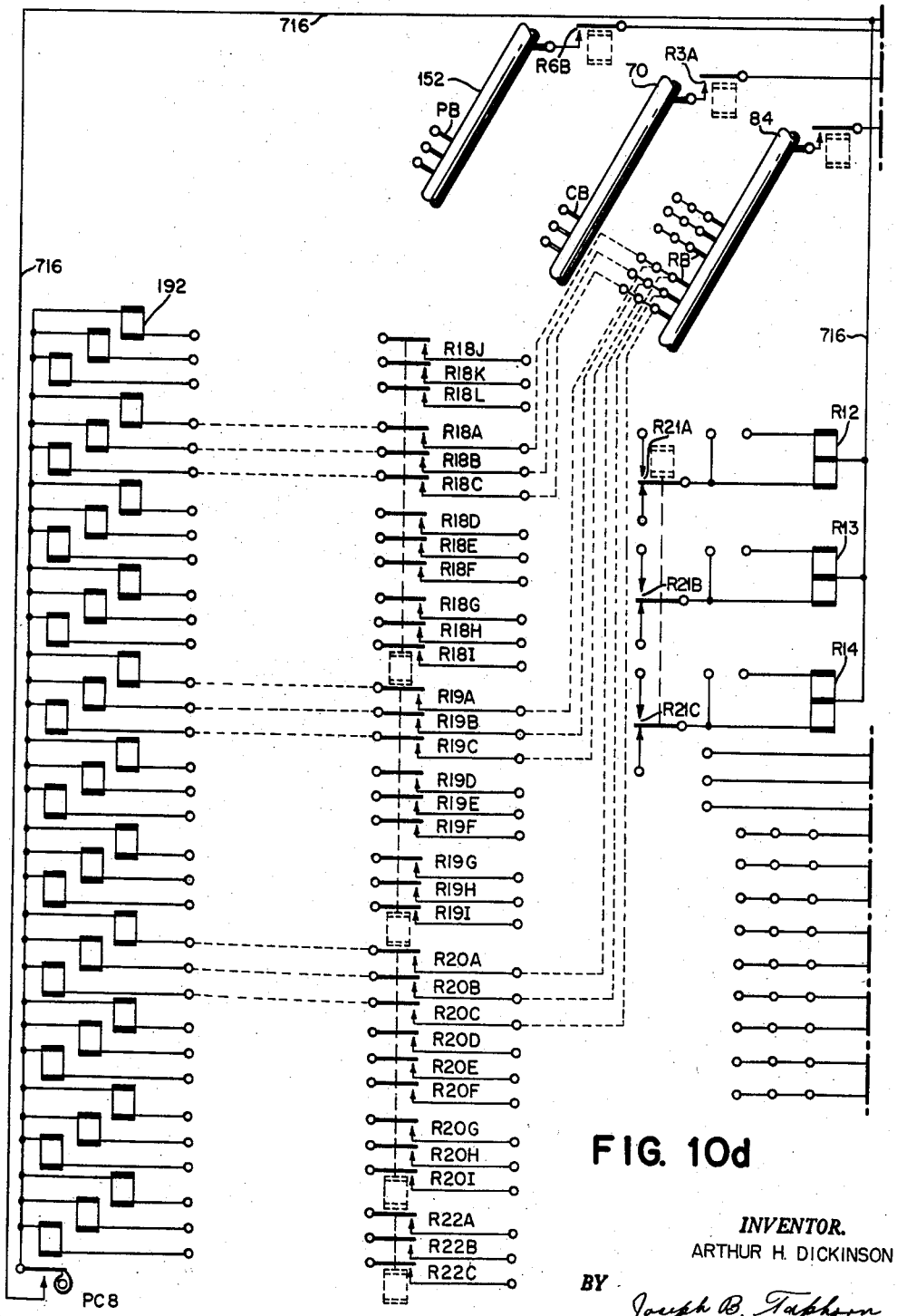

Aug. 5, 1958

A. H. DICKINSON 2,846,008

CARD PUNCHING MACHINE

Filed Dec. 31, 1954

Aug. 5, 1958   A. H. DICKINSON   2,846,008
CARD PUNCHING MACHINE
Filed Dec. 31, 1954   42 Sheets-Sheet 18

INVENTOR.
ARTHUR H. DICKINSON
BY Joseph B. Taphorn
ATTORNEY

Aug. 5, 1958  A. H. DICKINSON  2,846,008
CARD PUNCHING MACHINE
Filed Dec. 31, 1954  42 Sheets-Sheet 20

INVENTOR.
ARTHUR H. DICKINSON
BY
ATTORNEY

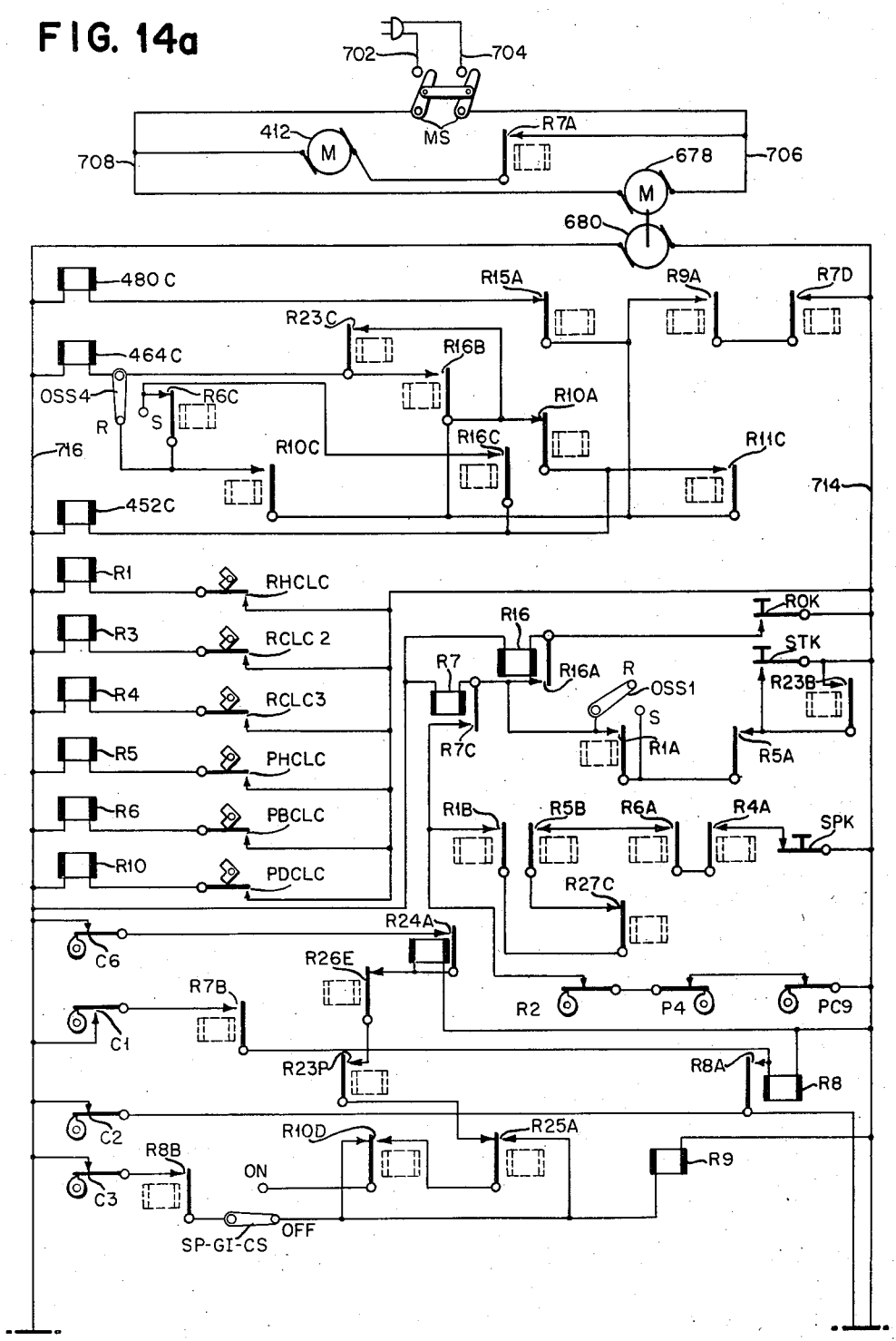

Aug. 5, 1958     A. H. DICKINSON     2,846,008
CARD PUNCHING MACHINE

Filed Dec. 31, 1954                                                     42 Sheets—Sheet 27

Aug. 5, 1958

A. H. DICKINSON 2,846,008

CARD PUNCHING MACHINE

Filed Dec. 31, 1954

A. H. DICKINSON 2,846,008

CARD PUNCHING MACHINE

Filed Dec. 31, 1954

INVENTOR.
ARTHUR H. DICKINSON

ATTORNEY

Aug. 5, 1958  A. H. DICKINSON  2,846,008
CARD PUNCHING MACHINE
Filed Dec. 31, 1954  42 Sheets-Sheet 42

INVENTOR.
ARTHUR H. DICKINSON
BY
Joseph B. Taphorn
ATTORNEY

United States Patent Office 2,846,008
Patented Aug. 5, 1958

2,846,008

CARD PUNCHING MACHINE

Arthur H. Dickinson, Greenwich, Conn., assignor to International Business Machines Corporation, New York, N. Y., a corporation of New York Application December 31, 1954, Serial No. 479,198

49 Claims. (Cl. 164—115)

This invention relates to data recording machines and more particularly to card punching machines for recording characters in code in various columns as perforations at different index point positions.

Conventionally, punching machines are provided with only one row of punches and a cooperating common die for purposes of economy and ease of construction. Such arrangement requires that cards be advanced past the die step by step—if the number of punches is equal to the number of index point positions per column, the cards are fed column by column; if the number of punches is equal to the number of columns, the cards are fed row by row with corresponding index point positions in each column being presented for simultaneously punching. In machines of the latter type, it may be observed, to insure the recording of every character of the data being recorded, a card must be advanced completely past the die, so that all index point positions will be presented for punching Heretofore, a card that was moved past the die would be automatically sent on to the stacker; it could not be recorded upon a second time without removing it from the stacker, clearing the cards that had been following it out of the machine, and then sending it through the machine again.

It often occurs that the data desired to be punched on a card can only be serially obtained. Thus it may be desired to record on one card data existing on several record cards which must be successively sensed. Or it may be desired to record on one card successive totals produced by an accounting machine. Formerly, it was necessary to provide an array of storage devices to hold the serially presented data until the card was advanced past the die. Such an array is not only expensive in installation and maintenance but also requires much space in a machine.

Accordingly, it is an object of this invention to provide an inexpensive way in which serially presented data can be punched in the same card without stopping the machine. More specifically, it is an object of this invention to provide a machine in which a card can be repeatedly punched in the normal continuous operation of the machine. In other words, it is an object of this invention to provide a machine which can successively punch a card in different groups of columns or fields thereon.

Other objects of this invention are to provide such a machine which can (1) Consolidate on successive cards data contained on successive predetermined numbers of record cards.

(2) Consolidate on successive cards data contained on successive groups of record cards if such record cards bear numbers identfiying the group to which they belong.

(3) Punch on the consolidation cards mentioned in the immediately preceding object the identification number of the groups of record cards from which the data was obtained.

(4) Consolidate data, obtained from successive groups of record cards bearing numbers identifying the group to which they belong, on corresponding ones of successive cards bearing the group identifying numbers.

(5) Consolidate on each of successive cards a predetermined number of successive totals obtained by an accounting machine.

(6) Consolidate on each of successive cards a group of related total successively obtained by an accounting machine;

(7) An, in addition, punch on each consolidation card the total of the group of related totals punched therein;

(8) And further, punch in each consolidation card the identification number of the group.

(9) Consolidate groups of related totals successively obtained by an accounting machine on corresponding ones of successive cards bearing the group identifying numbers.

A further object of the invention is to provide a universal machine which can effect all of the above mentioned objects in addition to straight reproducing and summary punching operations.

According to the invention there is provided a punching machine wherein successive cards are moved past a row of punches for concomitant perforation in one or more groups, columns, or fields therein. If additional data is to be punched in a card moved past the die, it is returned to thereafter undergo another punching operation. The following card is not fed to the die until the punching of the card at the die has been completed. Repeat punching of a card may be continued as long as the physical limits of the card and of the machine are observed. In a standard IBM card, for example, there are eighty columns, and thus a card could conceivably be punched eighty times; seventy-nine punchings would be repeats. On the other hand, in accounting practice each punching would probably utilize several columns; furthermore, the requirements as to the number of punchings would be much less, so that a machine which provides for only nine or ten repeat punchings would perhaps be more than sufficient. In the machine disclosed in the drawings, however, provision has been made for only three punching operations per card, as this number is sufficient to disclose the principles of the apparatus.

When a card is not to be repunched, it is ejected into a stacker. If the apparatus "knows" at the start of a punching cycle that this is the last time the instant card at the die is to be punched, the card is not returned and instead goes directly to the stacker. If the signal indicative of the fact that the last punching for the instant card at the die is in progress is received during the cycle, the card is nevertheless returned. A special non-punching cycle must be undergone thereafter to eject the punched card. Simultaneously with the feeding of the old card to the stacker, whether during a punching cycle or a special non-punching cycle, a new card is fed to the die. It will be evident that the machine can in an expeditious and efficient manner consolidate on a relatively small number of cards enormous amounts of successively available data without requiring the use of an extensive array of data storage devices.

In operating the punching machine, it is cycled with the machine successively presenting the data. In one embodiment the punching machine (hereinafter also referred to as the punch unit) is operated in conjunction with a card reading machine (hereinafter also referred to as the read unit). The two units are cycled together so that a record card passes read brushes in the read unit at the same time that a consolidation card passes the die in the punch unit. Thus, perforations representing data punched in certain columns of the record card may be transcribed into preselected columns of the consolidation card through electrical interconnections controlling the respective punches. If data from a predetermined number of record cards is to be punched into different groups of columns or fields of each consolidation card, a dial switch is set to that number. The consolidation card will then be punched in that number of different fields, and as the last field is being punched, the next consolidation card will be advanced to the die. Instead of being returned, as is usual when there is to be a repeat punching, the consolidation card this time is ejected into the stacker. This type of operation is the subject matter of Example No. 1.

Instead of punching data from predetermined numbers of cards, it may be desired to punch corresponding data from groups of related cards. If such cards may bear a number indicative of their common association, the read unit may be set up to detect a change or break in the number borne by successive record cards. Control brushes are provided ahead of the read brushes in the read unit so that the number of the next card to be transcribed is sensed at the same time that the card at the read brushes is being sensed. Because the control break is detected during the last punching cycle for each consolidation card, it is not ejected at the end of its last punching cycle but again returned to a position in front of the die. However, the control break signals cause the punch unit to now undergo a cycle without the read unit and so as to eject the punched card and to advance the next card to the die. Thereafter the read and punch units resume conjoint operation until the next control break is effected. Thus the machine automatically consolidates on respective cards data from groups of related cards. If desired, the machine may also be set up to record the group identification number of the record cards on the respective consolidation cards. A full description of these operations occurs in Example No. 2.

Occasions may also arise in which it is desired to punch additional data from related record card groups onto consolidation cards already bearing numbers identifying the groups. The punch unit and the read unit may be so set up that when the record card groups are placed in the read unit in the same order that consolidation cards are placed in the punch unit, the data on the cards of each group will be transcribed on the consolidation cards corresponding to the group. In other words, the machine will automatically transcribe all of the desired data onto the proper consolidation cards, feeding a new consolidation card to the die whenever the preceding one has been punched a number of times equal to the cards in each group and to which the dial switch has been set. Punch brushes are provided ahead of the die in the punch unit to read the identification number for comparison with the number on the record card simultaneously passing the read unit control brushes and for entry into storage for comparison with the number on subsequent record cards. So long as the numbers on the record card fed past the control brushes agree with the number on the consolidation card, their data will be recorded on that consolidation card. However, should the machine detect a disagreement between the number of a card at the control brushes in the read unit and the consolidation card at the die of the punch unit, the machine will come to a stop and indicate the reason therefor. Example 3 shows this operation.

In another embodiment the punch unit is operated in conjunction with an accounting machine instead of with the card read unit. The two parts are interconnected so that successive totals obtained in the accounting machine may be punched in each of successive consolidation cards. As when the punch unit is operated with the card read unit, the dial switch may be set to predetermine the number of totals which will be punched on each consolidation card. This is the operation of Example 4.

Or the apparatus may be set up so that only totals, belonging to the same group, for example, minor group totals belonging to the same major group, are punched on each consolidation card. In this case, whenever a major group change is detected, the old consolidation card is punched for the last time and a new one fed to the die. Provision may also be made for punching the sum of the minor totals, that is, the major total, when the last minor group total is being punched. Provision may also be made for punching the identifying number of the major group on the consolidation card. These operations are contained in Example 5.

The apparatus may also be used to punch totals on cards already bearing data related to the major group. In such an example, the consolidation cards would bear major group identifying numbers and be arranged in the order that the major groups would be processed by the accounting machine. The apparatus would compare the number of the major group being processed by the accounting machine with the number of the consolidation card fed to the die, and if they are the same, would punch all of the minor group totals into the consolidation card. A break in the major control would effect an ejection, after punching, of the consolidation card to the stacker and the feeding of the next consolidation card to the die. The number on this card would be compared with the number of the new major group being processed in the accounting machine, and if they are the same, the apparatus would continue in the manner described above. If a disagreement should exist, the machine would come to a halt and indicate the reason why. Example 6 shows these operations in detail.

Other objects of the invention will be pointed out in the following description and claims and illustrated in the accompanying drawings, which disclose, by way of examples, the principle of the invention and the best mode which has been contemplated of applying that principle.

In the drawings:

Figure 1 is a diagrammatic side view of a construction in which the invention may be embodied.

Figure 2, when assembled with Figure 2b to the right of Figure 2a, is a longitudinal sectional view taken along the line 2—2 of Figure 3.

Figure 3, when assembled with Figure 3b to the right of Figure 3a, is a plan view of the construction embodying the invention.

Figure 4, when assembled with Figure 4b to the right of Figure 4a, is a left-hand side view of the construction shown in Figures 2 and 3.

Figure 5 is a view taken along the section line 5—5 of Figure 2b.

Figure 10A:
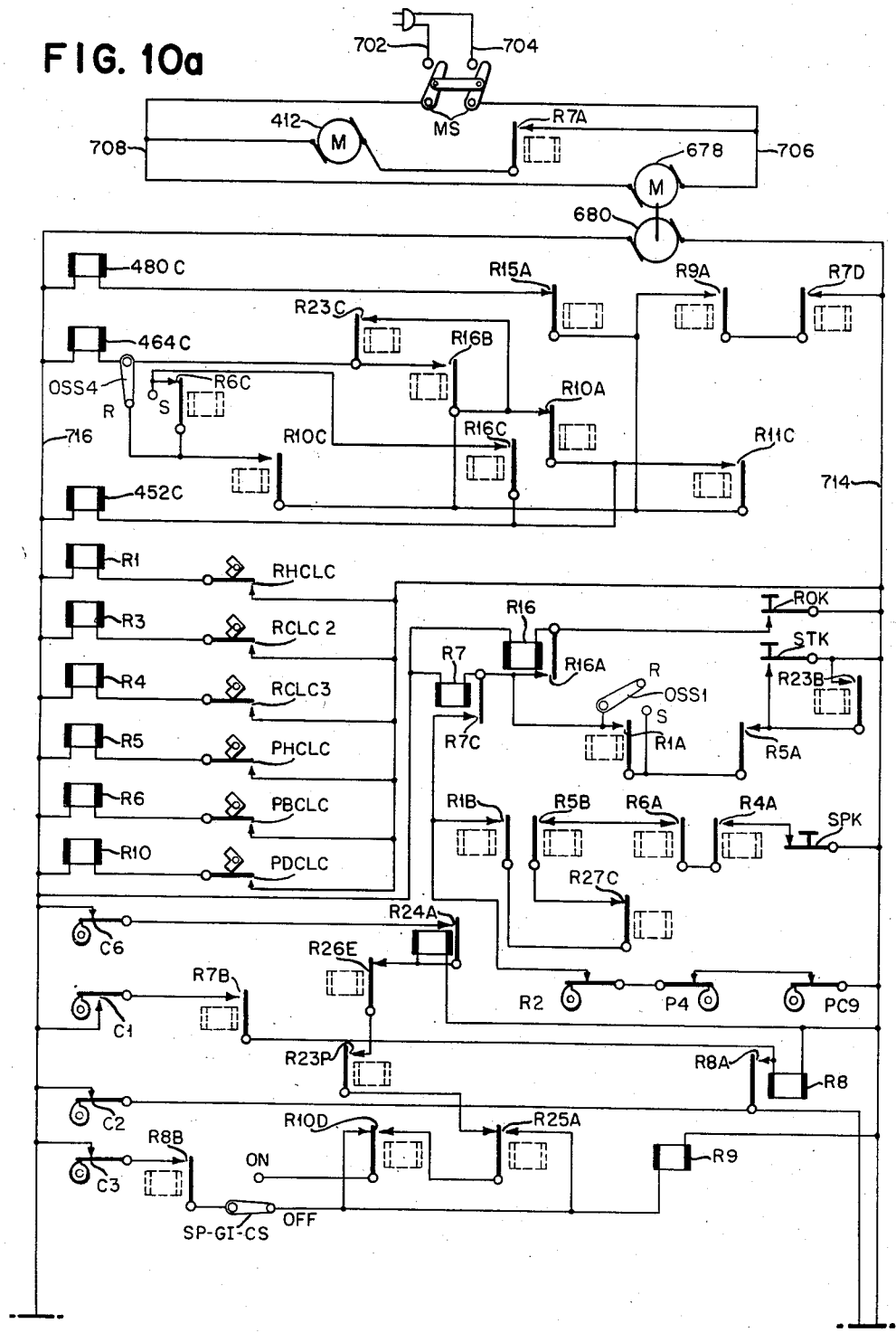
Figure 10B:
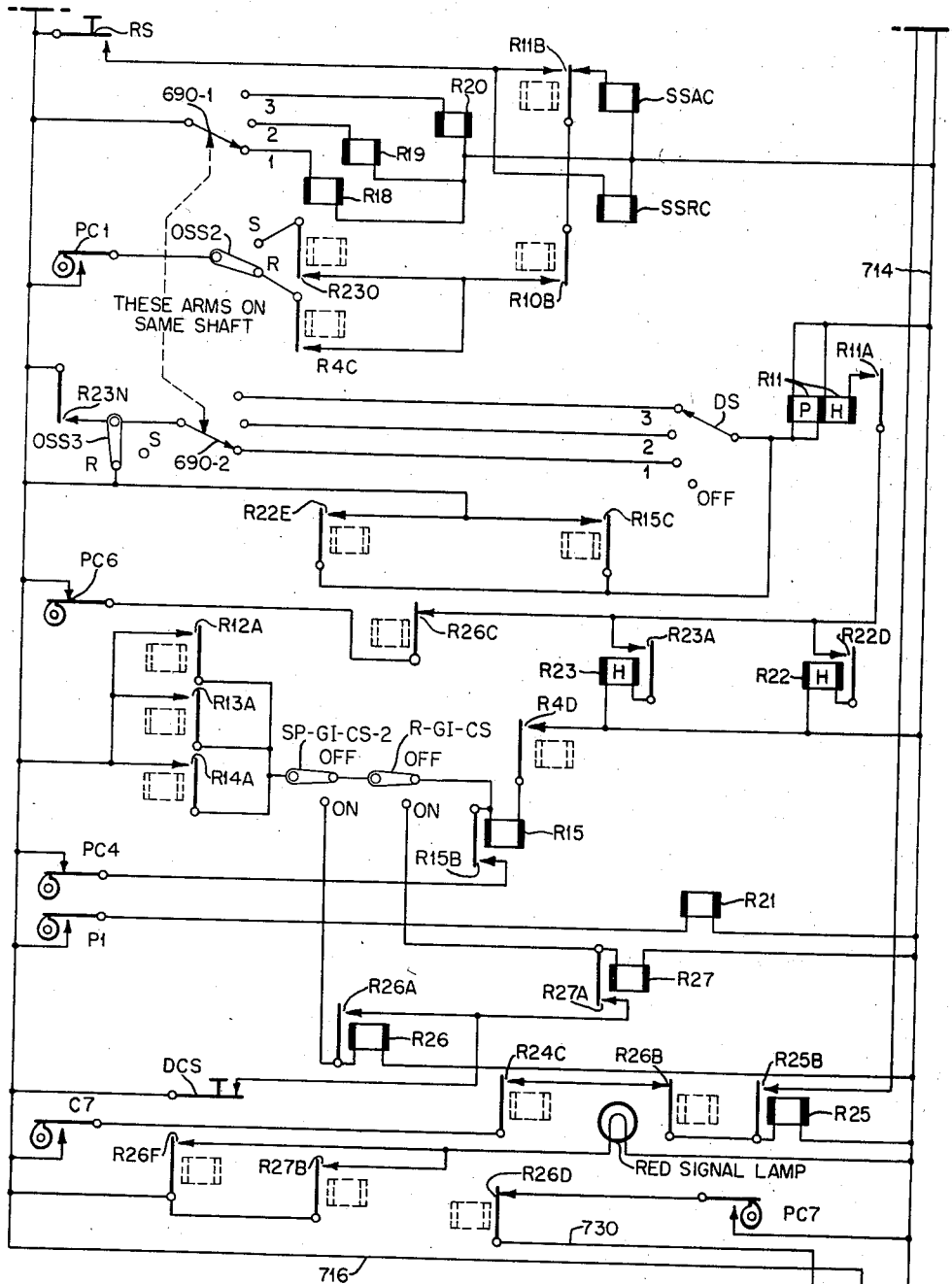
Figure 10C:
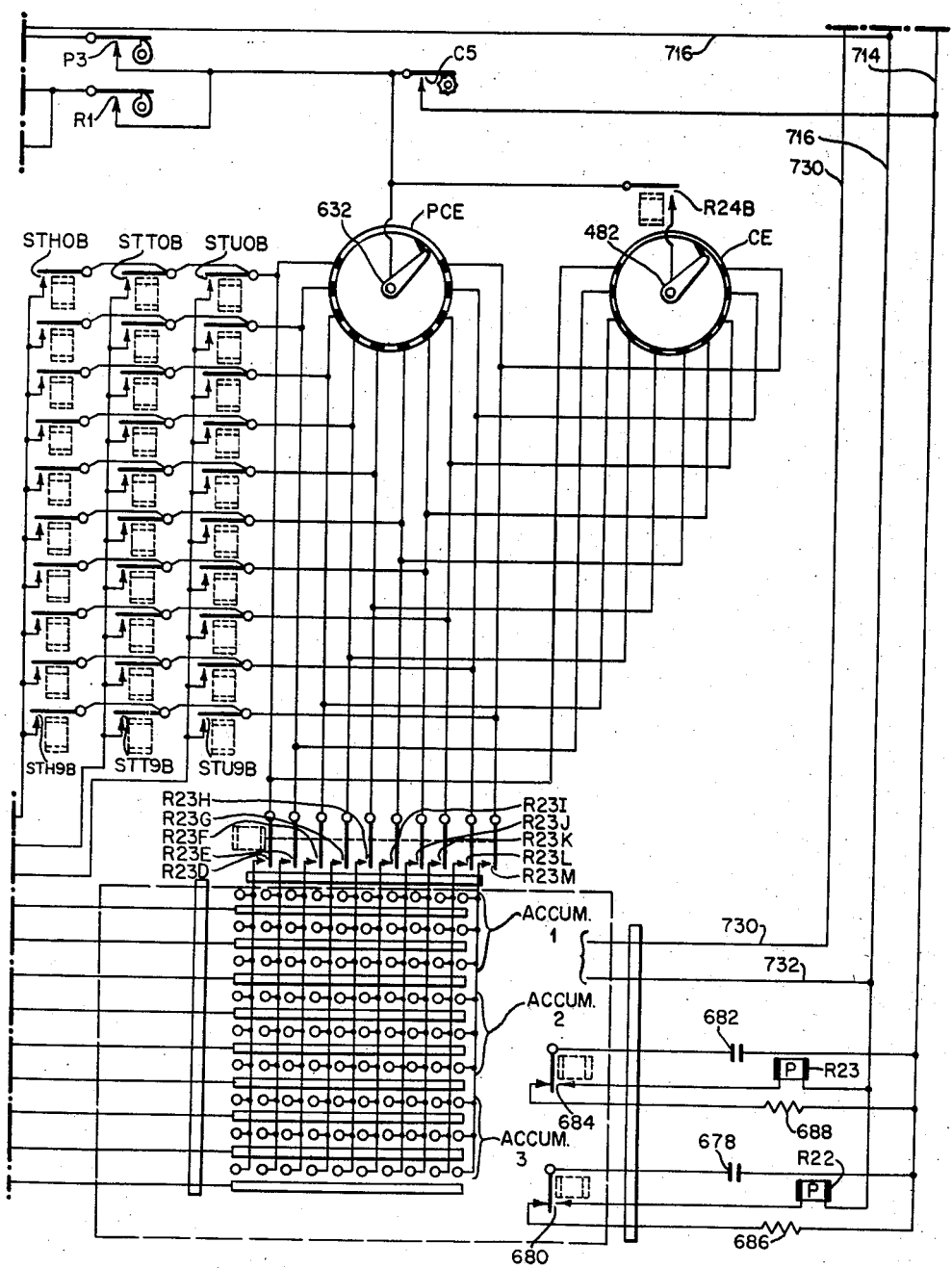

Figure 10 discloses, when arranged with Figs. 10a, 10b, and 10c in descending vertical order and Fig. 10d to the left of Fig. 10c, a schematic diagram of wiring employed when the apparatus is set up to transcribe data from predetermined numbers of successive record cards onto each of successive consolidation cards as in Example 1.

Figure 11:
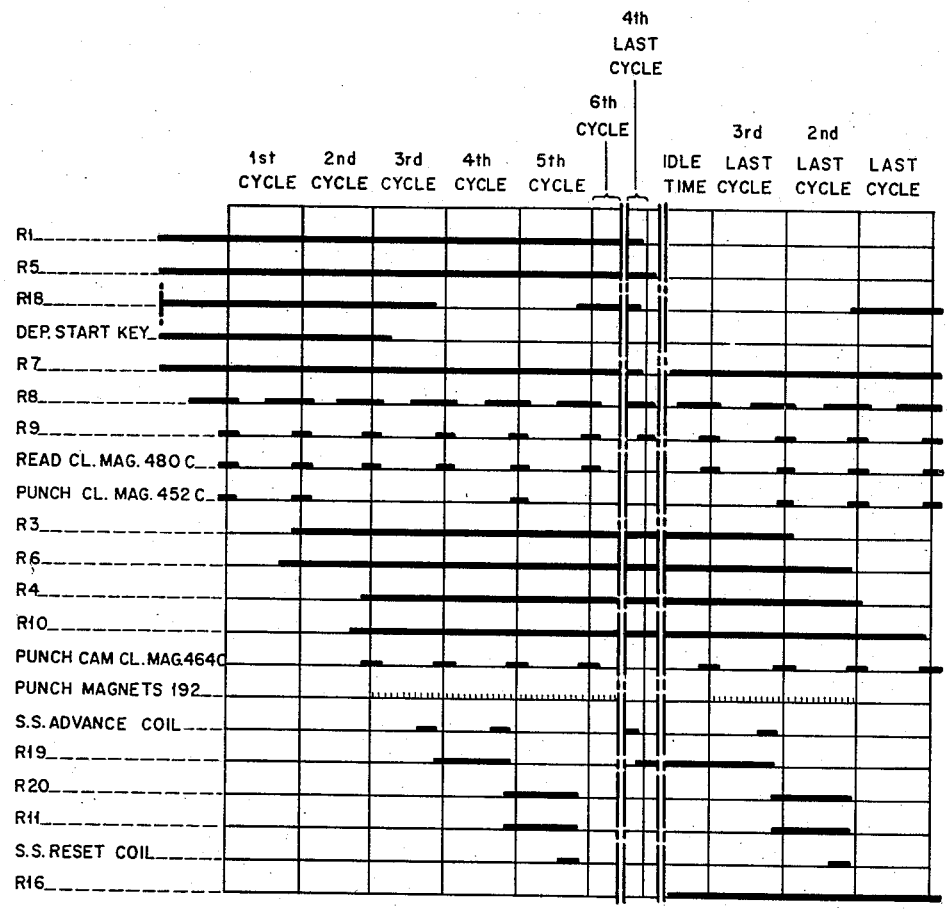

Figure 11 is a sequence of events chart for various components of the apparatus set up to operate with the wiring diagram of Figure 10.

Figure 12A:
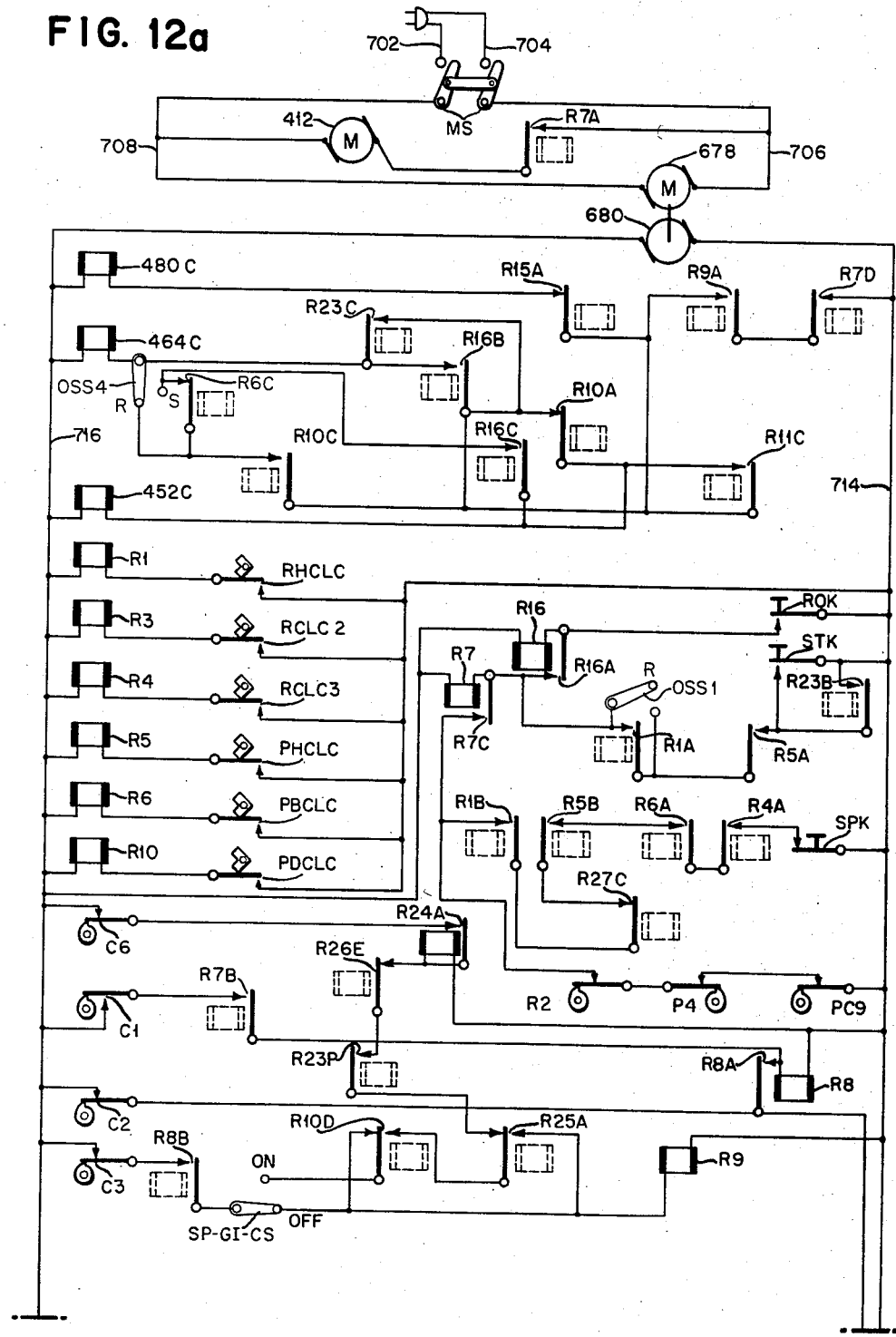
Figure 12B:
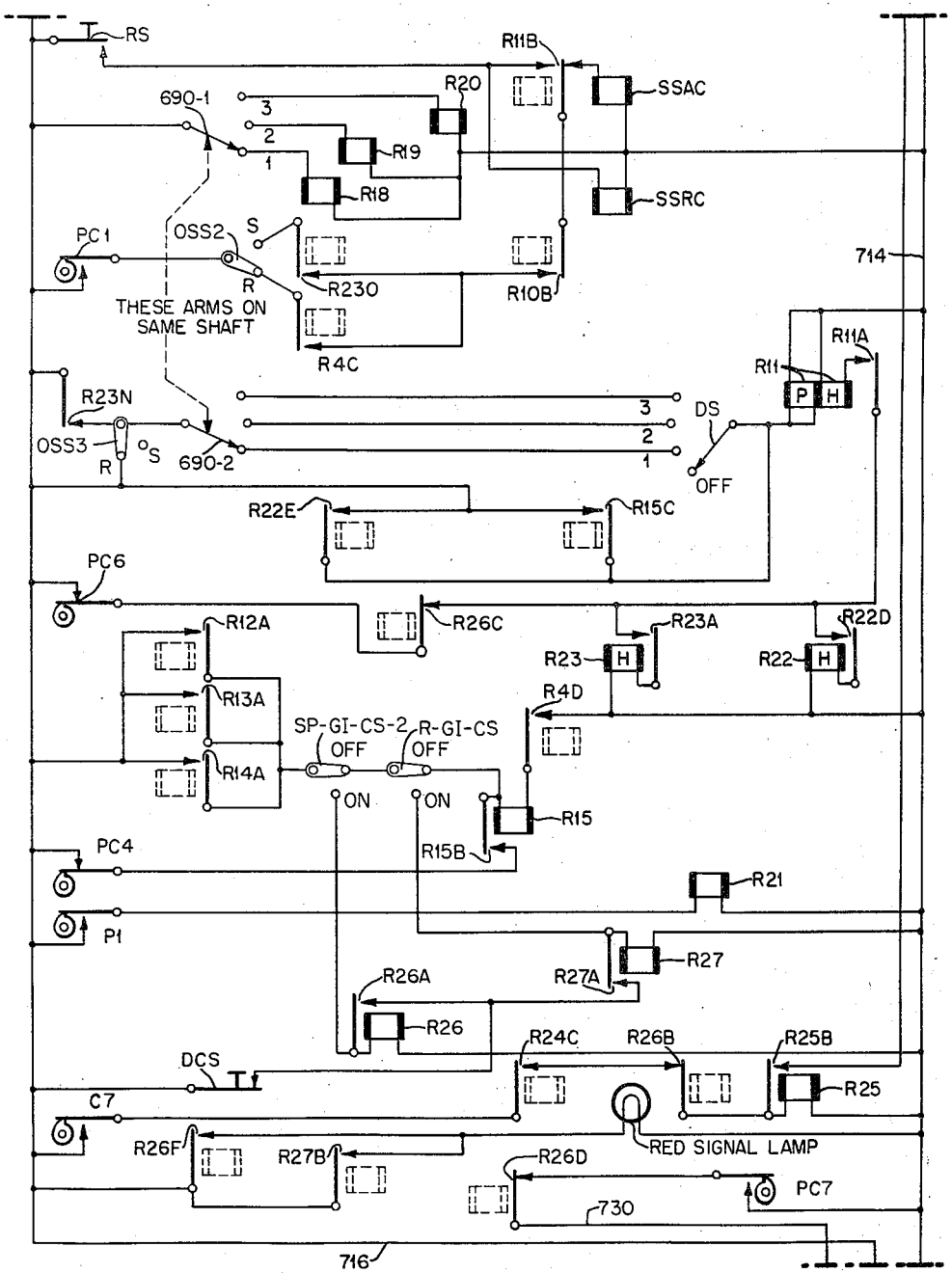
Figure 12C:
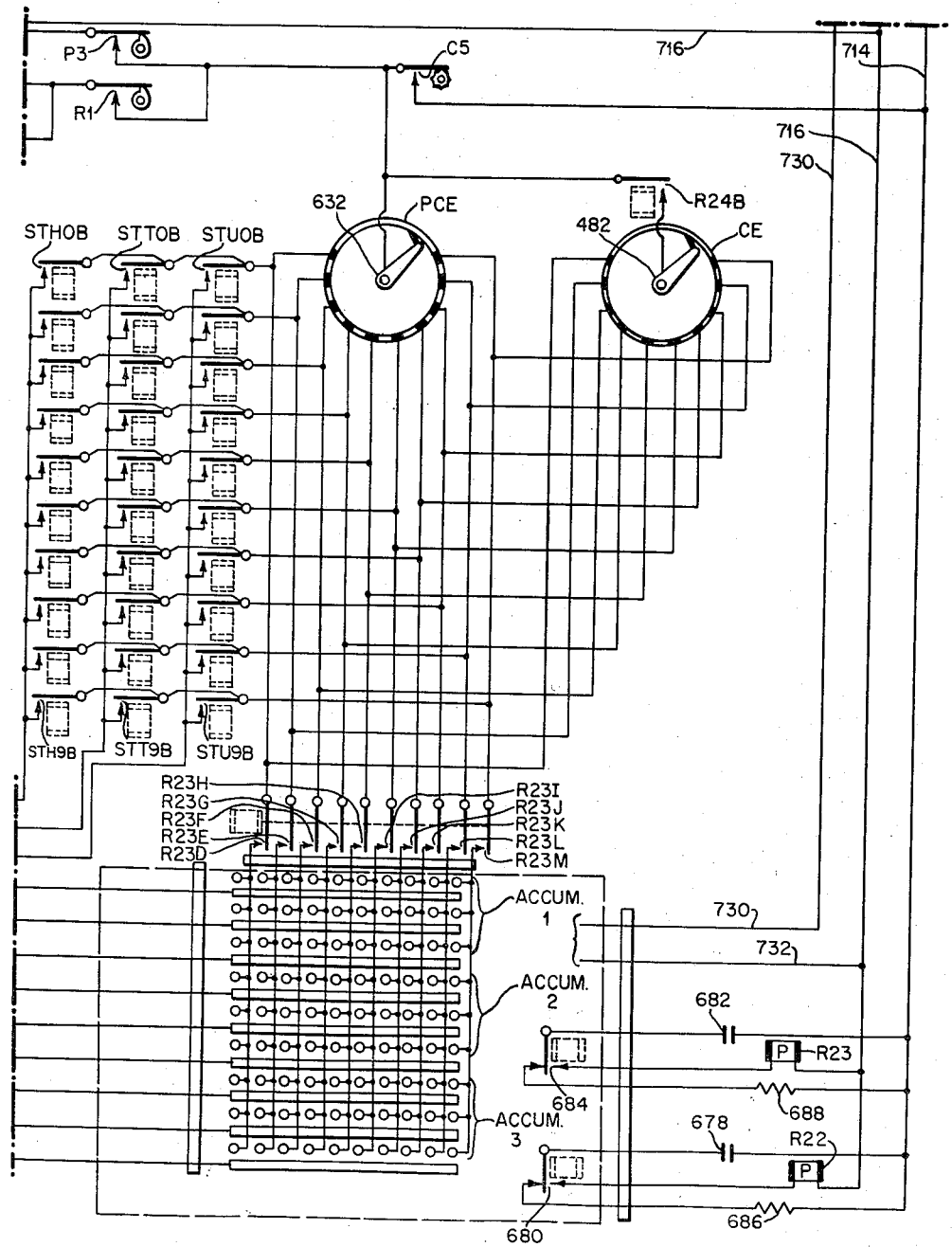
Figure 12D:
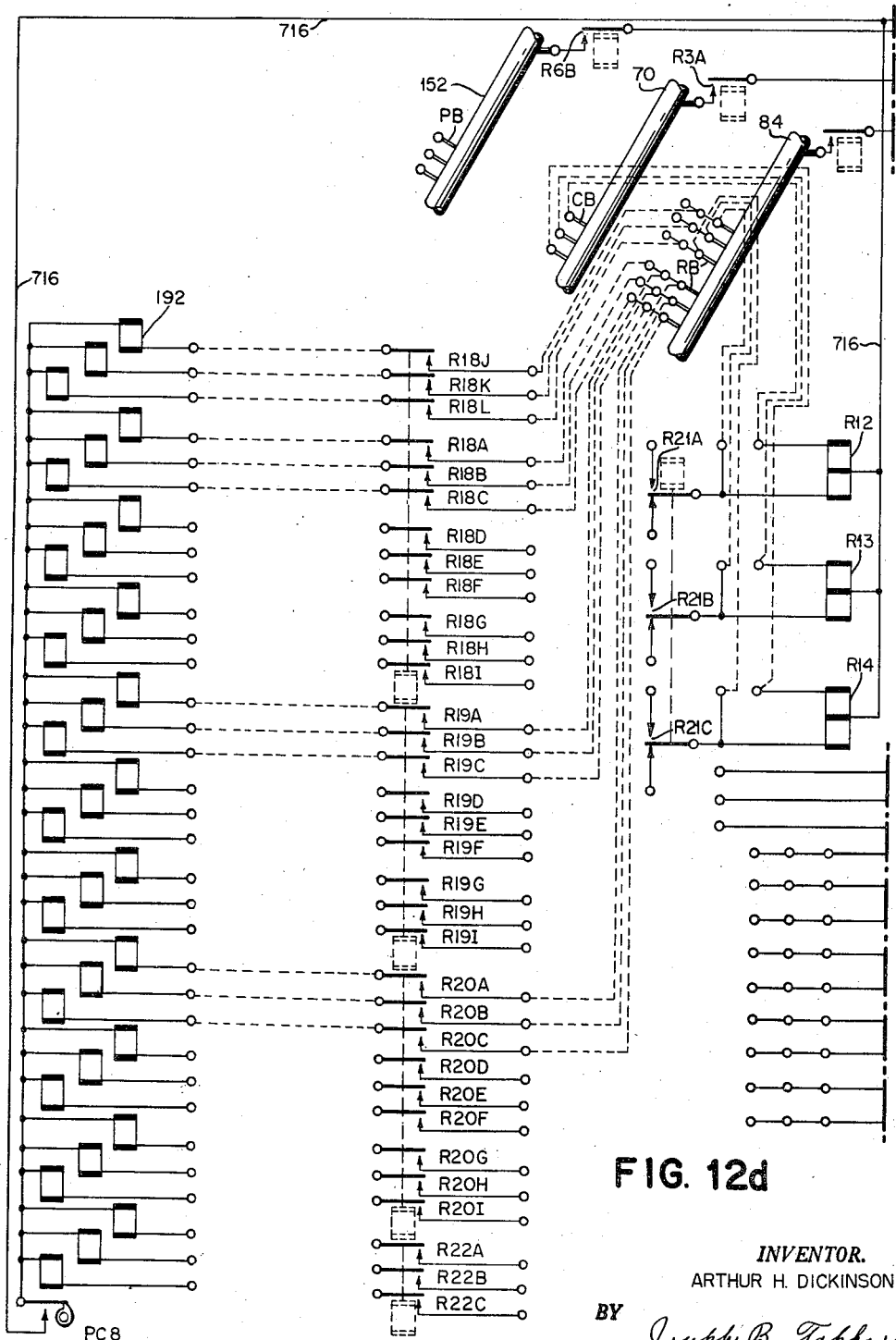

Figure 12 is, when arranged with Figs 12a, 12b, and 12c in descending vertical order and Fig. 12d to the left of Fig. 12c, a schematic diagram of wiring employed when the apparatus is utilized to transcribe data from successive related card groups onto successive consolidation cards as in Example 2.

Figure 13:
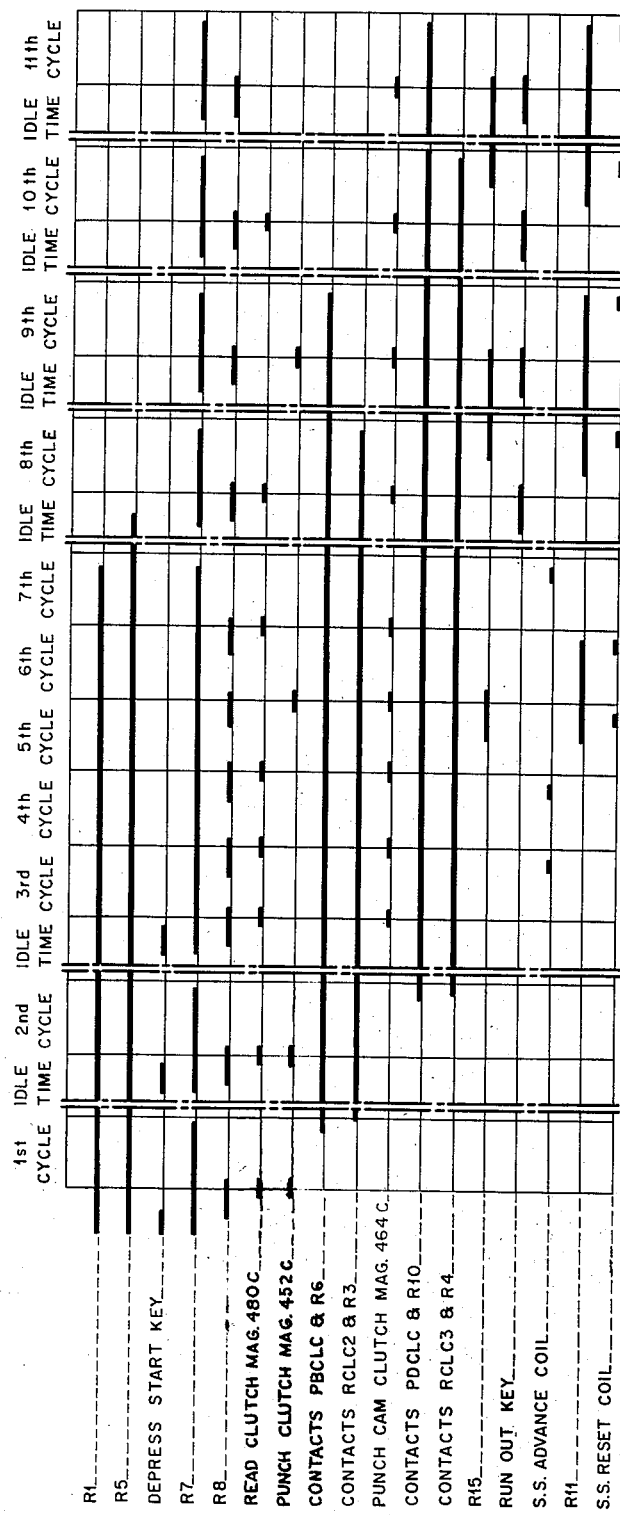

Figure 13 is a sequence of events chart for various components of the apparatus set up to operate with the wiring diagram of Figure 12.

Figure 14B:
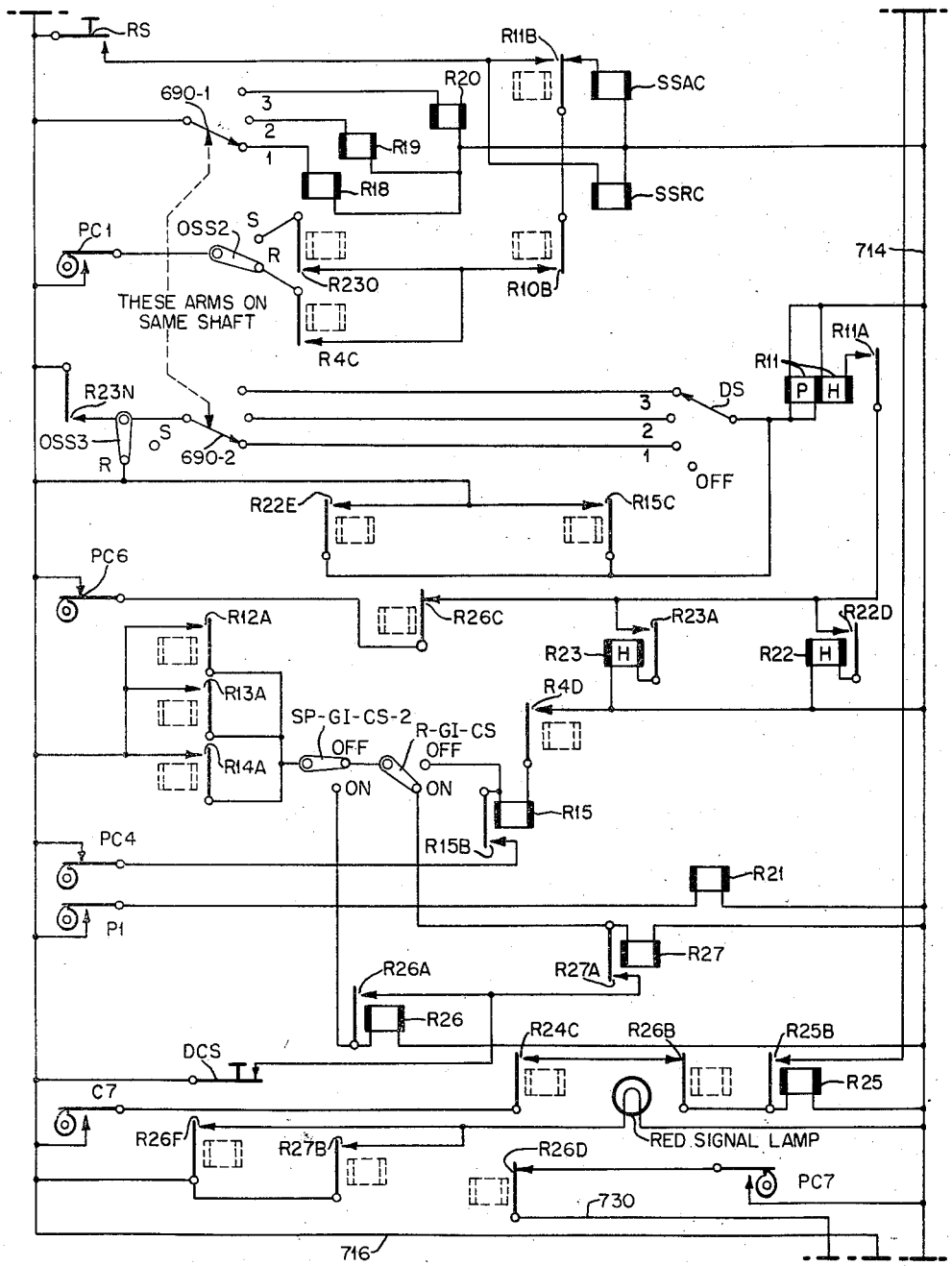
Figure 14C:
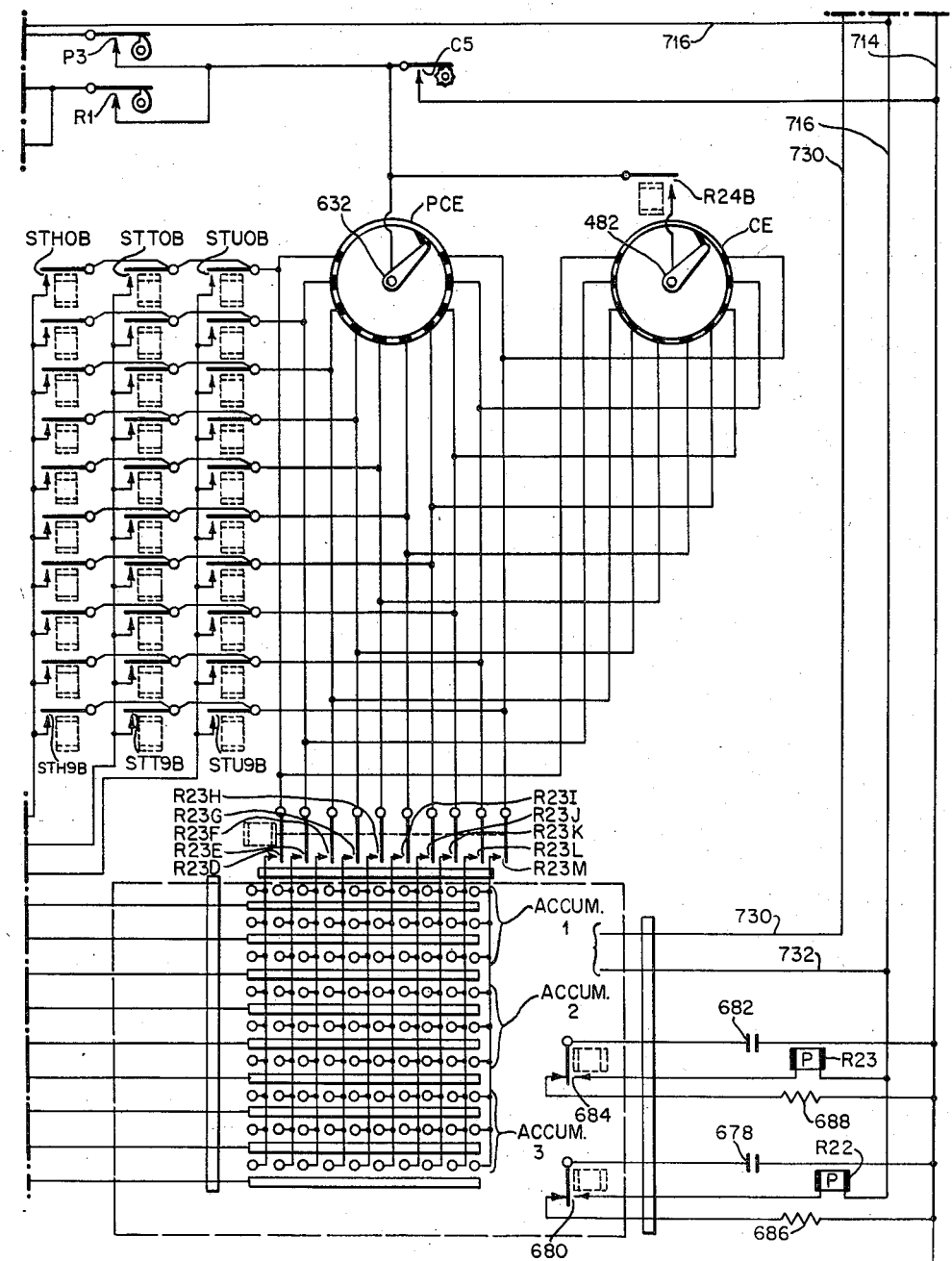
Figure 14D:
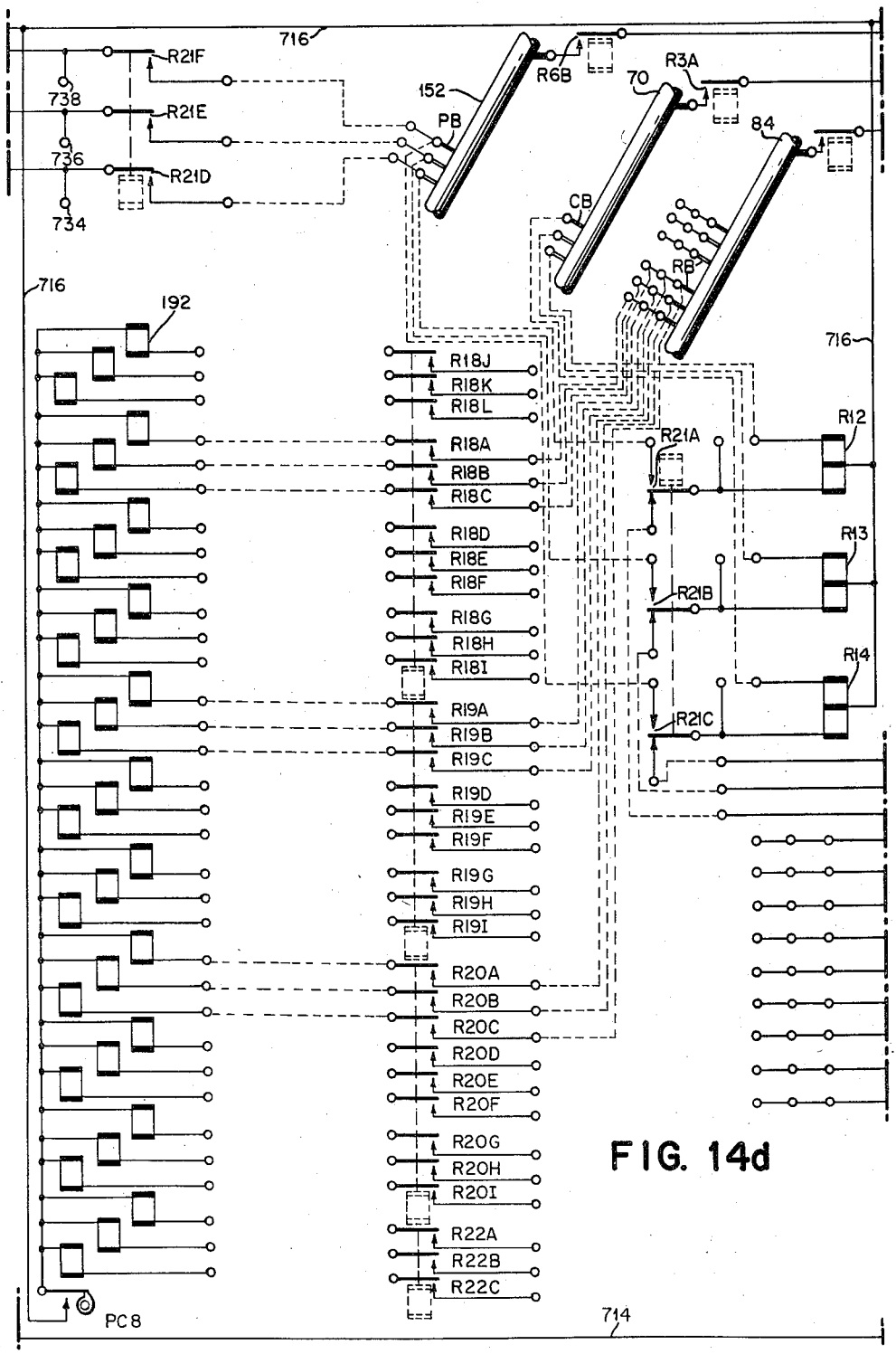
Figure 14E:
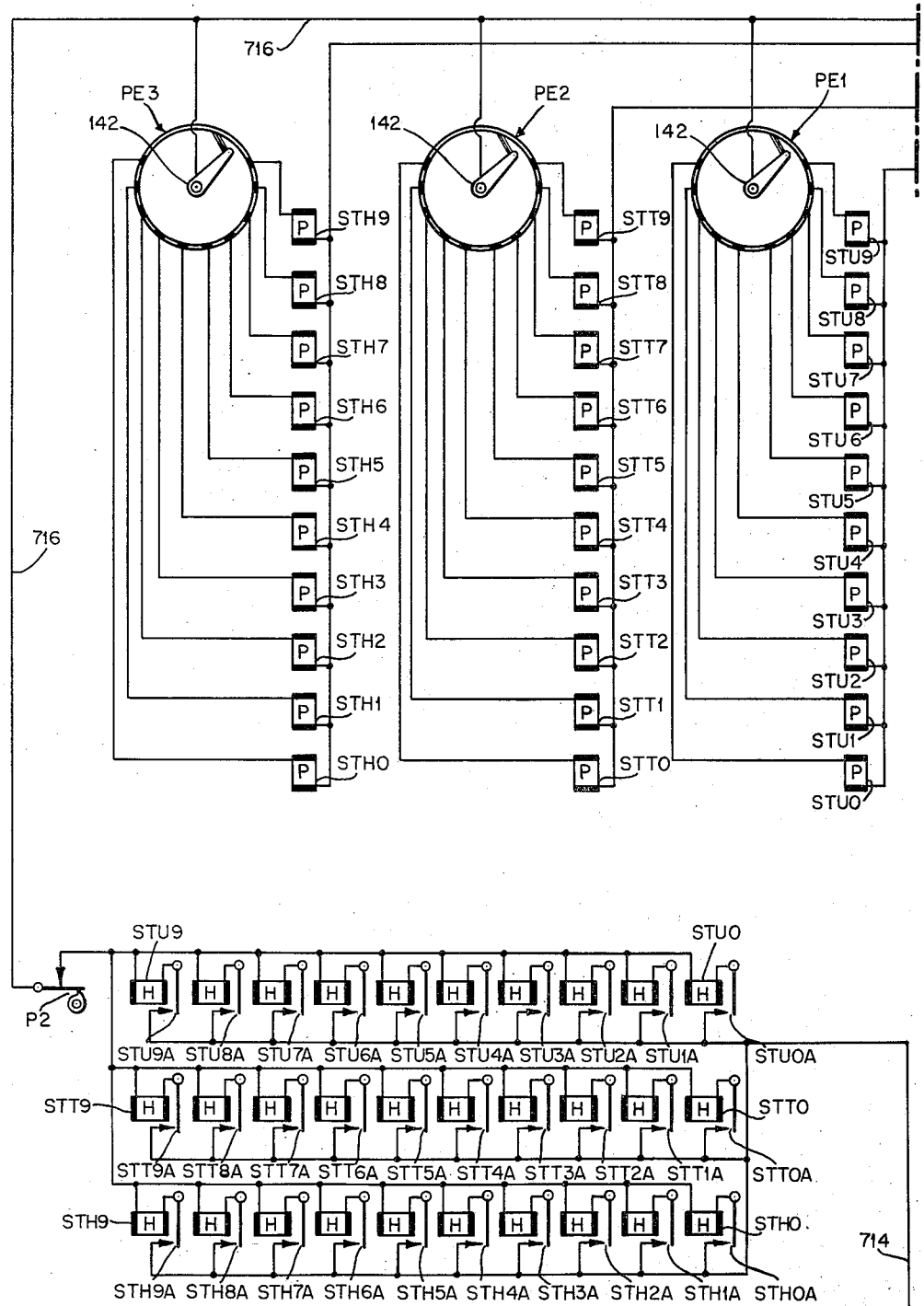

Figure 14 is, when arranged with Figs. 14a, 14b, and 14c in descending vertical order and Figs. 14d and 14e to the left of Figs. 14c and 14d, respectively, a schematic diagram of wiring employed when data is transcribed from record card groups onto related consolidation cards as in Example 3.

Figure 15:
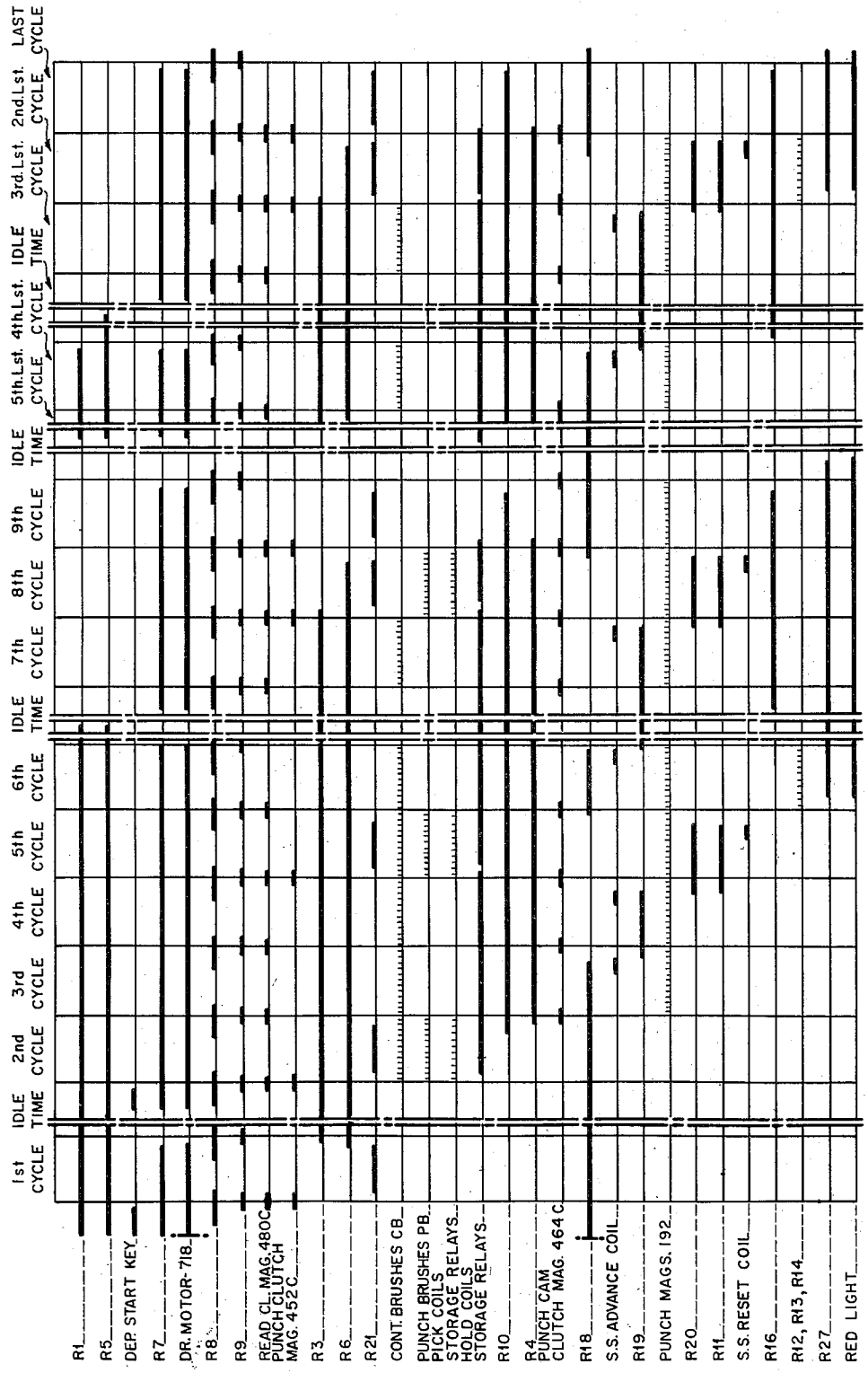

Figure 15 is a sequence of events chart for various components of the apparatus set up to operate with the wiring diagram of Figure 14.

Figure 16A:
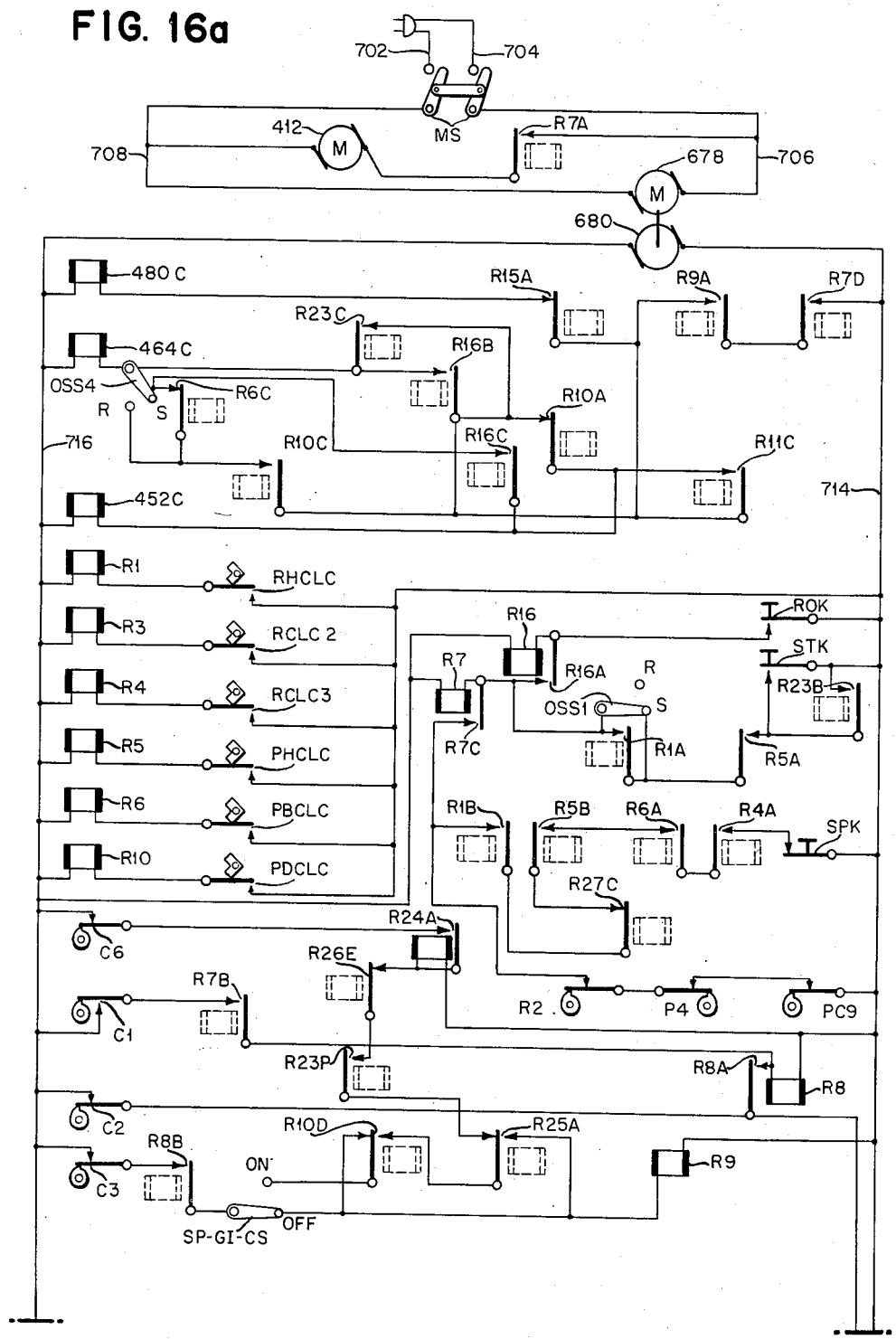
Figure 16B:
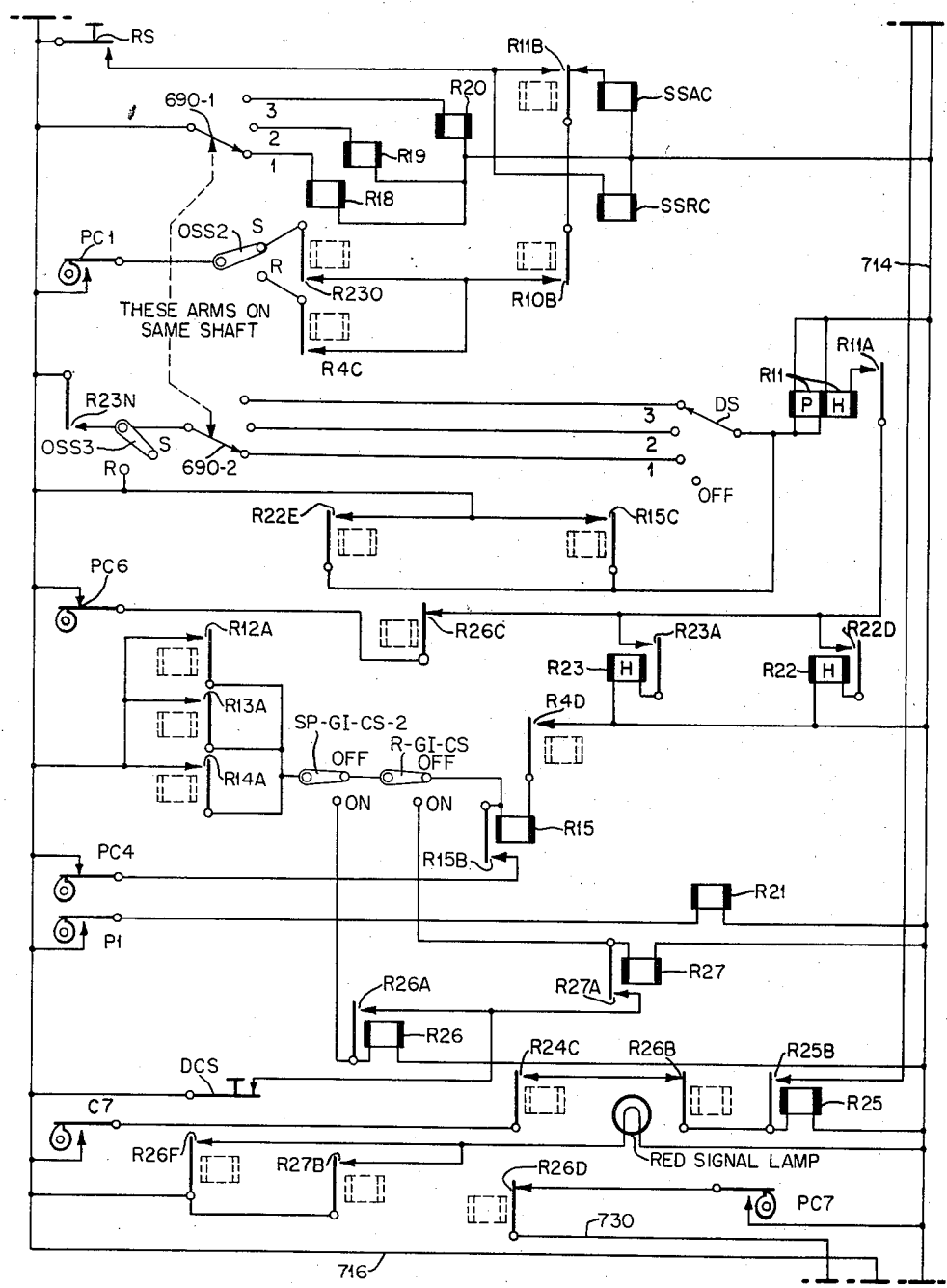
Figure 16C:
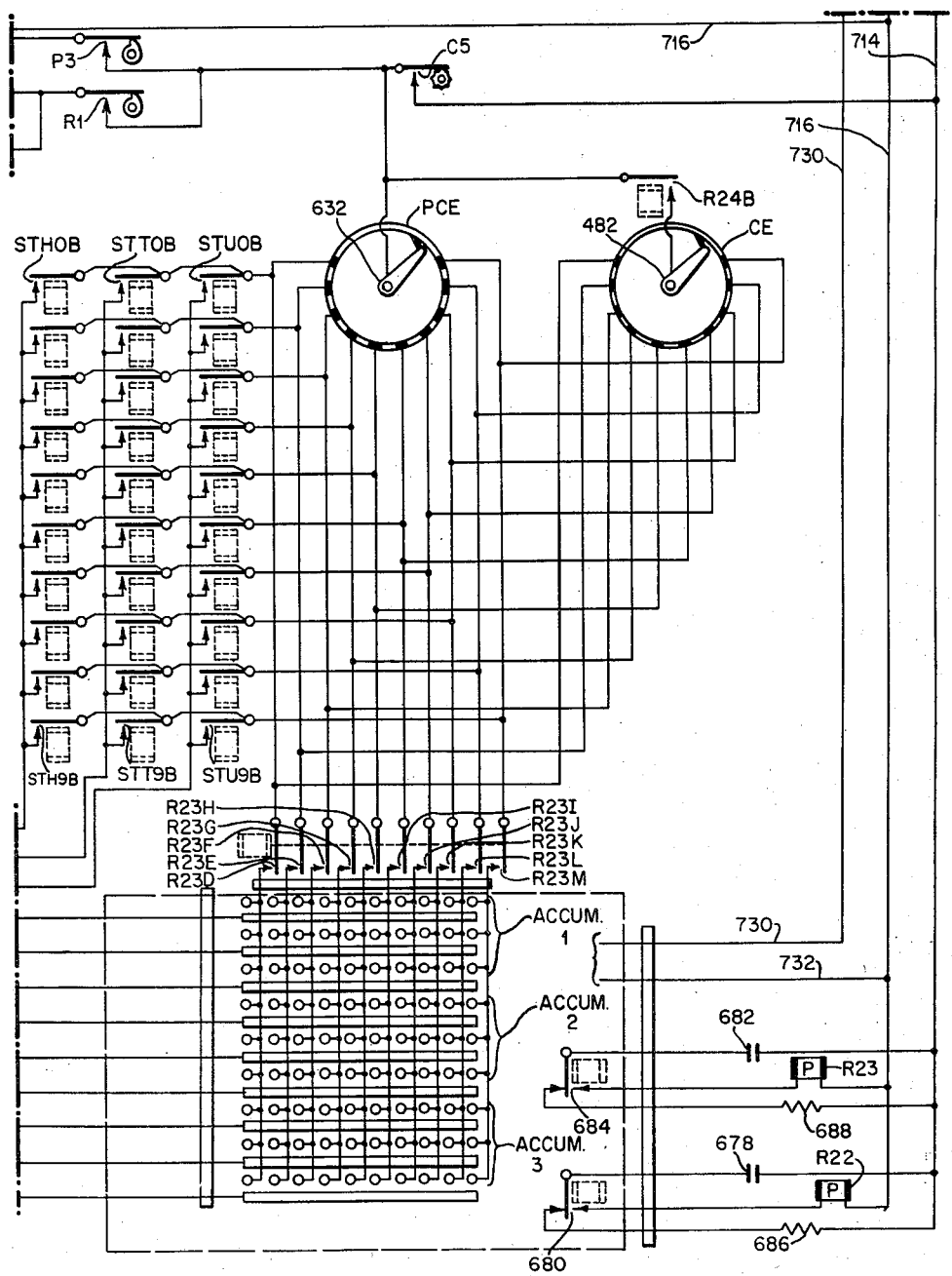
Figure 16D:
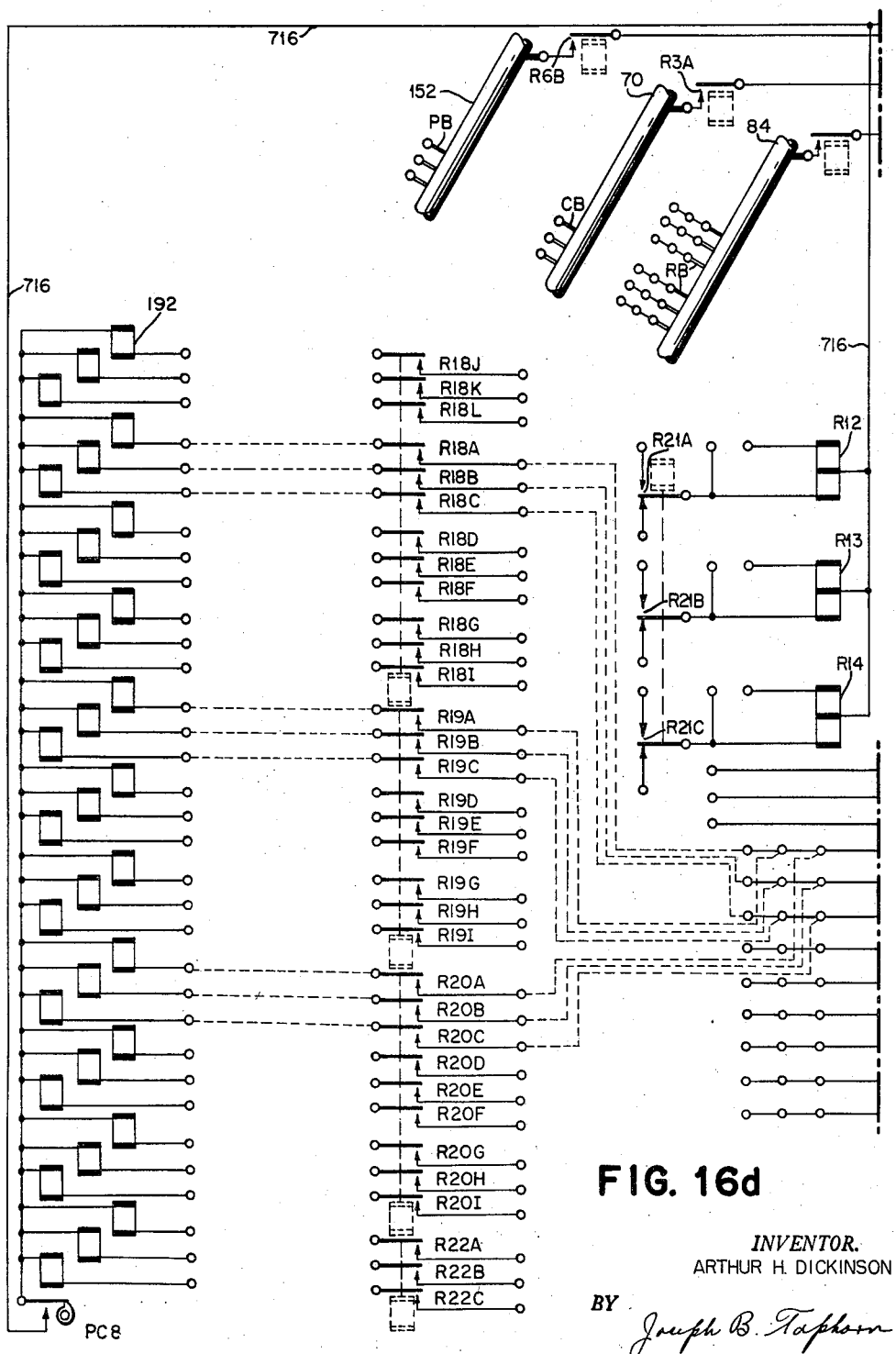

Figure 16 is, when arranged with Figs. 16a, 16b, and 16c in descending vertical order and Fig. 16d to the left of Fig. 16c, a schematic diagram of wiring employed when the punch unit is set up to punch predetermined numbers of totals obtained in an accounting machine onto successive consolidation cards as in Example 4.

Figure 17:
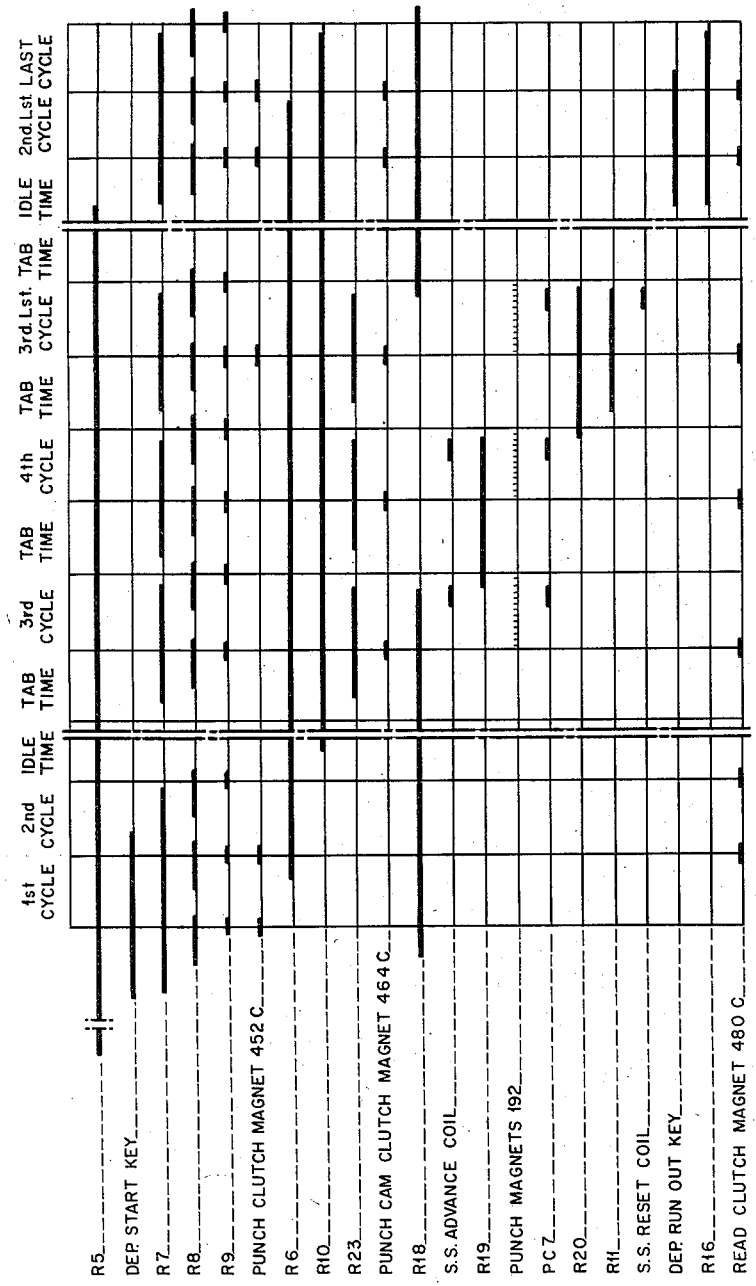

Figure 17 is a sequence of events chart for various components of the apparatus set up to operate with the wiring diagram of Figure 16.

Figure 18A:
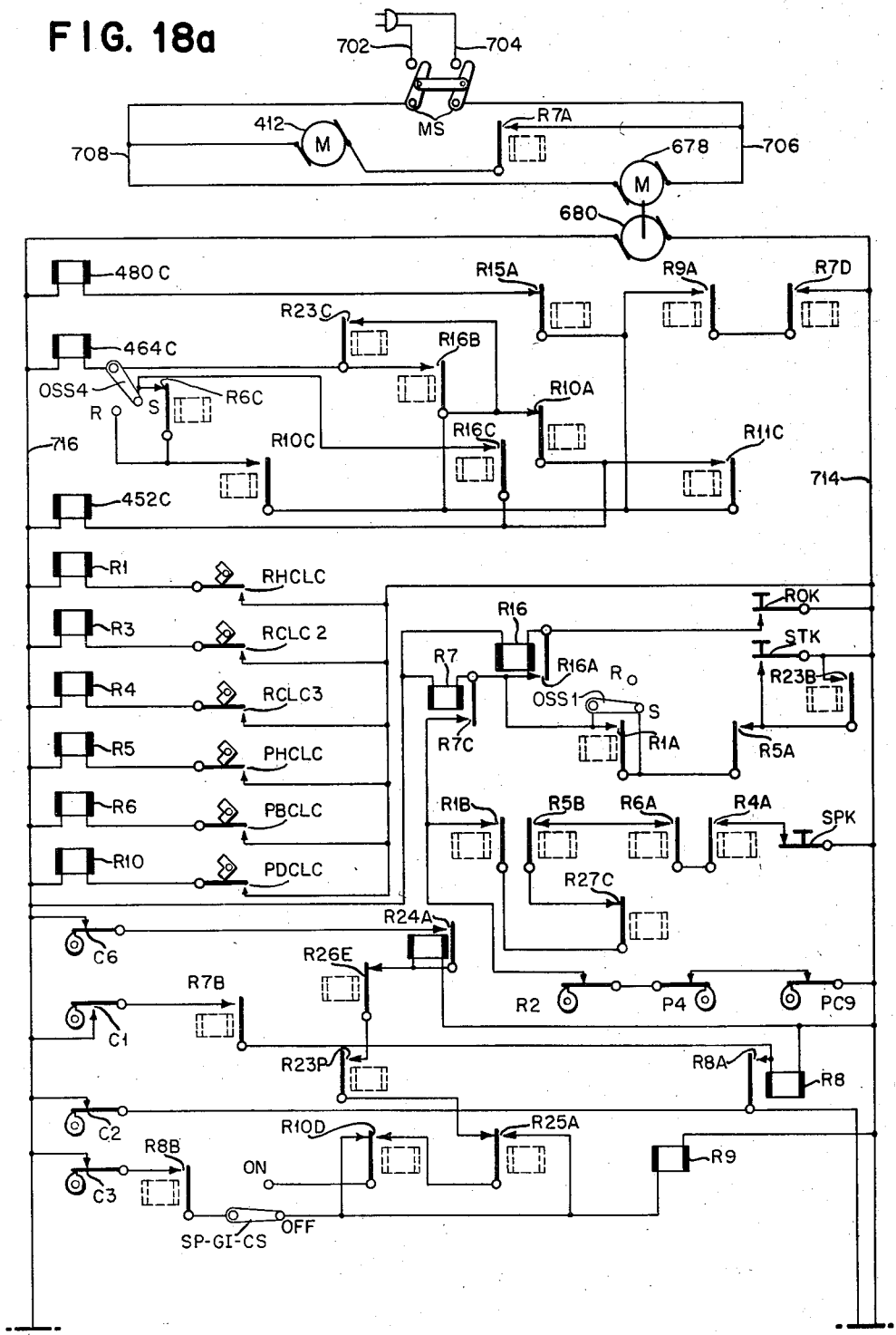
Figure 18B:
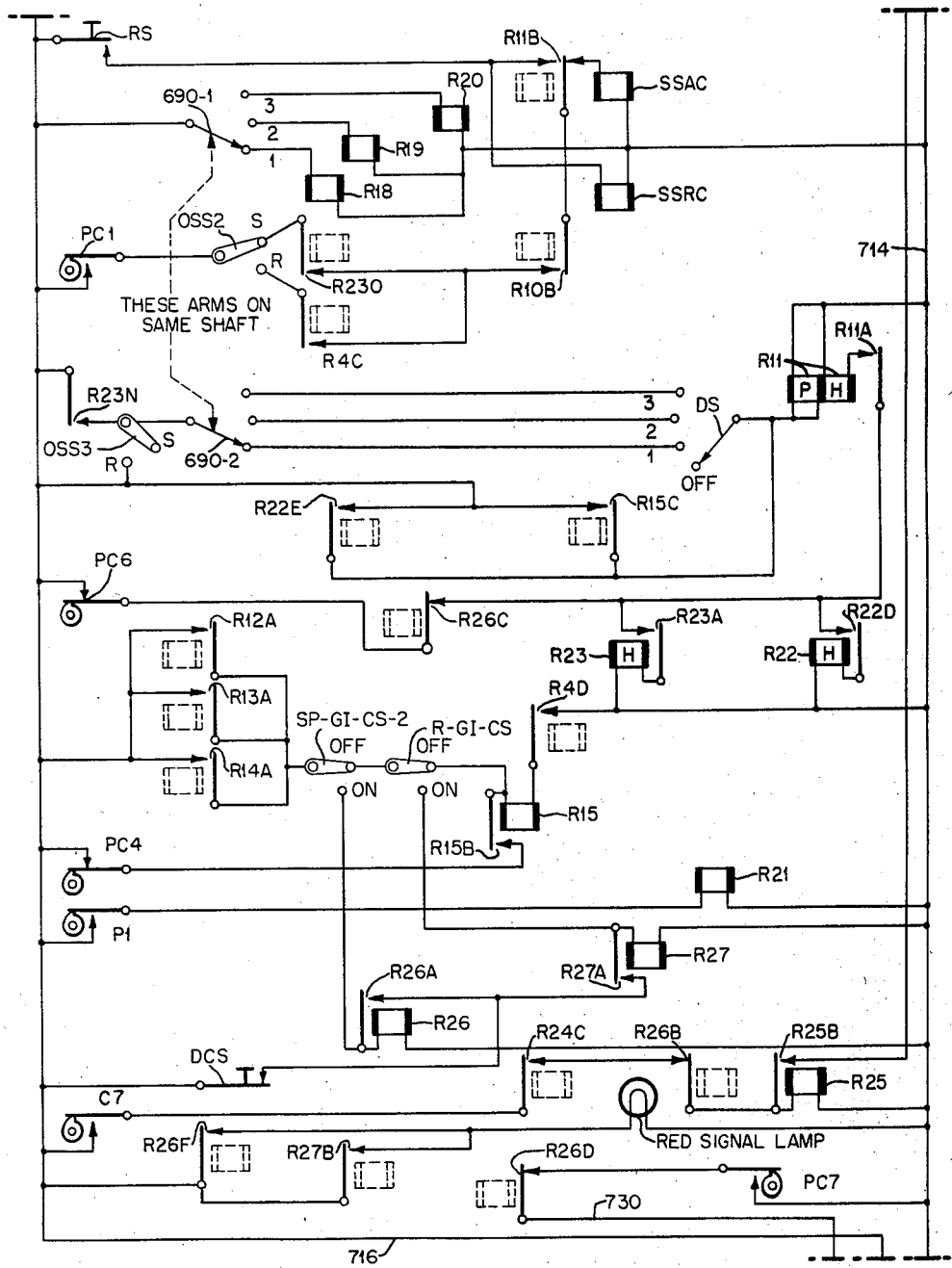
Figure 18C:
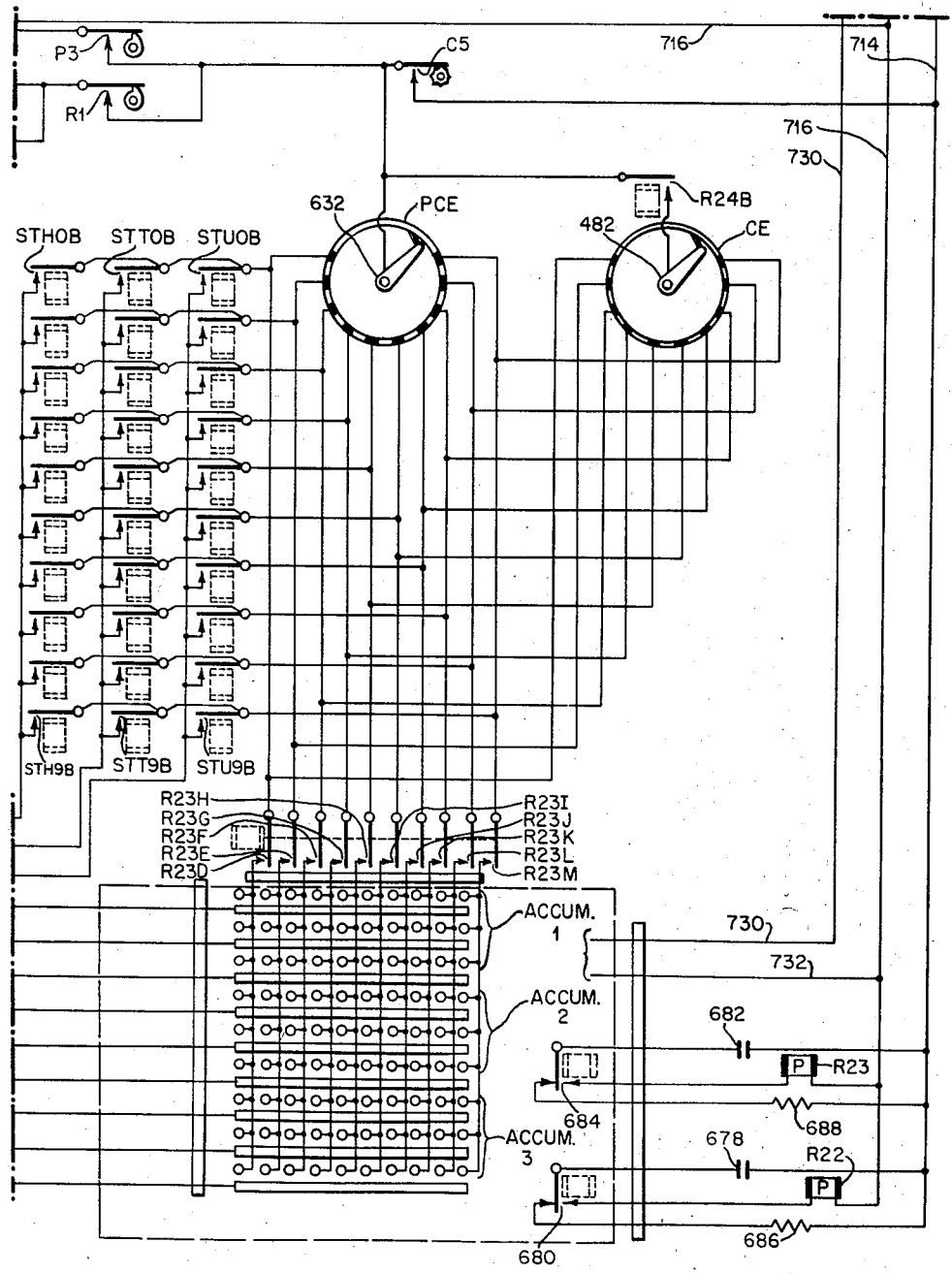
Figure 18D:
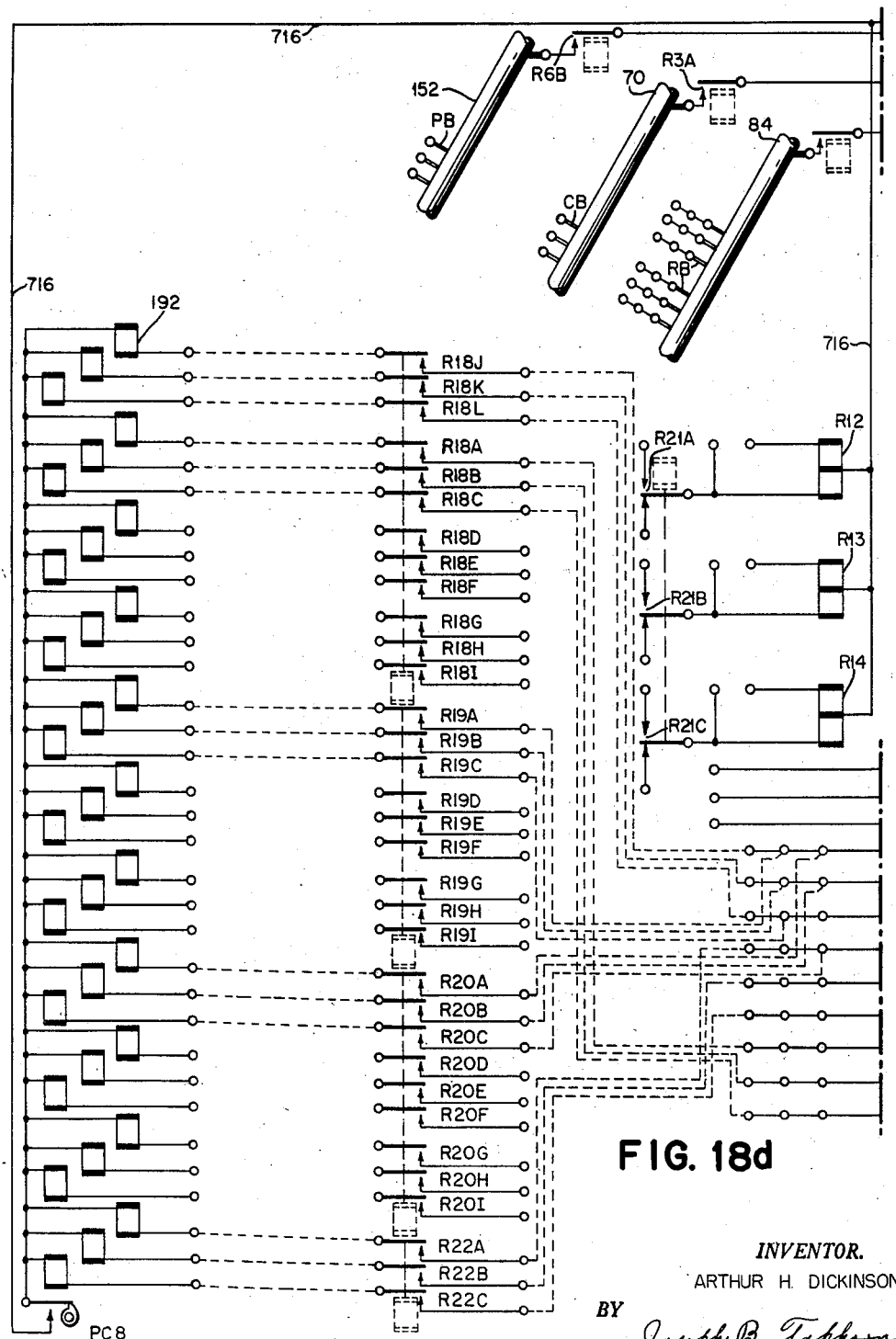

Figure 18 is, when arranged with Figs. 18a, 18b, and 18c in descending vertical order and Fig. 18d to the left of Fig. 18c, a schematic diagram of wiring employed when the punch unit is set up to punch the minor totals of successive major groups onto successive consolidation cards as in Example 5.

Figure 19:
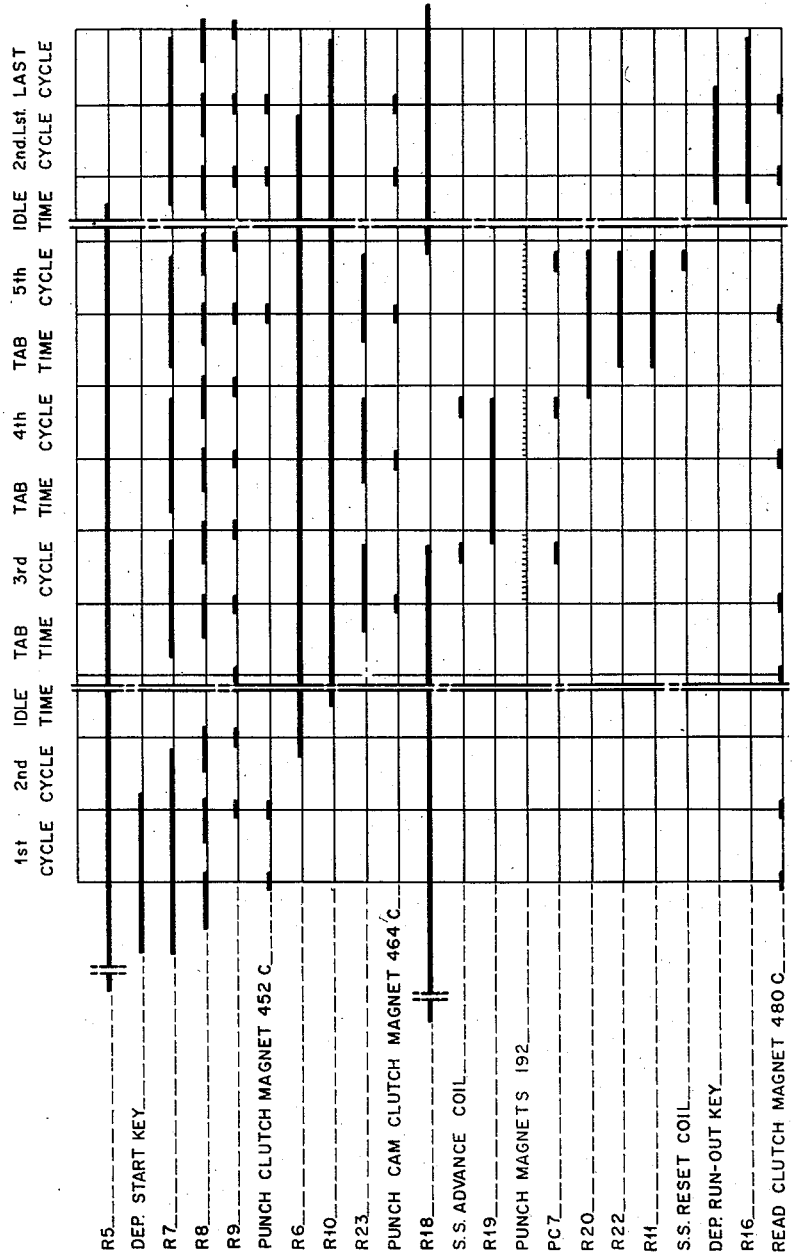

Figure 19 is a sequence of events chart for various components of the apparatus set up to operate with the wiring diagram of Figure 18.

Figure 20A:
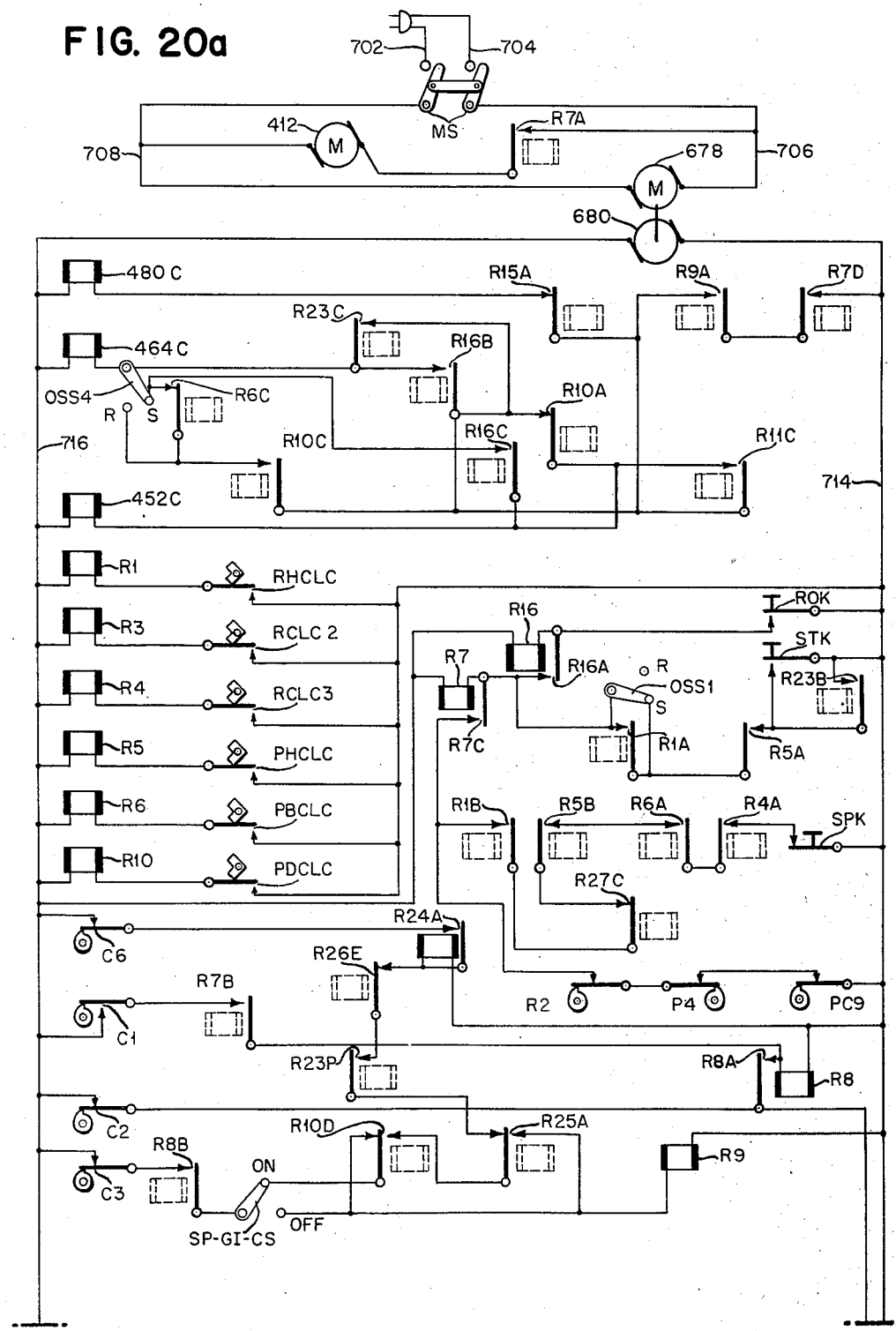
Figure 20B:
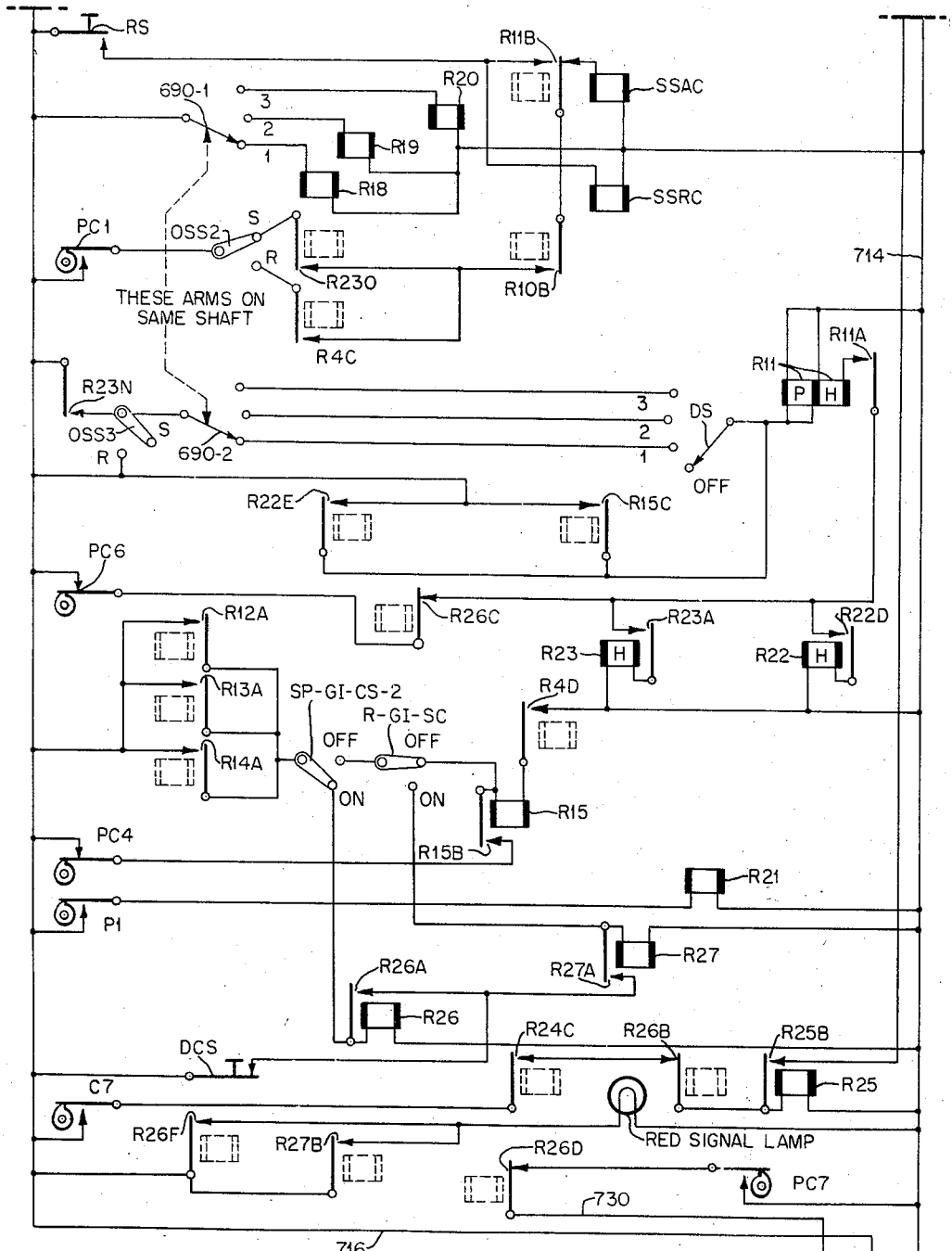
Figure 20C:
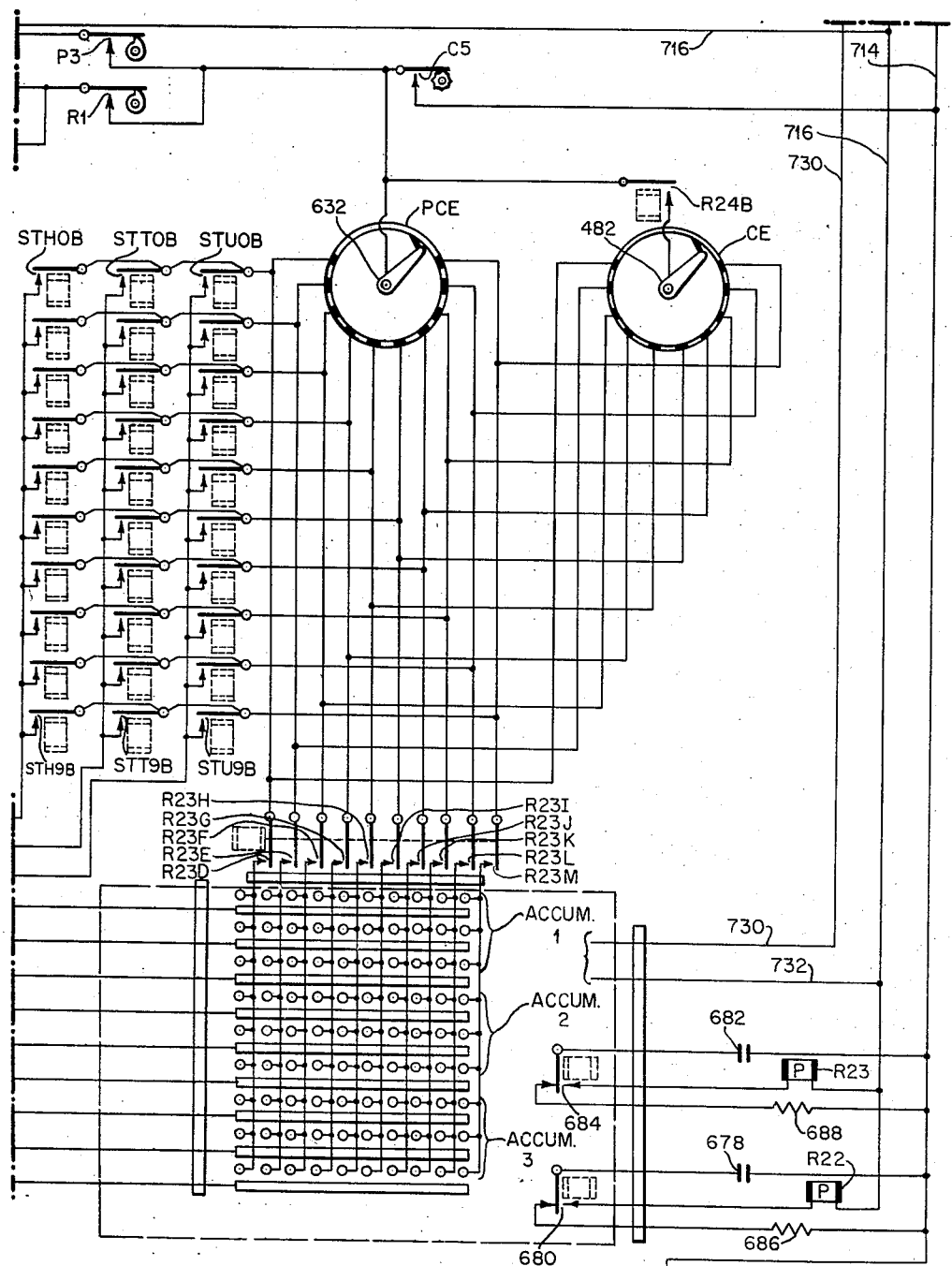
Figure 20D:
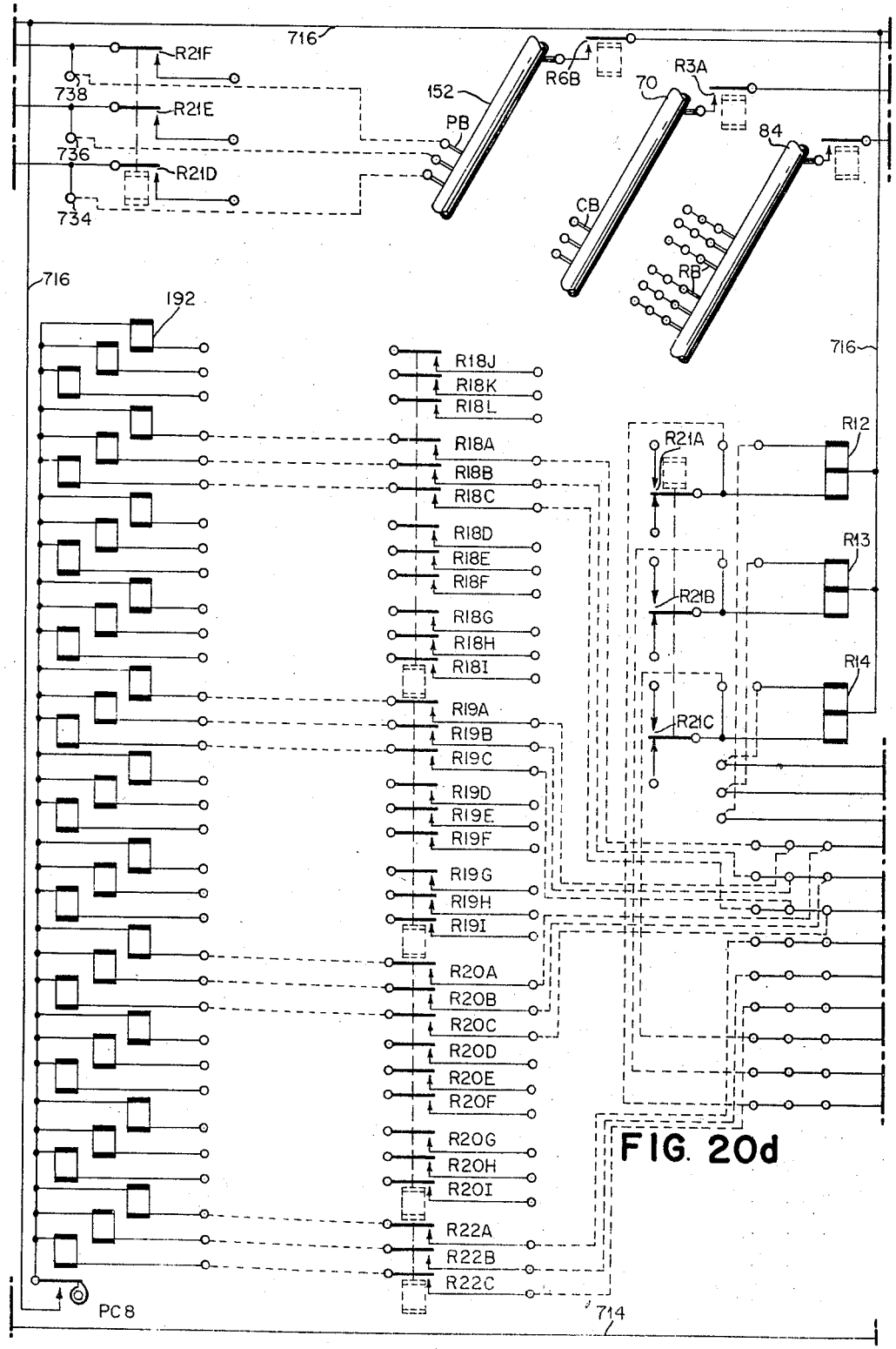
Figure 20E:
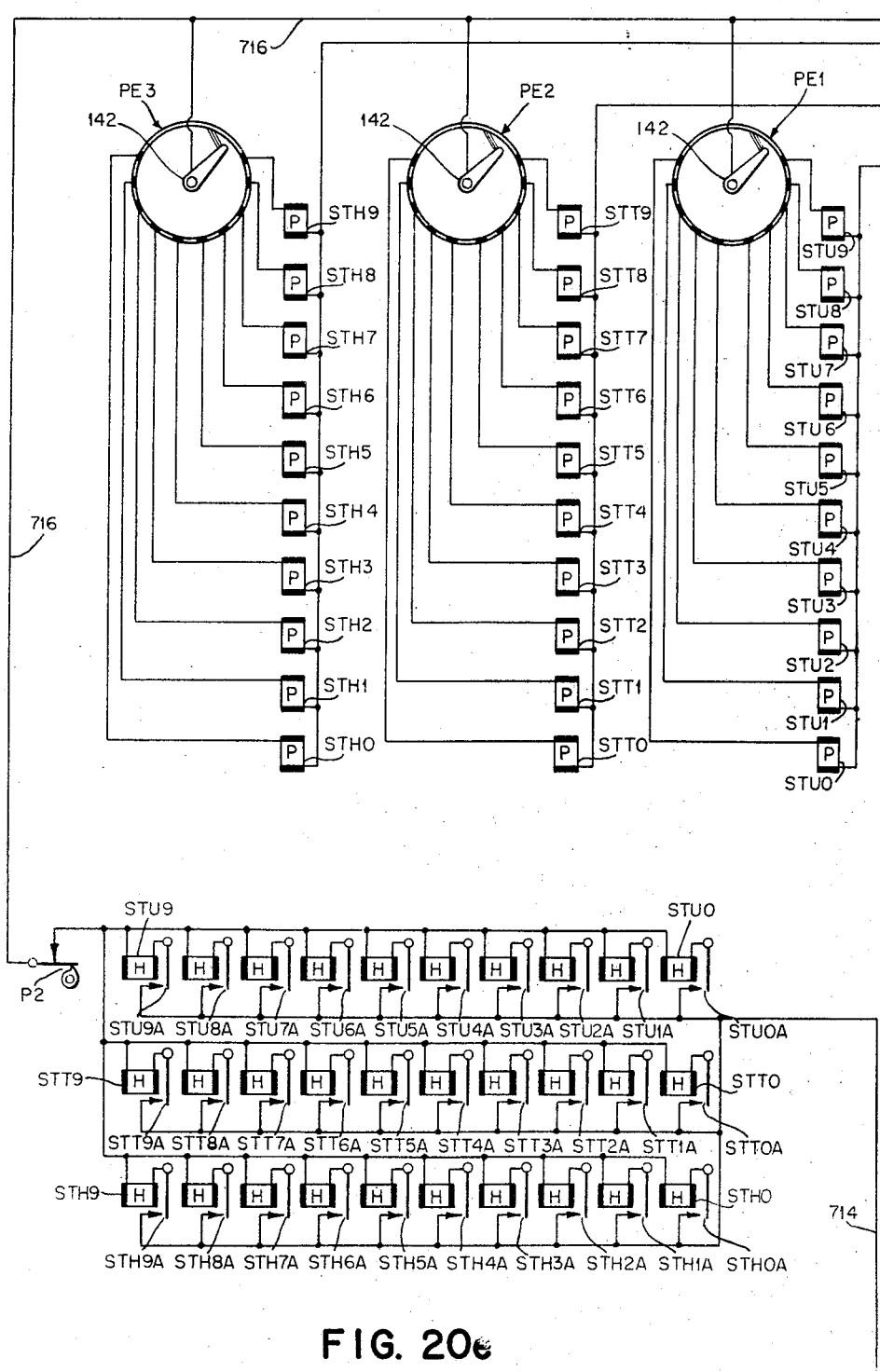

Figure 20 is, when arranged with Figs. 20a, 20b, and 20c in descending vertical order and Figs. 20d and 20e to the left of Figs. 20c and 20d, respectively, a schematic diagram of wiring employed when the punch unit is set up to punch the minor totals of successive major groups onto successive consolidation cards already bearing data related to the major group as in Example 6.

Figure 21:
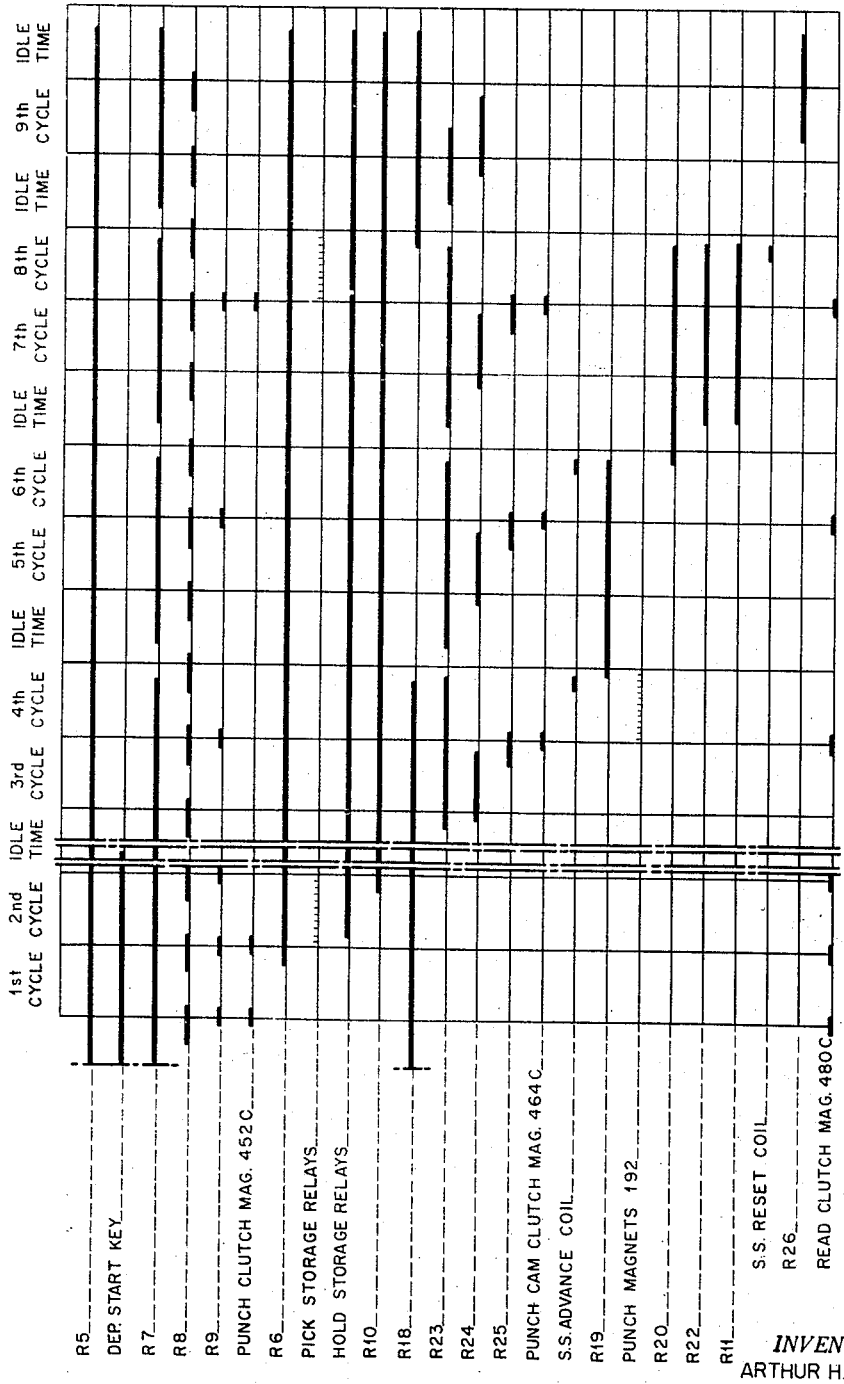

Figure 21 is a sequence of events chart for various components of the apparatus set up to operate with the wiring diagram of Figure 20.

MECHANICAL CONSTRUCTION

Card read unit

Referring more particularly to Figs. 1, 2, 3, and 4 of the drawings, the mechanical construction is shown as comprising a card read unit generally designated by the numeral 22 and a card punch unit generally indicated by the numeral 24. Conveniently, the card punch unit is juxtaposed with the punch unit in the rear of the read unit, and both are secured upon a suitable base casting 26.

The card read unit is similar to that disclosed in Patent No. 2,032,805, issued March 3, 1936, to C. D. Lake. Briefly, this unit includes a framework which is formed of a pair of left and right hand side plates 28 and 30 which are rigidly interconnected by bars 32 and 34. The read unit framework is supported on the base casting by legs 36 and 38 of the left side plate 28 and a leg (not shown) of right side plate 30 and opposite the leg 36. Upon the front end of the framework, there is formed, by means of a base 40, a rear wall 42 having side wings 44 and 46, and forwardly spaced posts 48, a hopper wherein the cards which are to be transcribed are placed. A card lever RHCL mounted in the base 40 is depressed when cards are placed in the hopper to where the contacts RHLC are closed. Cards are fed, in the direction of the columns thereon, from this hopper one at a time by means of card feed knife assemblies 50. These knife assemblies are so formed that, when reciprocated in card feed cycles, they remove only the bottom card from the hopper. Each knife assembly is formed with a rack 52 which cooperates with a gear segment 54 fixed to an oscillatable shaft 56. This shaft has also fixed to it a lever 58 which is pivotally connected to one end of a sleeve member 60 within which is rotatably mounted an eccentric disc 62. This eccentric disc is fixed to a shaft 64, and it can be seen that when this shaft is moved through one revolution the card feed knives will be reciprocated so as to feed the bottom card from the hopper.

When a card is fed from the hopper by the feed knife assemblies, it is grasped by a pair of simultaneously operated upper and lower feed rolls 66 and 68. These rolls continue to advance the card while the feed knives are being returned to their original position. When the feed knife assemblies have restored to their initial position, the feed rolls 66 and 68 will have advanced the card to a position in front of a row of control brushes CB and their cooperating contact roll 70. In this position, the card displaces a card lever RCL2 to where it closes contacts RCLC2. Contacts RCLC2 will be held closed as long as a card is immediately in front of or passing between the contact roll and the control brushes.

The card remains in the position in front of the control brushes CB until the feed knife assemblies are again reciprocated to feed the next card from the hopper. The pair of feed rolls 66 and 68 and the contact roll 70 will be simultaneously operated so that the first card passes between the contact roll and the cooperating sensing brushes comprising the first sensing station of the read unit and is sensed row by row of index point positions. Thereafter the card passes between upper and lower guide plates 72 and 74 to where it is grasped by the second pair of upper and lower feed rolls 76 and 78. These rolls continue the advancement of the first card after it leaves the first pair of feed rolls 66 and 68, and the card passes between a second pair of upper and lower guide plates 80 and 82 to a position in front of a row of read brushes RB and a cooperating contact roll 84 constituting the second sensing station. In this position the card displaces a card lever RCL3 where it closes contacts RCLC3. The contacts RCLC3 remain closed as long as the card is immediately in front of or passing through the second sensing station. The first card arrives at the position in front of the read brushes RB when the feed knife assemblies restore and remains there until they are again reciprocated. In other words, the second pair of feed rolls 76 and 78 also are operated only when the feed knife assemblies are reciprocated. The second card will be in the position in front of the control brushes CB.

Upon the third reciprocation of the feed knife assemblies, the first card will be advanced past the read brushes with the aid of the concomitantly operated contact roll 84, through the third pair of upper and lower guide plates 86 and 88, to where it is grasped by a third pair of upper and lower feed rolls 90 and 92 that may be rotated whenever a card passes the read brushes. The feed rolls 90 and 92 continue the advancement of the first card after it leaves the second pair of feed rolls 76 and 78 onto where it strikes a plate 94 which deflects it downward toward a stacker suitably located in the rear end of the read unit. At the end of the third feed knife assembly reciprocation, the second card will be in front of the read brushes RB while the third card will be in front of the control brushes CB. The read unit may operate in this fashion as long as cards remain in its hopper.

The stacker (Fig. 2a), which includes a container formed with front and rear walls 96 and 98 and an end wall 100 on its left hand side, receives the cards upon a yieldably supported member 102 which moves downward as additional cards are stacked thereon with the aid of a rotatable eccentric card gripping device 104. Whereas the card feed knife assemblies, the first and second pair of feed rolls, and the contact rolls 70 and 84 are operated simultaneously, the eccentric card gripping device and the last pair of feed rolls are operated simultaneously. The two sets of components are sometimes operated together and at other times independently of each other as will hereinafter become apparent.

Card punch unit

The card punch unit is mounted upon the base casting immediately behind the card feed unit; for purposes of compactness, it is so mounted that its card hopper overlies to some extent the stacker of the read unit. Its framework consists of a pair of left and right hand side plates 106 and 108, respectively. It is supported upon the base casting by front and rear legs 110 and 112 of the left side plate 106 and by a rear leg 114 of the right side plate 108. The side plates are interconnected to form the rigid framework by means of the transversely extending brace bars 116 and 118.

Figure 2A:
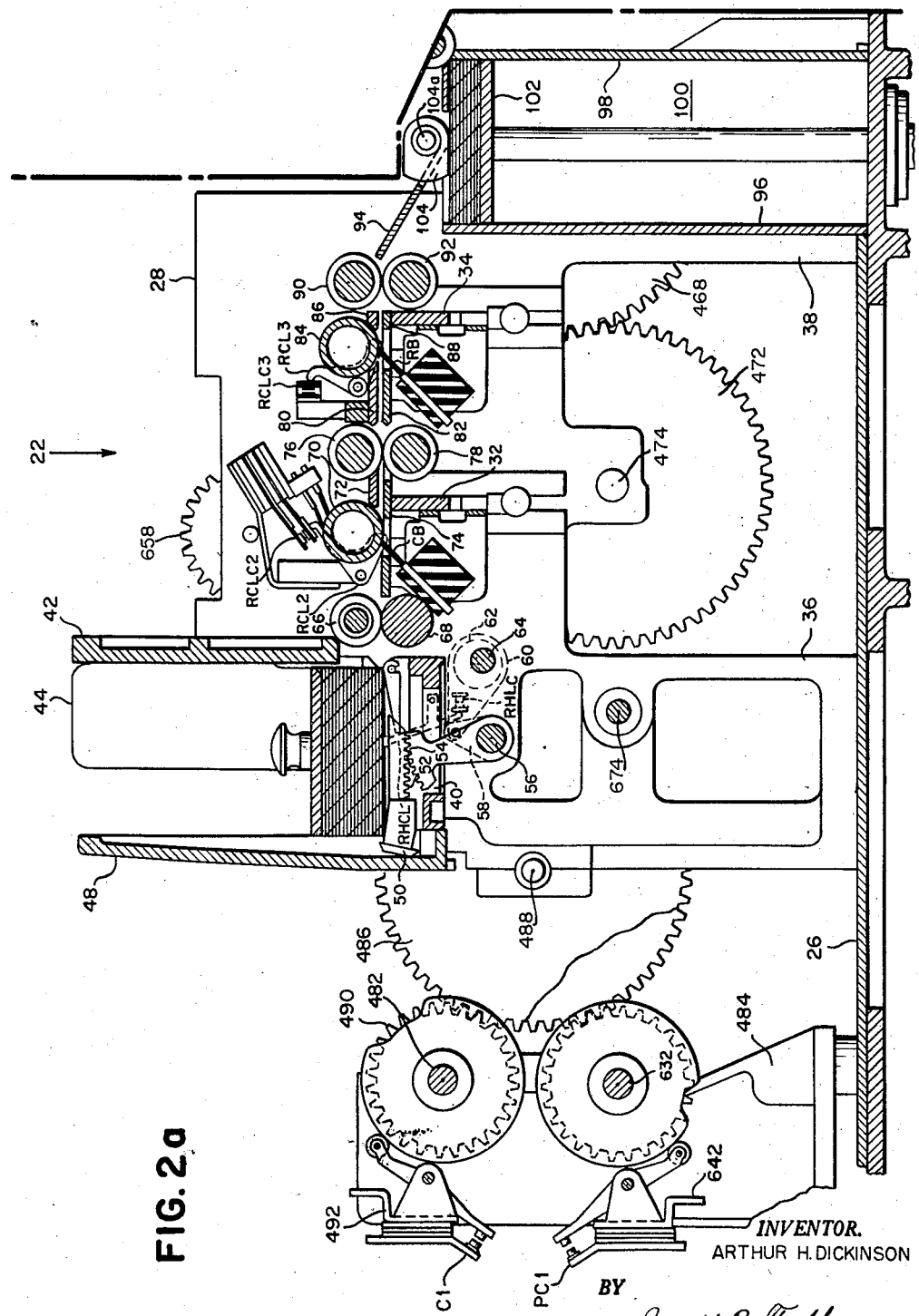
Figure 2B:
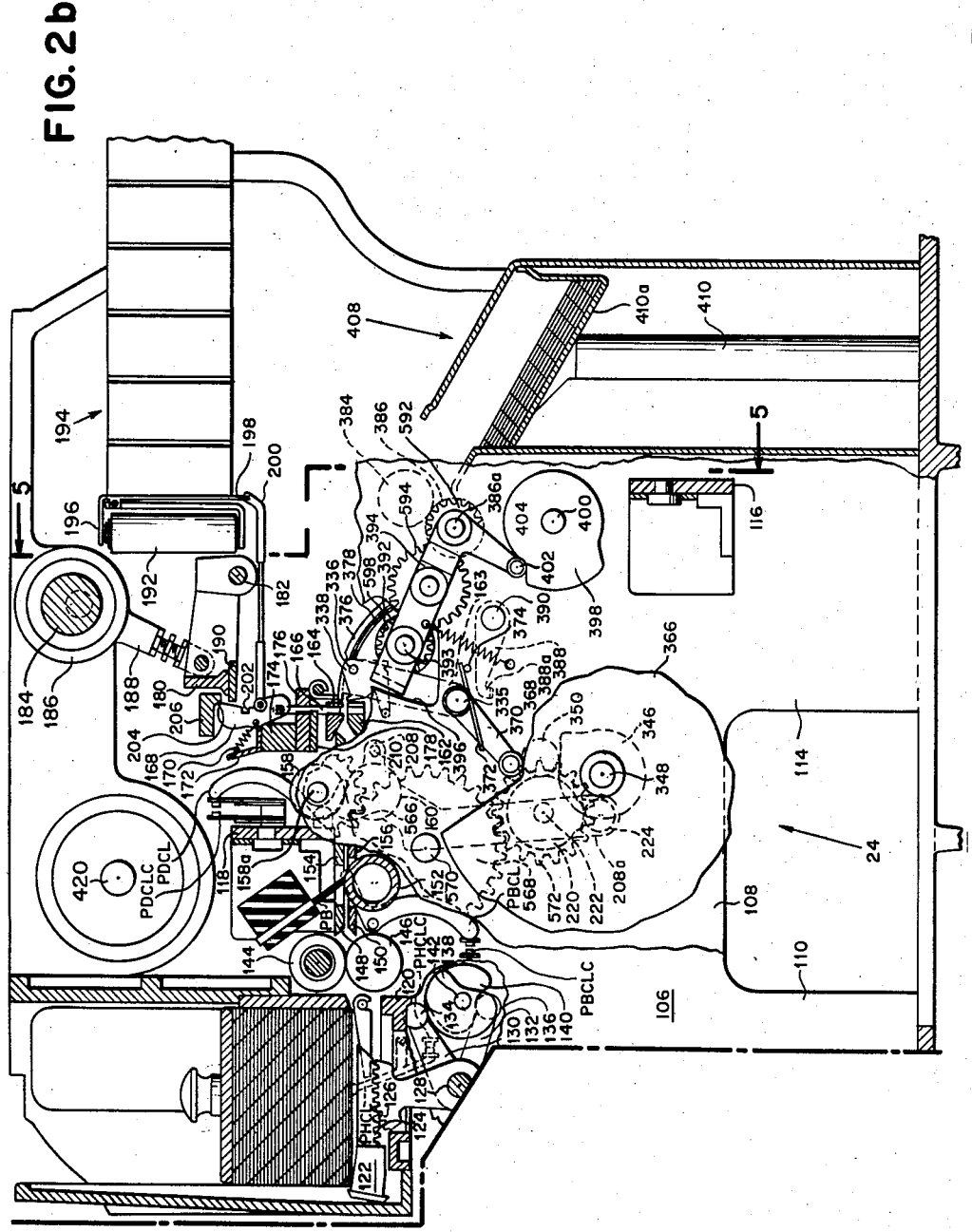

The structure of the punch unit hopper is similar to that disclosed in the aforementioned patent and hence will not be described in detail. If suffices to point out here that the hopper includes a base plate 120 wherein are mounted a pair of transversely spaced feed knife assemblies 122. As is customary, these knives are reciprocated in a longitudinal direction to feed the bottom card from the hopper, and in order to effect this reciprocation, the respective assemblies are provided with downwardly facing racks 124. Cooperating with the respective racks are a pair of laterally spaced gear segments 126 securely mounted upon an oscillatable shaft 128. The shaft is provided with a pair of arms 130 and 132 bearing rollers 134 and 136 at their free ends. The rollers are operated upon by a complementary pair of cams 138 and 140 secured to the rotatable shaft 142. It will be evident that for each revolution of the shaft 142, the shaft 128 bearing the gear segments 126 will be oscillated to and fro to effect one reciprocation of the feed knife assemblies 122. The normal position of the feed knife assemblies is as shown in Fig. 2b of the drawings.

Also mounted in the base plate 120 of the hopper and extending through a suitable opening formed therein is the card lever PHCL. This lever is shifted when cards are placed in the card hopper to where it closes the contacts PHCLC. Contacts PHCLC remain closed only so long as cards remain in the hopper.

When the feed knife assemblies 122 are reciprocated they advance the bottom card from the hopper to where it is grasped by the simultaneously operated pair of upper and lower feed rolls 144 and 146. These feed rolls advance the fed card between the pair of upper and lower guides 148 and 150 and to where the leading edge of the card is disposed in front of a set of punch brushes PB and a cooperating contact roll 152 comprising sensing station. For one reciprocation of the card feed knife assemblies, the card is moved just to this first sensing station and no further. It will, however, have depressed a card lever PBCL to where it closes the card lever contacts PBCLC. Contacts PBCLC will be held closed until the card has passed through the sensing station.

Figure 6:
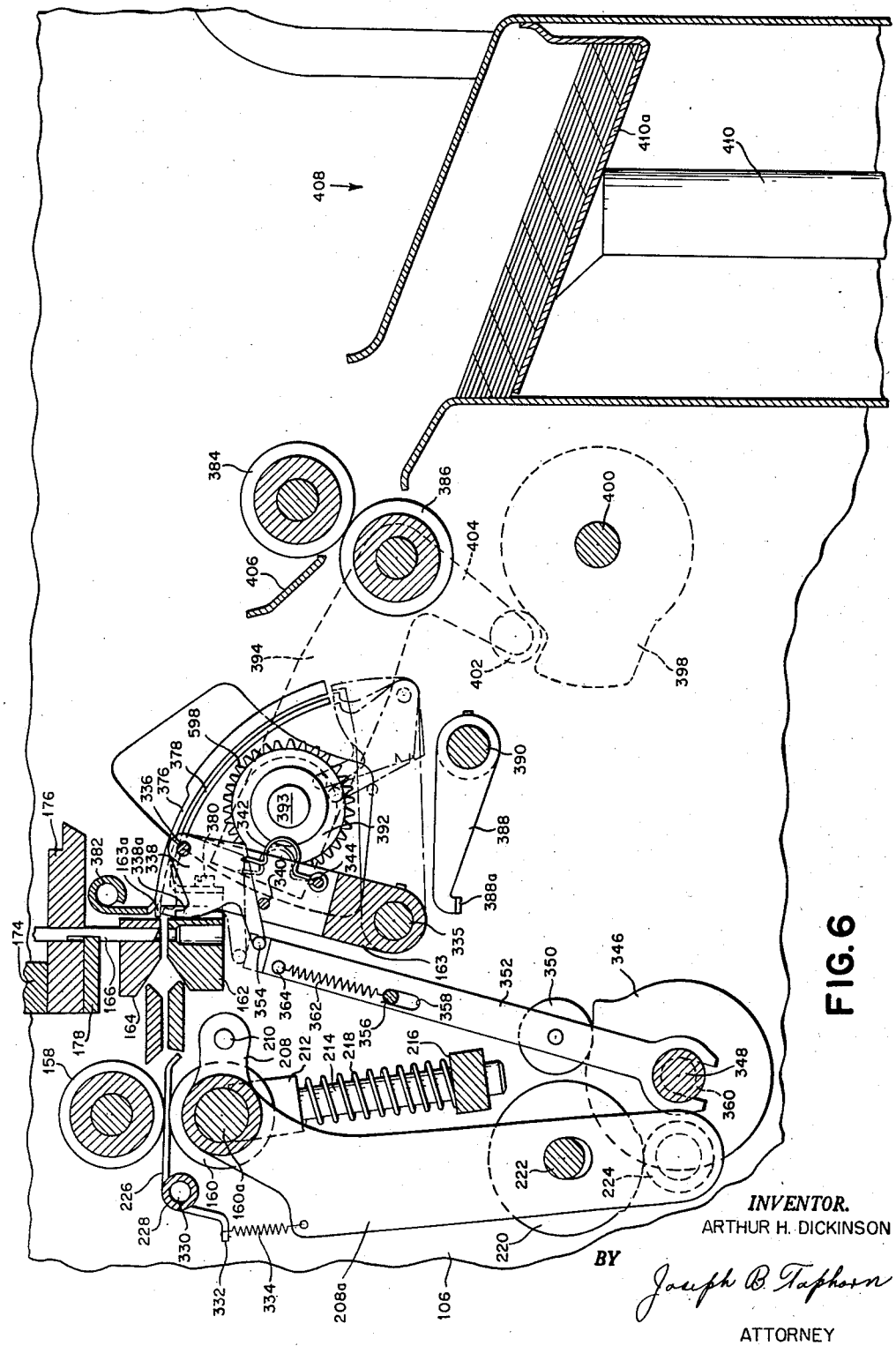
Figure 6 is a sectional view taken along the line 6—6 of Figure 5.

The next reciprocation of the feed knife assemblies will advance the next card from the bottom of the hopper to the first sensing station while the first pair of upper and lower feed rolls 144 and 146 advances the first card through the first sensing station, between a second pair of upper and lower guides 154 and 156 to where it is grasped by a simultaneously rotatable second pair of upper and lower feed rolls 158 and 160. These rolls in turn advance the card to a position wherein the leading edge of the card has moved over a transverse member 162 constituting the die of the punching station and under the forwardly projecting lips 163a (Fig. 6) on the bifurcated free ends of a pair of arms 163 (Figs. 2b, 5, and 6). In passing through the second pair of feed rolls 158 and 160, the card shifts the die card lever PDCL to where the card lever contacts PDCLC are closed. Contacts PDCLC will remain closed as long as the card is between the feed rolls.

The punch station includes, in addition to the die 162, a stripper 164 mounted above the die. Since there are eighty columns in the standard IBM card, there are eighty apertures in the stripper, and these receive the punches 166 by which perforations may be made at the index point positions in the different card columns with the aid of the corresponding apertures in the die. The punches have a normal position in which their lower ends are disposed above the card path and, as best seen in Fig. 2b, they are pivotally attached at their upper ends to corresponding interposers 168. These interposers are biased upwardly and forwardly by tension springs 170 respectively attached at one end to the corresponding interposer and at the other end to the upstanding side of a generally transversely extending L-shaped member 172 secured on its horizontal side to a mounting block 174 secured at its ends to the right and left hand side plates of the punch unit. The underside of this mounting block has secured to it a generally flat member 176 having suitable apertures through which the upper ends of the punches extend and by which they are guided. On the underside of this flat member there is secured a relatively thin plate 178 which extends into the cut-away regions of the punches and serves to define the upper and lower limits of movements of the punches.

A downward movement is imparted to the interposers 168 and hence to the punches 166 by the common bail member 180 pivoted at its respective ends upon a rod 182 extending between the right and left hand side plates 108 and 106. The bail is caused to move upward and downward, that is, to oscillate, continuously, as indicated by the timing chart of Fig. 7, by a continuously rotatable eccentric disc 184 acting upon a collar 186 connected by means of a rod 188 to the bail.

In order to cause the bail to operate a particular punch, the corresponding interposer 168 is moved into the path of a wear resistant plate 190 secured to the free end of the bail. This interposer movement is effected by a corresponding magnet 192 mounted in a suitable rack 194 secured to the side plates of the punch unit. When energized, the magnet attracts an armature 196 downwardly which swings an integrally formed lever 198 counterclockwise, as seen in Fig. 2b, to draw on a link 200 which, in turn, draws the interposer against the oscillating bail.

The rearward edges of the respective interposers are cut away to form a notch 202, and the interposer which has been drawn rearwardly against the bail receives the plate 190 in this notch and thereafter moves downwardly with the bail to thereby move the corresponding punch downwardly to where it perforates the corresponding column index point position presently at the punching station. Overthrow of the punch is prevented by the plate 178 lying in the cut-away region of the respective punch. In the subsequent upward movement of the punch bail, the interposer follows with it and eventually strikes the cam surface 204 of a bar 206 which effects a forward displacement of the interposer sufficient to withdraw the notch from about the bail, thus permitting continued upward movement of the bail without the respective interposer and punch. The rearward edge of the interposer above the notch, however, is inclined rearwardly, so that the continued upward movement of the punch bail may assist the spring in withdrawing the interposer to its normal position by engaging this rearwardly and upwardly inclined interposer edge. The interposer comes to rest when the plate 178 engages the lower end of the cut-away region of the punch and the forward edge of the interposer engages the rear edge of the L-shaped bar 172.

Returning to the second pair of upper and lower feed rolls 158 and 160, it may be pointed out that the upper feed roll, as is usual with the transversely extending rolls and shafts in both units, is journalled at its ends in the left and right side plates 106 and 108. The lower feed roll, however, is mounted so that it may be moved away from the upper feed roll, specifically at those times that a card which has been moved through the punching station is to be returned therethrough for a second punching operation in a following cycle. Conveniently, the lower roll 160 is journalled at its respective ends on the intermediate portions of the levers 208 pivoted at their read ends on inwardly directed studs 210 secured to the respective side walls of the punch unit. The pivot points for these levers are generally horizontally in line with the axis of the rolls, so that when the levers are swung counterclockwise, as seen in Figs. 2b and 6, the lower feed roll is swung downwards from the upper feed roll to leave a space therebetween which conveniently permits the re-entry of the card from the rearward direction.

The lower feed roll, however, is yieldably urged upward toward the upper feed roll 158. To this end, a pair of shoes 212 (Fig. 6) formed with arcuate surfaces are mounted to bear against the shaft 160a between the respective pairs of feed rolls 160 mounted thereon, the pairs of feed rolls acting to hold the respective arcuate shoes against lateral shifting. The arcuate shoes are fixed to the upper ends of rods 214 which, at their lower ends, pass through suitable openings on a mounting bar 216 secured at its respective ends directly to the side plates 106 and 108. Each rod 214 is encompassed by a compression spring 218 which reacts between the bar and the shoe formed on the upper end of the rod to bias the shoe and the lower feed roll shaft 160a upwardly.

The separation of the feed rolls is effected at a desired point in a punch cycle by means of a pair of spaced single lobed cams 220 fixed to a shaft 222 which rotates once in each card punch cycle. These cams cooperate with corresponding rollers 224 rotatably mounted on the lower ends of corresponding extensions 208a of the levers 208 on which the shaft 160a carrying the lower feed rolls 160 is mounted. It can be seen that the position to which the lower feed rolls 160 are biased by the springs 218 is at all times determined by the contours of the cams 220. In the dwell position, the springs are free to urge the lower rolls into biased contact with the upper roll, but when the lobes of the cams are opposite the rollers 224 on the corresponding arms 208a, the arms are lowered to such a point that the lower feed rolls are displaced a distance from the upper feed roll sufficient to permit the free insertion of a card therebtween. It should be observed on Fig. 7 that at the end of a card feed cycle the lobes of the cams are opposite the rollers 224 and that, therefore, the feed rolls 158 and 160 are normally separated.

In order to guide properly the card being returned through the punching station for another punching operation, a pair of fingers 226 is provided to cooperate with the upper feed roll by engaging the underside of the card being returned. These fingers are fixed at their forward ends to a tubular member 228 rotatably mounted on studs 330 fixed to the interior surfaces of the side plates 106 and 108. A second pair of fingers 332 projects downwardly and forwardly and is respectively engaged by the upper ends of tension springs 334 attached at their other ends to the respective arms 208a. It can be seen that the tension springs 334 will urge the guide member 226 upwardly, and that this action will be enhanced when the feed rolls have been separated to permit the return of the card.

Figure 7:
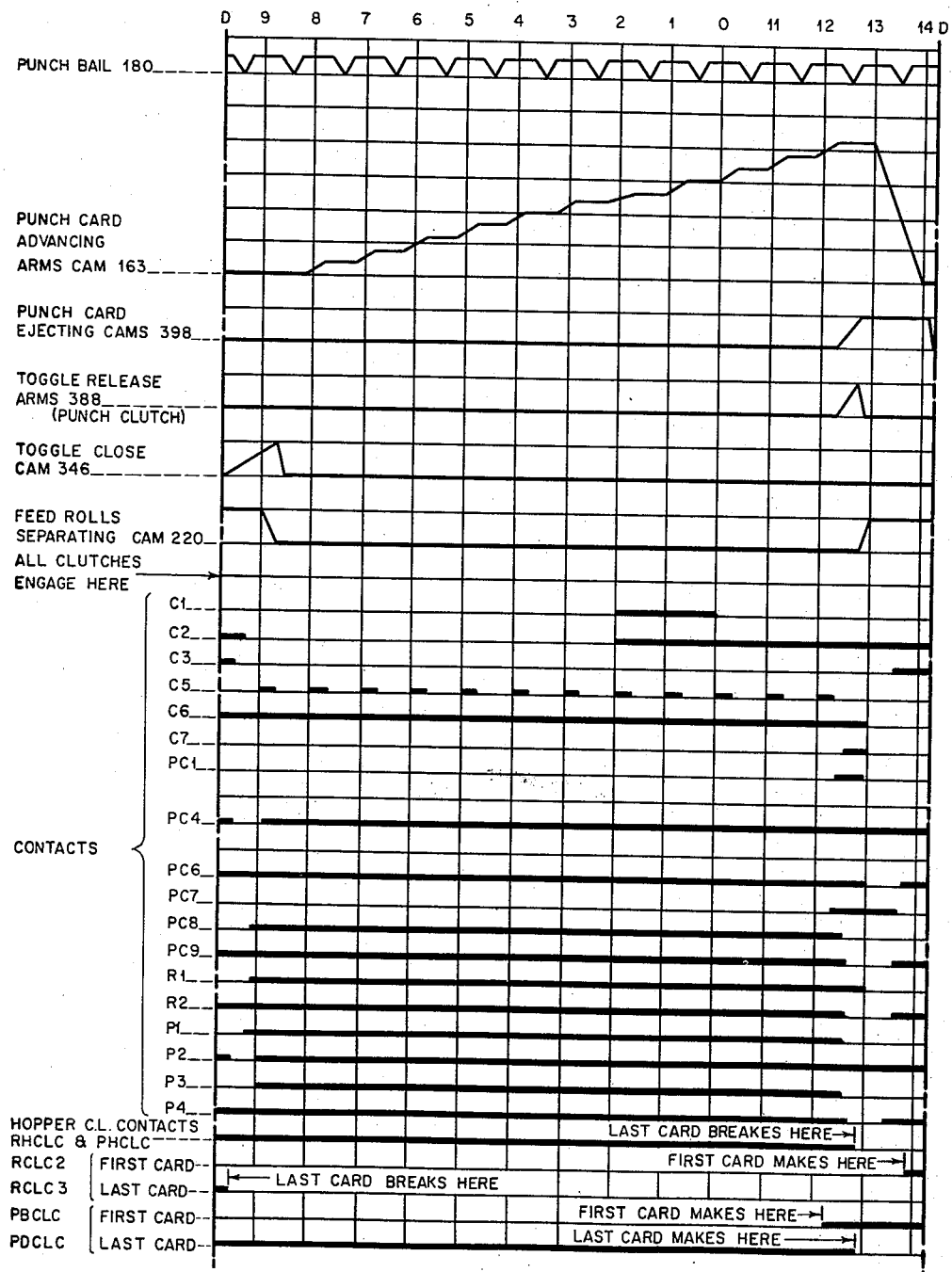
Figure 7 is a timing chart for various component parts of the construction embodying the invention.

The card at the punching station is so disposed that the first row of index point positions thereon is aligned with the punches 166 for perforation thereby. In order to present the remaining rows for perforation, the card is made to move with the arms 163 which are periodically stepped along during a punching cycle and restored near the end thereof, as shown in Fig. 7, through the action of a shaft 335 to which they are fixed. As was pointed out earlier, each arm 163 is bifurcated at its upper or free end to provide a slot, and this slot is traversed by a pin 336. On this pin is mounted a toggle lever 338 having a projection 338a adapted to cooperate with lips 163a extending forwardly from the upper ends of the arm 163 and above the card path so as to grasp the leading edge of the card for movement with the arms 163. Each toggle lever is movable between two positions, the one wherein the projection cooperates with the forwardly extending lips being denominated as the closed position, and the other position in which the toggle lever rests against a second pin 340 traversing the slot in the corresponding arm 163 being denominated as the open position. A toggle lever is yieldably held in either of these positions by a toggle spring 342 which is pivoted at one end on a third pin 344 traversing the slot in the corresponding arm and engages at its other or free end a recess formed in the underside of the toggle lever. The recess is so located that, when the toggle lever is in the closed position, the spring operates upon it to the left side (Fig. 6) of a common center line connecting the pivot points of the spring and the toggle lever, and when the toggle lever is in the open position, it operates upon recess on the right side of that line. Clearly, then, the spring will hold the toggle lever in whichever positon to which the toggle lever is moved.

The toggle levers are moved to the closed position from the open position during that time in the card punch cycle that various ones of the "9" index point positions in the first row of the card may be perforated. (The other eleven index point positions on a card, "8," "7" . . . "1," "0," "11," and "12," follow in that order.) Single lobed cams 346, one for each toggle lever, effect the shifting of the toggle levers to where the springs 342 move them to closed position. These cams are fixed to a shaft 348 which undergoes one revolution in those cycles wherein a punching operation may take place. These cams cooperate with rollers 350 mounted on pusher arms 352 movable from a normal inoperative position to a position in which the upper ends thereof strike laterally projecting studs 354 fixed to forwardly projecting fingers of the toggle levers. The push bars are held in aligned relationship with the respective studs on the toggle levers by means of a transversely extending rod 356 fixed at its ends to the side plates of the punch unit and received in elongated slots 358 formed in each push bar. The lower ends of these push bars are slotted so as to be snugly yet slidably received in corresponding annular grooves 360 formed on shaft 348. A spring 362 cooperating between a stud 364 projecting laterally from the upper end of each push bar and the rod 356 urges the respective push bar downwardly to where the roller mounted thereto rests upon the corresponding cam. In the normal and dwell position of these cams, the upper ends of these push bars are clear of the studs on the toggle levers. However, when the lobes of these cams come opposite the rollers, the push bars are moved upwardly to where they strike the toggle lever studs 354 to move the toggle levers to where the springs 342 move them to closed position.

The step-by-step movement of the card advancing arms 163 is effected by a cam 366 (Figs. 2b, 3b, and 7). This cam is fixed to a part of the shaft 348 extending beyond the right side plate 108 and therefore is rotated during a punching cycle. It is provided with a number of step portions equal in number to the index point positions (in this case twelve) in each column of a card and of progressively increasing radius from the shaft 348. The cam controls the arms 163 through a cooperating roller 368 adapted to ride on its surface and mounted upon the lower free end of a depending arm 370 fixed to the shaft 335 upon which the arms 163 are fixed. The arms 163 are made to follow the contour of the cam by a coil spring 372 which embraces the shaft 335 and has one free end overlapping the depending arm 370. Its other free end is placed in biased engagement with a suitable reaction part or stud 374 fixed to the exterior of the right side plate of the punch unit. It will be evident that the spring may be so constructed that it will at all times bias the cam engaging roller to follow the contour of the cam 366. As steps of progressively increasing radii are brought by the counterclockwise (Fig. 2b) rotating cam opposite the roller on the arm 370, the depending arm will be progressively rotated clockwise, and since this arm is fixed to the shaft 335, which is in turn fixed to the arms 163, the arms will be advanced in step-by-step fashion to draw an engaged card through the punching station so as to present successive index point positions thereon to the punches for perforation thereby. When the cam presents its step of greatest radius, it will have advanced the card to where the last index point positions thereon may be perforated by the punches, and if a second punching operation is to be performed, the card will be returned by the action of the roller dropping off of this high point of the cam. The stepping action of the cam may be clearly appreciated by considering the timing chart of Fig. 7.

In order to stabilize the movement of the card as it is moved in an arcuate path by the gripper arms, a pair of cooperating guides 376 and 378 are provided. As shown in Fig. 2b and in greater detail in Figs. 5 and 6, these guide members are curved so as to confine card movement to the path imposed on the leading edge of the card by the swinging arms 163. The lower guide member 378 lies between the two arms 163 and is rigidly secured in place by bolts 380 (Fig. 6) holding a down-turned lip on the forward end thereof against the backside of the transversely extending die member 162. The upper guide member 376 is pivotally mounted at its forward end for counterclockwise swinging movement by means of portions curved to form a tube (Figs. 2b, 5 and 6) which is received on studs 382 projecting inwardly from the left and right side plates of the punch unit. The upper guide member extends across the entire card path, being cut out, however, to accommodate the swingable arms 163. It is pivotally mounted to enable it to be shifted upwards for purposes of guiding the card, which has been punched for the last time, to the eject rolls 384 and 386.

In a cycle which is to be the last one wherein a particular card is moved through the punching station, a pair of arms 388 normally positioned as shown in Figs. 2b and 6 is rotated counterclockwise through one revolution. These arms are fixed to a shaft 390 so as to be located laterally inward of the corresponding arms 163 and at their outer or free ends are formed with out-turned portions 388a which will strike the inturned studs 354 mounted on the forwardly extending fingers of the toggle levers when the arms have advanced the card to where the last row of index point positions thereon is at the punching station. The action of these laterally out-turned portions 388a is such as to rotate the toggle levers counterclockwise, as seen in Fig. 6, to where the toggle springs 342 are effective to move the toggle levers to the open position, thereby releasing the card from the grasp of the arms 163. The final portion of the movement of the toggle levers to open position is accomplished by the toggle springs and moves the studs on the toggle levers from in front of the laterally out-turned portions on the respective arms, thereby enabling the arms 388 to continue their movement to their normal positions.

At the same time that the card is released from the grip of the arms 163, two laterally spaced rolls 392 are brought up against the underside of it to raise it and the upper guide 376 in order to feed it to the eject rolls 384 and 386. The rolls 392 are respectively mounted, exteriorly of the arms 163, on rotatable shafts 393 carried by the laterally inturned free ends of arms 394 located outside of the punch unit side plates and pivotally mounted at their lower and rearward ends on exteriors of the shaft 386a mounting the roll 386 of the eject rolls. The laterally inturned portions of the arms 394 and the shafts 393 extend into the interior of the punch unit through openings 396 formed in the side plates. It will be appreciated that the rolls 392 are free to enage the card and react against the upper guide 376 because the lower guide member 378 extends only between the two card advancing arms 163.

The swinging of the arms 394 is effected through corresponding cams 398 fixed to a shaft 400 which complete one revolution at the same time that the toggle lever releasing arms 388 complete their revolution. These cams are each formed with a single high dwell which strikes rollers 402 mounted on the free ends of lugs 404 fixed to the arms 394 near the end of the cycle so as to move the feed rolls 392 upwards. The effective time of the cams is shown in Fig. 7 and is sufficiently long to enable the rolls to advance the card into the eject rolls. Conveniently, a secondary guide member 406 is mounted in front of the upper eject roll 384 to guide the card from the guide member 376 and into the eject rolls.

The eject rolls 384 and 386 rotate simultaneously with the two rolls 392 and advance the card into the upperly and forwardly directed chute of a stacker generally indicated by the numeral 408. The stacker is a container which is closed on its front and rear and left sides and is mounted at the rear end of the punch unit. Its right hand or open side is located opposite a cut away area of the rear leg 114 of the right side plate to permit access to it. It includes a yieldably supported member 410 which is provided with a diagonal plate 410a upon which cards received from the eject rolls are stacked. This plate drops down under additional cards, so that the upper level of the cards is just below the mouth of the chute and so as to provide a minimum of free fall for the ejected cards which could otherwise result in their fluttering and improper stacking.

*Continuous drive mechanism*

Referring more particularly to Figs. 3, 4 and 5, the continuous drive for the machine originates with an electric motor 412 (Fig. 4a) suitably secured upon a platform 413 mounted upon the base casting 26 of the apparatus. A pulley 414, fixed to the left hand end of the motor shaft, engages one end of a belt 416 engaging at its other end a pulley 418 fixed to a shaft 420 journalled in the left side plate 106 of the punch unit and in an auxiliary side plate 422 spaced from the left side plate and mounted thereon by means of three stud bars 424, 426, and 428. (The auxiliary side plate is shown in phantom outline in Fig. 4a to facilitate disclosure of parts lying behind it in that view.)

The continuous drive is taken to the continually rotatable eccentric punch shaft 184 through a gear 430 fixed to the pulley shaft. This gear meshes with a gear 432 located rearwardly thereof on a stud 434 secured to the inner side of the auxiliary side plate 422. This gear, in turn, drives a gear 436 which is fixed to the left end of the eccentric punch shaft 184. It can be seen, therefore, that the punch bail will be oscillated, at the times indicated by the chart of Fig. 7, that is, once each cycle point, as long as the electric motor 412 is allowed to run.

A continuous drive is also provided to the drive element of a clutch controlling card feed elements of the punch unit. This drive also originates with the pulley shaft gear 430 which meshes with a large gear 438 mounted on a stud 440 secured forwardly of the pulley shaft to the inner side of the auxiliary side plate. Gear 438 is fixed to a sleeve 442 which, in turn, is fixed to a pinion gear 444, so that the two gears rotate together. The pinion gear drives a large gear 446 which is fixed to one end of a sleeve 448 rotatably mounted on the cam shaft 142 (Fig. 3b) for the punch unit card feed knife assemblies. To the sleeve 448 is also fixed the driving element 452a of the punch unit card feed clutch 452, and it can be seen that this driving element will be rotated as long as the motor 412 rotates.

In order to provide a drive to a clutch controlling the step-by-step advancement of a card through the punch station, a second gear 454 is mounted on the sleeve 448. Gear 454 meshes with a gear 456 rotatably mounted on a stud 458 fixed to the exterior side of the left side plate 106. This gear, in turn, drives a gear 460 rotatably mounted on the cam shaft 348. A sleeve 462, fixed to gear 460, is also fixed to the driving element 464a of the card advancing clutch 464, so that a continuous drive is always available to this clutch.

The drive to a clutch, which controls card feeding in the read unit, also originates with the sleeve 448 mounting the driving element of the punch unit card free clutch. A third gear 466, fixed to the sleeve for this purpose, imparts the continuous rotary movement of the motor 412 to a gear 468 rotatably supported on a stud 470 projecting from the read unit left side plate 28. Gear 468, in turn, meshes with another gear 472 rotatable on a second stud 474 projecting from the read unit left side plate 28, and this gear, in turn, drives a gear 476 rotatably mounted on the eccentric disc shaft 64. A sleeve 478, fixed to gear 476, carries at its other end the driving element 480a for a read unit card feed clutch 480.

The drive for a shaft 482 journalled in brackets 484 and carrying a series of cams for continuously operating a corresponding series of contacts prefixed with the letter C originates with the gear 476 because the shaft 482 is conveniently located at the forward end of the machine. Gear 476 drives a gear 486 rotatably mounted on a stud 488 projecting from the read unit left side plate 28. This gear, in turn, meshes with a gear 490 fixed to the cam shaft 482 to impart continuous rotation thereto. The "C" contacts are properly located along a transverse bar 492 in front of the cams on the shaft 482.

Clutch mechanism

Figure 8:
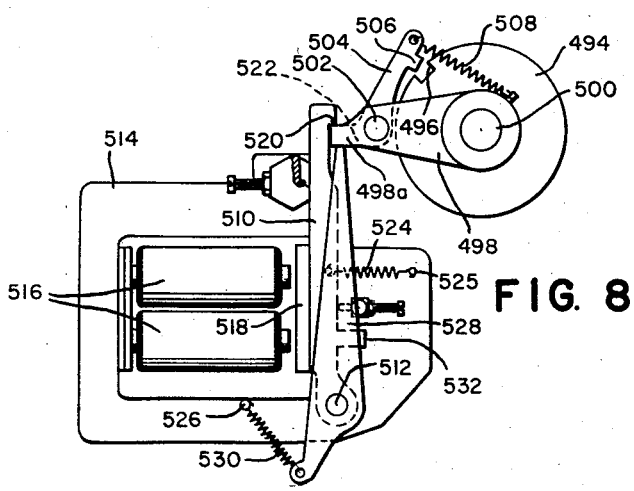
Figure 8 is a diagrammatic view of a typical clutch utilized in the embodiment.

A clutch typical of those employed in the machine will now be described. This description will be brief as the clutch is well known in the art, and is referred to here for purposes of recollection only. Referring more particularly to Fig. 8, such clutches include the aforementioned driving element which, in the embodiment disclosed, takes the form of a rotatable disc or ratchet 494 having a single square notch 496 on its periphery. The driven element of such a clutch comprises an arm 498 which is usually, though not necessarily, fixed to the shaft 500 on which the ratchet is rotatably mounted. The arm extends beyond the periphery of the ratchet and is provided at a point therebeyond with a laterally projecting stud 502 which overlies the perimeter of the ratchet and pivotally supports a pawl 504 formed on its free end with a square shaped tooth 506 adapted, when the pawl is unlatched or released, to ride on the surface of the ratchet until the notch 496 is disposed therebeneath. The tooth then drops in the notch through the urging of a spring 508 attached at one end to the free end of the pawl, and at its other end to a suitable lug fixed to the arm 498.

The pawl 504 is normally held out of engagement with the ratchet by a latch arm 510 pivoted on a stud 512 fixed to a plate 514. The latch is under the control of a magnet 516 also mounted on the plate 514. The magnet acts upon an armature 518 secured to the latch to attract the armature and swing the latch from a position in which a hook 520 on the end thereof holds a lug 522 formed on the clutch pawl, so that the pawl tooth is out of engagement with the ratchet. This unlatches the clutch to permit the pawl to move under the bias of spring 508 to where it rides on the surface of the ratchet. When the pawl tooth drops into the notch on the ratchet, the ratchet will pull the pawl and, hence, the clutch arm 498 around with it, thus effecting a driving of the driven element of the clutch.

The clutch may be disengaged and latched up at the end of any complete revolution of the driving and driven elements thereof by the release theretofore of the clutch latch through the deenergization of the magnet. The latch will move under the bias of a spring 524, attached at one end to it and at its other end to a second laterally projecting stud 525 fixed to the mounting plate 514, to where the hook formed on the end of it is again disposed in the path of the pawl lug 522. When the pawl lug strikes the latch hook 520, it will be rotated so that its tooth is withdrawn from the ratchet, thereby stopping the driving of the driven element of the clutch.

In order to prevent overthrow of the driven element, as well as to hold it in place during the times that the clutch is not engaged, the pawl arm 498 is also provided with a lug 498a which is engageable by the latch hook 520. Thus, the driven element of the clutch will be stopped at a precise point at the end of each operation. Rebound of this pawl arm due to impact with the latch hook is prevented by a keeper 528 also pivoted on the stud 512. The keeper is biased by a spring 530 to a point wherein it rests against a stop 532 carried by the latch arm 510 and its free end is disposed behind the pawl lug 522 and the pawl arm lug 498a when they engage the latch hook. It is depressed by the pawl lug and pawl arm lug as they rotate into position behind the hook, but as they engage the hook it slips behind them to securely hold them in place.

Drive for card feeding in punch unit

This drive originates with the punch unit card feed clutch 452, hereinafter also called the punch clutch, which, upon being unlatched and engaged, effects the simultaneous operation of the picker knife assemblies 122, the first pair of feed rolls 144 and 146, the contact roll 152, the second pair of feed rolls 158 and 160, the lower roll positioning shaft 222, the eject rolls 384 and 386, the swingable rolls 392, the roll swinging cam shaft 400, and the toggle releasing arm shaft 390 in the ensuing cycle. The precise times at which these instrumentalities and contacts, designated as "P" contacts, are operated in that ensuing cycle may be as shown in the timing chart of Fig. 7.

As was pointed out earlier, the punch clutch is mounted on the cam shaft 142. Conveniently, the driven element or pawl arm 452b of this clutch is fixed to the shaft to rotate it directly. Clearly, then, during each revolution of the clutch following energization of its magnet 452c (Fig. 4a), the shaft 142 will be rotated through one revolution to effect one reciprocation of the card feed knife assemblies and move the bottom card from the punch unit hopper and into the grasp of the first pair of feed rolls. The cams for operating the "P" contacts may also be mounted on this shaft.

The first pair of rolls will be continuously rotated during this cycle through a drive originating with a gear 534 (Fig. 3b) fixed to the shaft 142. This gear meshes with a gear 536 rotatably mounted on a stud 538 (Fig. 4a) projecting laterally from the left side plate 106 of the punch unit. A sleeve 540 (Fig. 3b) fixed at one end to this gear is also fixed to a second gear 542 so that both gears rotate together. The gear 542 meshes with a gear 544 fixed to the shaft 144a for upper feed rolls 144 to rotate it. The shaft 146a (Fig. 4a) for the lower feed rolls 146 is also positively driven by the meshing of a gear 546 fixed to the shaft 144a with a gear 548 fixed to the shaft 146a fixed to the roll. It should be remembered that the effect of one reciprocation of the feed knife assemblies and the rotation of the first pair of feed rolls for one operation of the punch clutch or cycle is such that the card fed will come to rest in a position in which it is part way through the feed rolls 144 and 146 and has just come onto the punch brushes PB. In the same cycle the feed rolls 144 and 146 will advance a card through the sensing station to where it is grasped by the rolls 158 and 160.

The contact roll 152 of the sensing station is driven whenever the punch clutch is operated to facilitate the movement of a card through the sensing station. The drive to this contact roll is taken off of the gear 548 on the shaft 146a for the lower feed rolls. A gear 550, mounted on a stud 552 projecting laterally from the side plate 106, meshes with gear 548 and with a gear 554 fixed to the end of the contact roll shaft 152a projecting through the left side plate.

The drive for the feed rolls 158 and 160 which pick up a card being moved through the sensing station by the feed rolls 144 and 146 originates with the gear 544 fixed to the shaft 144a for the upper feed rolls 144. Gear 544 also meshes with a gear 556 mounted on a stud 558 projecting laterally from the punch unit left side plate 106. In turn, gear 556 meshes with a gear 560 fixed to the shaft 158a for the upper rolls 158. Positive rotation of the lower feed rolls 160 is effected by a second gear 562 fixed to the upper feed roll shaft 158a interiorly of the gear 560 and in driving relationship with a gear 564 fixed to the shaft 160a for the lower feed roll 160. During one cycle or revolution of the punch clutch, the rolls will advance a card received from the rolls 144 and 146 completely through the sensing station and to a position in which it may be grasped by the arms 163 for advancement through the punching station in a succeeding cycle. The rolls advance the card to this position slightly before the end of the cycle so that the lower rolls 160 may be lowered to separate them from the upper rolls 158 before the punch clutch disengages and latches up.

The drive for the cam shaft 222, whose rotation is effective to lower the rolls 160, is taken off of the end of upper feed roll shaft 158a projecting through the right side plate 108 of the punch unit through a gear 566 (Figs. 2b, 3b, and 5) fixed to it. This gear meshes with a gear 568 mounted on a stud 570 fixed to the side plate 108. Gear 568, in turn, meshes with a gear 572 fixed to the cam shaft 222. The gearing between the punch clutch and the shaft 222 is such that the shaft completes one revolution for each clutch operation and that when the clutch latches up, the lobes on the cams 220 are opposite the rollers 224 on the arms 208a to hold the lower rolls 160 separated from the upper rolls 158.

A new card is fed to the punching station whenever the old card thereat is to be passed on to the stacker 408. Near the end of such a cycle, when the arms 163 have advanced the old card through the punching station, the toggle levers 338 are shifted by the arms 388 to release the old card. The drive to the toggle releasing arms, which, as pointed out earlier, completes one revolution in each punch clutch cycle, originates with the gear 560 fixed to the shaft 158a for the upper feed roll 158. Gear 560 also meshes with a gear 574 fixed to the inner end of a sleeve 576 which, at its outer end, is fixed to a gear 578. The sleeve is rotatably mounted on a stud 580 fixed to the side plate 106. The gear 578 meshes with a gear 582 fixed to a sleeve 584 rotatably mounted on a stud 586. A second gear 588 is fixed to sleeve 584 and meshes with a gear 590 fixed to the releasing arms shaft 390. The gearing between the punch clutch and the gear 590 is such that the shaft 390 completes one revolution concomitantly with the punch clutch driven element.

The old card released from the arms 163 is almost simultaneously swung above the arms 163 by the rolls 392 and then advanced thereby to the eject rolls 384 and 386. The rolls 392, it will be recalled, are mounted on arms 394 swingable about the axis of the shaft 386a for the lower feed rolls 386. Thus the drive for these feed rolls may conveniently be taken off of the shaft 386a and to this end each end thereof has fixed to it a gear 592. These gears mesh with gears 594 rotatable on suitable studs 596 projecting inwardly from the arms 394. Gears 594 drive the feed roll shafts 393 through gears 598 fixed to the exterior ends thereof. Feed rolls 392, therefore, are rotated whenever the eject rolls are rotated.

The arms are made to swing the rolls 392 into the old card through the simultaneous rotation of the cam shaft 400 with the releasing arm shaft 390. The drive to the shaft 400 is taken off of the gear 582 which is in the drive train for the shaft 390. Gear 582 meshes with a gear 600 fixed to the left end of the shaft 390.

The eject rolls 384 and 386, and hence the feed rolls 392, are operated by the punch clutch through the gear 574 in the trains to the shafts 390 and 400. This gear meshes with a gear 602 cut on the shaft 384a for the upper rolls 384. A gear 604 is also mounted on shaft 384a and meshes with the gear 592 fixed to the shaft 386a for the lower feed rolls 386.

*Drive for punch station card advancing mechanism*

This drive originates with the clutch 464, also referred to as the punch cam clutch since it controls the cam 366 which advances the card past punches 166 of the punch station. However, the clutch 464 also operates the third pair of feed rolls 90 and 92 and the stacker cam shaft 104a of the read unit as well as a set of contact operating cams. Rotation of the shaft 348 to which the cam 366 is fixed is effected directly by fixing the driven element 464b of the clutch directly thereto. Thus, when the clutch magnet 464c is pulsed and the clutch arm 464b completes one revolution, the card advancing cam 366 likewise completes one revolution.

The drive to the feed rolls 90 and 92 and stacker cam 104 of the read unit is effected through a gear 606 fixed to the cam shaft 348 inwardly of the clutch 464. This gear meshes with a gear 608 (Figs. 3b and 4a) fixed to a shaft 610 journalled in the punch unit side plate 106 and the auxiliary side plate 422. Adjacent the auxiliary side plate, a second gear 612 is fixed to the shaft 610, and this gear meshes with a gear 614 mounted on an inwardly projecting stud 616 fixed to the auxiliary side plate 422. Gear 614, in turn, drives a large gear 618 mounted on the outer end of the stud 470 projecting from the left side plate 28 of the read unit and also supporting the gear 468. Gear 618 meshes with a gear 619 fixed to the outer end of the shaft 90a for the upper feed rolls 90. A counter-rotation is imparted to the lower feed rolls 92 through meshing gears 620 and 622 fixed to the respective feed roll shafts 90a and 92a just exteriorly of the left side plate 28.

The drive to the read unit stacker cam 104 is taken off of the shaft 90a for the upper feed rolls 90 through a gear 624 fixed thereto. This gear meshes with an idler gear 626 rotatably mounted on a stud 628 projecting laterally from the side plate 28, and gear 626, in turn, drives a gear 630 fixed to the left hand end of the stacker cam shaft 104a projecting through the side plate.

Certain contacts, designated as the "PC" contacts, are operated during a punch cam clutch cycle. The cams for operating these contacts are mounted on a shaft 632 (Figs. 2a, 3a, and 4b) jornalled in the brackets 484 at the front end of the apparatus. The drive to this shaft is taken off of the large gear 618 on the stud 470 by a gear 634. Gear 634 is rotatably mounted on the outer end of the stud 474 also carrying the gear 472. It meshes with a gear 636 rotatably mounted on the picker knife assemblies eccentric disc shaft 64 of the read unit. This gear, in turn, drives a large gear 638 mounted on the outer end of the stud 488 also supporting the gear 486. Gear 638, in turn, drives the cam shaft 632 by meshing with a gear 640 fixed thereto. The gearing between the shaft 632 and the driven element 464b of the punch cam clutch is such that they make concomitant revolutions. The "PC" contacts are mounted on a bar 642 for operation by the respective cams located along the shaft 632.

*Drive for card feeding in read unit*

This drive originates with the read clutch 480 which operates the picker knife assemblies 50, the first pair of feed rolls 66 and 68, the contact roll 70 of the first sensing or control station, the second pair of feed rolls 76 and 78, and the contact roll 84 of the second sensing or read unit. Each time that its magnet 480c is pulsed to permit it to operate through one revolution or cycle, it rotates the picker knife shaft through one revolution to reciprocate the feed knife assemblies and operate the first pair of feed rolls to feed a bottom card from the hopper to where it is in front of the control station. It also operates the first pair of feed rolls, the contact roll 70, and the second pair of feed rolls to advance a card which was disposed in front of the control station in a previous cycle through that station and to a position in front of the read station. It also operates the second pair of feed rolls and the contact roll 84 of the read station to advance a card which was disposed in front of the read station in a previous cycle through the read station and into the grasp of third pair of feed or eject rolls 90 and 92 which are always rotated when the read clutch is operated because the punch cam clutch 464 is always operated with it. The drive to the eccentric disc shaft 64 is direct as the clutch unit is mounted thereon with the driven element or pawl arm 480b being fixed thereto. Thus, for each operation of the clutch through one revolution, there is a corresponding revolution of the eccentric disc shaft and reciprocation of the feed knife assemblies 50.

The drive to the first pair of feed rolls 66 and 68 is taken off of the eccentric disc shaft 64 through a gear 644 fixed thereto. This gear meshes with a gear 646 fixed to the shaft 66a for the upper feed rolls 66. The counter-rotation of the lower feed rolls 68 is effected through a gear 648 fixed to the shaft 66a inwardly of the gear 646 and meshing with a gear 650 fixed to the projecting end of the shaft 68a for the lower feed rolls 68.

The drive for the contact roll 70 of the first sensing or control station is also taken off of the gear 648 on the upper feed rolls shaft 66a. This gear meshes with a gear 652 rotatably mounted upon a stud 654 projecting laterally from the read unit side plate 28. Gear 652, in turn, drives the contact roll by engaging a gear 656 fixed to the projecting end of the contact roll shaft 70a. The drive to the second pair of feed rolls 76 and 78 is taken off of the large gear 646 on the shaft 66a for the upper feed rolls by a gear 658 rotatably mounted on a stud 660 projecting laterally from the side plate 28. This gear 658 drives the shaft 76a for the upper feed rolls 76 by meshing with a gear 662 fixed to it. Inwardly of gear 662, a second gear 664 is fixed to the shaft 76a and meshes with a gear 666 fixed to the projecting end of the lower feed rolls shaft 78a to drive the same. The contact roll 84 of the second sensing or read station is driven from the gear 664. This gear meshes with an idler gear 668 rotatably mounted on a stud 670 and meshing with a gear 672 fixed to the contact roll shaft 84a to drive the same. Certain contacts, designated the "R" contacts, are operated during a cycle in which the read clutch is operated and they can be controlled by suitable cams mounted on a shaft 674 having a gear 676 which meshes with the gear 644.

ELECTRICAL COMPONENTS

The electrical components of the machine, in addition to those already referred to, such as the various card lever and cam contacts, include manually settable controls for determining the type and manner of operation of the apparatus, electrically operated magnetic relays, and other miscellaneous components, such as stepping switches, emitters, etc. They are detailed below and may be identified on the various wiring diagrams of Figs. 10, 12, 14, 16, 18, and 20.

Controls

The manual controls provided on the machine are as listed below:

(1) *Main switch MS.*—This switch, when moved to a closed position, connects the apparatus with an external source of electrical current to which it has been plugged, resulting in the immediate energization of the motor 678 for a D. C. generator 680.

(2) *Operation selecting switch OSS.*—This is a four-armed switch movable between an "R" position in which it sets up the punch unit for a reproducing type of operation with the read unit and an "S" position in which it conditions the punch unit for a summary punching type of operation in association with an accounting machine, such as a tabulator.

(3) *Start key STK.*—Depressing this key completes a circuit which initiates operation of the apparatus.

(4) *Stop key SPK.*—Depression of this key opens a circuit which stops the operation of the apparatus.

(5) *Run-out key ROK.*—Depression of this key enables the apparatus to resume operations to process the remaining cards after it has come to a stop due to the emptying of one or more hoppers.

(6) *Reset switch RS.*—Depression of this switch closes a circuit which causes a stepping switch in the apparatus to restore to initial position.

(7) *Dial switch DS.*—This switch may be adjusted to any of a number of positions which respectively determine, in certain operations, the number of punchings that each consolidation card will be subjected to.

(8) *Summary punching-group indication-comparing switch SP–GI–CS.*—This two-armed switch is adjusted from a normal "off" position to "on" position for certain summary punching operations; in the "on" position the switch conditions the apparatus to detect changes in group identifying numbers.

(9) *Reproducing-group indication-comparing switch R–GI–CS.*—This switch is adjusted from a normal "off" position to an "on" position for certain reproducing operations; in the "on" position, it conditions the apparatus to detect changes in group identifying numbers.

(10) *Discrepancy switch DS.*—Depression of this switch reconditions the apparatus for operation after a discrepancy which stopped it has been corrected.

(11) *Plug wires PW.*—These wires terminate in jacks which are insertable in hubs electrically connected to different components of the machine; they provide a flexibility whereby many elements can be selectively chosen to control any of a number of other elements.

Mechanically operated contacts

The mechanically operated contacts in the machine are as follows:

| Designation | Function |
| --- | --- |
| Continually operating: | |
| C1 | Close circuit to relay R8. |
| C2 | (1) Open relay R8 hold circuit (2) open relay R25 hold circuit. |
| C3 | (1) Energize relay R9 (2) energize relay R24. |
| C5 | (1) Pulse all sensing brushes and C and PC emitters. |
| C6 | Open relay R24 hold circuit. |
| C7 | Pick up relay R25. |
| Emitter CE | Read out number in storage relays STU0-STU9, STT0-STT9, and STH0-STH9. [Distributor brush fixed to continuously rotatable shaft 482.] |
| Operated in Punch Cam Clutch Cycle: | |
| PC1 | Pulse stepping switch advance coil SSAC and reset coil SSRC. |
| PC4 | Open relay R15 hold circuit. |
| PC6 | (1) Open relay R11 hold coil circuit (2) open relay R23 hold coil circuit (3) open relay R22 hold coil circuit. |
| PC7 | Signal accounting machine (summary punching operation) of completion of consolidation card recording cycle. |
| PC8 | Set up punch magnet circuits. |
| PC9 | Open relay R7 hold circuit. |
| Emitter PCE | (1) Read out data collected in accumulators of an accounting machine during summary punching operations (2) Read out number in storage relays STU0-STU9, STT0-STT9, and STH0-STH9. [Distributor brush fixed to shaft 632 rotated during punch cam clutch cycle.] |
| Operated in Read Clutch Cycle: | |
| R1 | Close circuits to control and read brushes CB and RB. |
| R2 | Open relay R7 hold circuit. |
| Operated in Punch Clutch Cycle: | |
| P1 | Pick up relay R21. |
| P2 | Condition circuits of storage relays STU0-STU9, STT0-STT9, and STH0-STH9 hold coils. |
| P3 | Condition punch brush PB circuits. |
| P4 | Open relay R7 hold circuit. |
| Emitter PE1 | Serially condition pick-up coils of corresponding units (STU9-0), tens (STT9-0), and hundreds (STH9-0) orders of storage relays. Distributor brushes fixed to punch clutch shaft 142. |
| Emitter PE2 | |
| Emitter PE3 | |

Relays

Relays employed in the machine are as listed below, together with their designation, their energizing condition, the contacts controlled thereby, as well as the functions of the different contacts:

| Coil Designation | Energizing Condition | Contacts controlled | Function |
|---|---|---|---|
| R1 | Cards in read unit hopper. | R1A | Close relay R7 circuit through start key STK. |
|  |  | R1B | Close relay R7 hold circuit through stop key SPK. |
| R3 | Card at control brushes CB. | R3A | Close circuits to control brushes CB. |
| R4 | Card at read brushes RB. | R4A | Close relay R7 hold circuit through stop key SPK. |
|  |  | R4B | Close circuit to read brushes RB. |
|  |  | R4C | Condition stepping switch advance and reset coil circuits. |
|  |  | R4D | Condition relay R15 circuits. |
| R5 | Cards in punch unit hopper. | R5A | Close relay R7 circuit through start key STK. |
|  |  | R5B | Close relay R7 hold circuit through stop key SPK. |
| R6 | Card at punch brushes PB. | R6A | Close relay R7 circuit through stop key SPK. |
|  |  | R6B | Condition punch brush circuits. |
|  |  | R6C | Establish circuit to punch clutch magnet 452c when runout key ROK depressed. |
| R7 | Start key depressed. | R7A | Close drive motor 412 circuit. |
|  |  | R7B | Condition relay R8 circuit. |
|  |  | R7C | Close relay R7 hold circuits. |
|  |  | R7D | Condition circuits to all clutch magnets. |
| R8 | Fixed time in cycle period after start key STK depression. | R8A | Close relay R8 hold circuit. |
|  |  | R8B | (1) Condition relay R9 circuit (2) Condition relay R24 circuit. |
| R9 | Fixed time in cycle after relay R8 picked up. | R9A | Close circuits to clutch magnets. |
| R10 | Card at punching station. | R10A | Open circuit to punch clutch magnet 452c. |
|  |  | R10B | Condition circuits to stepping switch advance and reset coils. |
|  |  | R10C | Condition punch cam clutch magnet circuit. |
|  |  | R10D | Condition relay R24 pick-up circuit. |
| R11 | Consolidation card to be punched for last time in ensuing punch cam clutch cycle. | R11A | Close R11 hold coil circuit. |
|  |  | R11B | Transfer circuit from stepping switch advance coil to stepping switch reset coil. |
|  |  | R11C | Condition punch clutch magnet 452c circuit. |
| R12 | Differential coils effective when discrepancy in two group identification numbers being compared. | R12A | (1) Close relay R15 circuit or (2) Close relay R26 circuit or (3) Close relay R27 circuit. |
| R13 |  | R13A | (1) Close relay R15 circuit or (2) Close relay R26 circuit or (3) Close relay R27 circuit. |
| R14 |  | R14A | (1) Close relay R15 circuit or (2) Close relay R26 circuit or (3) Close relay R27 circuit. |
| R15 | Control change (Reproducing). | R15A | Open read clutch magnet 480c circuit. |
|  |  | R15B | Close relay R15 hold circuit. |
|  |  | R15C | Close relay R11 circuit. |
| R16 | Run-Out Key ROK Depressed. | R16A, R16B | Pick-up relay R7. Condition punch cam clutch magnet 464c circuit. |
|  |  | R16C | Condition punch clutch magnet 452c circuit. |
| R18 | Consolidation card to be punched first time and in first field or set of fields. | R18A–R18L | Condition circuits to punch magnets 192 for columns of first field or set of fields. |
| R19 | Consolidation card to be punched second time and in second field or set of fields. | R19A–R19I | Condition circuits to punch magnets 192 for columns of second field or set of fields. |
| R20 | Consolidation card to be punched third or last time and in third field or set of fields. | R20A–R20I | Condition circuits to punch magnets 192 for columns of third field or set of fields. |
| R21 | Fixed time in Punch Clutch Cycle. | R21A, R21B, R21C | Transfer circuits through one side of relays R12–R14 to permit comparison of number on consolidation card passing punch brushes PB with number on record card passing control brushes CB. |
|  |  | R21D, R21E, R21F | Condition circuits to pick up coils of storage relays STU0–STU9, STT0–STT9, and STH0–STH9, respectively, to permit entry of number on consolidation card passing punch brushes PB. |
| R22 | Major Control Break (Summary Punching). | R22A–C | Condition major total accumulator read-out circuits. |
|  |  | R22D | Close hold coil circuit. |
|  |  | R22E | Pick up relay R11. |
| R23 | Minor Control Break (Summary Punching). | R23A | Close hold coil circuit. |
|  |  | R23B | Close R7 circuit by shunting start key STK. |
|  |  | R23C | Condition PO clutch magnet 464c circuit. |
|  |  | R23D–M | Connect emitter PCE with accumulator's read-outs. |
|  |  | R23N | Pick up relay R11. |
|  |  | R23O | Close stepping switch coil circuits. |
|  |  | R23P | Condition relay R24 circuit. |
| R24 | Requirement in summary punching of cycle wherein consolidation card number compared with group identifying number of data to be punched. | R24A | Close relay R24 hold circuit. |
|  |  | R24B | Condition C emitter circuit. |
|  |  | R24C | Condition relay R25 circuit. |
| R25 | End of comparing cycle (Summary Punching). | R25A | Transfer C3 circuit from relay R24 to relay R9. |
|  |  | R25B | Close relay R25 hold circuit. |

| Coil Designation | Energizing Condition | Contacts controlled | Function |
|---|---|---|---|
| R26 | Discrepancy between numbers compared (Summary Punching). | R26A | Close relay R26 hold circuit. |
| | | R26B | Close relay R25 pick-up circuit. |
| | | R26C | Drop out relays R22 and R23. |
| | | R26D | Open accounting machine resume operation circuit. |
| | | R26E | Drop out relay R24. |
| | | R26F | Close red signal lamp circuit. |
| R27 | Discrepancy between numbers compared (Reproducing). | R27A | Close relay R27 hold circuit. |
| | | R27B | Close red signal lamp circuit. |
| | | R27C | Open relay R7 hold circuit through stop key SPK. |
| STU0–9: | | | |
| (Pick Coils) | Units Order of Identification. | STU0A–STU9A. | Close corresponding hold coil circuit. |
| (Hold Coils) | Number on Consolidation Card. | STU0B–STU9B | Condition corresponding read out circuit. |
| STT0–9: | | | |
| (Pick Coils) | Tens Order of Identification. | STT0A–STT9A | Close corresponding hold coil circuit. |
| (Hold Coils) | Number on Consolidation Card. | STT0B–STT9B | Condition corresponding read out circuit. |
| STH0–9: | | | |
| (Pick Coils) | Hundredths Order of Identification. | STH0A–STH9A | Close corresponding hold coil circuit. |
| (Hold Coils) | Number on Consolidation Card. | STH0B–STH9B | Condition corresponding read out circuit. |

*Miscellaneous electrical elements*

In addition to the drive motor 412 mentioned earlier in the mechanical description of the machine and the motor generator 678, 680 which starts up when the main switch MS is closed, the following electrical elements may also be found in the machine:

A red signal lamp to indicate discrepancy between two numbers being compared.

A capacitor 678 for pulsing the pick-up coil of relay R22 when a transfer switch 680 in the accounting machine is shifted upon a major control break.

Another capacitor 682 for pulsing the pick-up coil of relay R23 when a transfer switch 684 in the accounting machine is shifted upon a minor control break.

Two resistors 686 and 688 for slowly discharging the two capacitors 678 and 682 when the transfer switches 680 and 684 restore.

Figure 9:
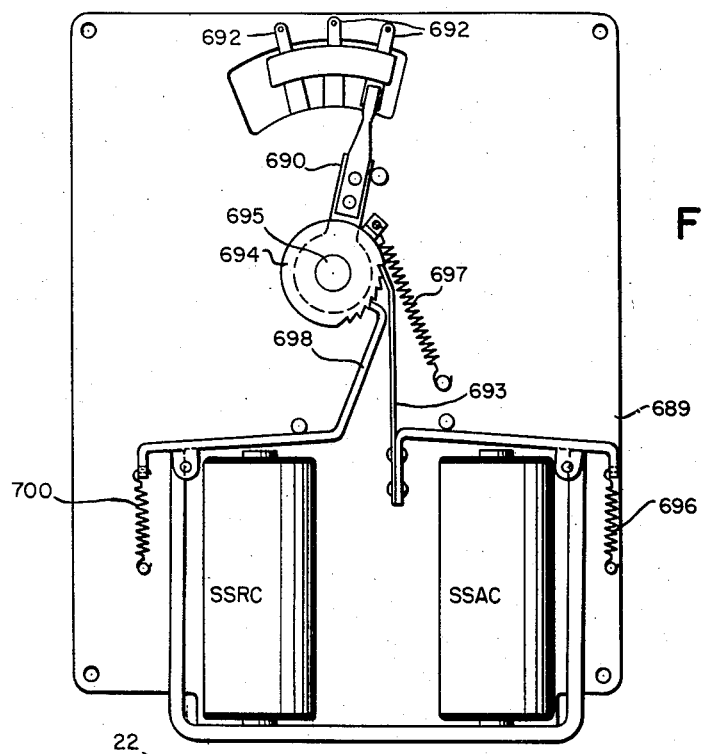
Figure 9 is a diagrammatic view of a stepping switch utilized in the embodiment.
Figure 1:
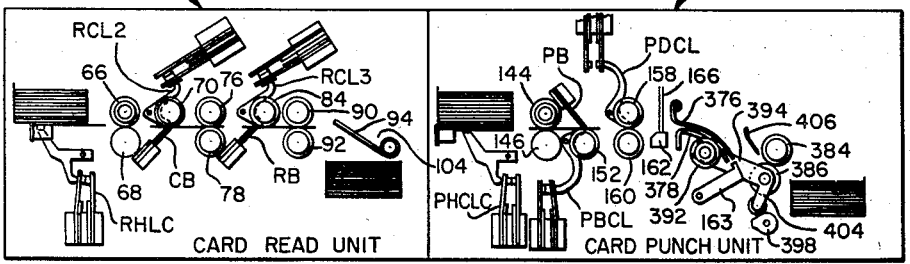

A two-arm stepping switch, the details of which are as follows:

Referring more particularly to Fig. 9, a typical stepping switch is shown therein as mounting coils or magnets SSAC and SSRC on a plate 689. The coil SSAC advances biased contact arms 690 (only one of which is shown, it being understood that the second arm could be mounted for integral movement and on the back side of the plate 689) to succeeding ones of series of contact members 692 each time it is energized by withdrawing an armature borne spring detent member 693 from one notch and depositing it in a succeeding notch of a disc 694 which is fixed to a shaft 695 fixed to the arms 690 and rotatable when the coil is deenergized by a spring 696 acting on the armature. The other coil SSRC, when energized, withdraws an armature stop pawl 698 out of engagement with the ratchet disc 695 and so as to strike the detent member 693 thereby withdrawing it also from the disc and permitting the disc and control arms to restore under the influence of spring 697. The armature stop pawl 698 restores, when the reset coil SSRC is dropped, through the action of the spring 700.

TIMING CHART

A cycle is a period of time required to complete a particular series of events, at the end of which the series is, or may be, repeated. In record controlled machines it usually is the time required for a corresponding point on a succeeding card to reach the same position, for example, the read brushes RB. In the instant machine, each cycle is divided into fourteen parts or points, each equal to the time it takes a feeding card to travel the distance (conventionally, one-fourth inch) between adjacent index point positions. The points are at the numbers which appear on the timing chart in the following sequence: 9, 8, 7, 6, 5, 4, 3, 2, 1, 0, 11, 12, 13, and 14. A card occupies thirteen points; thus in a fourteen point cycle, there is one point of space between the trailing edge of the leading card and the leading edge of the trailing card. Points 9 through 0 to 12 on a card correspond to the twelve reading and punching or index point positions of a card.

The machine employs a card cycle which is deemed to start and end at 9.8 points; thus, at the end of a card feed cycle, the cards come to rest with their leading edges projecting slightly beyond the sensing brushes and the die. Digit time is that time during which a digit or index point position is read and punched. The cycle timing for the various components of the apparatus are as shown in Fig. 7.

Since a cycle is determined by the period of time that it takes a trailing card to displace the preceding card, it follows that the read unit clutch 480 in one revolution or cycle feeds a bottom card from the read unit hopper to the control brushes CB and from there, in a second revolution, to the read brushes RB, and in a following revolution, past the read brushes. Similarly, the punch unit clutch 452 in one revolution advances a bottom card in the punch unit hopper to the punch brushes PB, and in a second revolution advances it to the die 162 of the punching station. The punch unit clutch, however, cannot advance the card past the die, and thus the punch cam clutch 464 is operated. Its time of operation also corresponds to that of a card feed cycle. It will step a consolidation card past the die so that the card digits are at the die at the same time that the corresponding digits of a record card pass the read brushes RB. It will restore the consolidation card past the die for another punching unless the punch clutch was simultaneously operated. Thus in the same cycle that it feeds a new card to the die, the punch clutch ejects the old card. It seizes control of the old card near the end of the punch cam clutch cycle just before the latter normally returns such a card through the die.

CIRCUIT DIAGRAMS AND OPERATIONS

As pointed out earlier, the invention is capable of embodiment in two distinct types of operations, and in each of these several distinct operations may be obtained. When the apparatus is used as a reproducing punch, the operations employed may consist of straight consolidation, consolidation by groups, and consolidation by groups on related cards. When the invention is embodied in an apparatus for summary punching, exemplary operations are as follows: Consolidation of predetermined numbers of minor group totals, consolidation of the minor group totals of respective major groups, and consolidation of the minor group totals of respective major groups on related cards.

*Reproducing-repetitive punch straight consolidation*

Referring more particularly to the wiring diagram disclosed in Fig. 10 and to the sequence of events chart shown in Fig. 11, it may be seen that power is supplied to the machine by A. C. lines 702 and 704. In order to set the machine up for operation, the main switch MS must be closed to connect the power to the lines 706 and 708 of the machine. These lines extend to the driving motor 678 for the generator set 680 which supplies direct current, preferably 40 volts, to the lines 714 and 716 of the apparatus.

In order to effect the straight consolidation, the operation selecting switch OSS is thrown to "R" position. The switch SP–GI–CS is thrown to "off" position, and so is the switch R–GI–CS. For purposes of showing the operation of the circuit, the dial switch has been arbitrarily set at 3, though it could be set at a lesser number, such as 2 and 1. The capacity of the dial switch has been arbitrarily limited to 3, as was pointed out earlier.

In straight consolidation with reproducing-repetitive punch, the data from a predetermined number (dial switch setting) of record cards are successively punched on each consolidation card. Thus all the plugging necessary is that which will connect the read brushes for the record card columns containing the data to be transcribed with the punch magnets 192 for the consolidation card columns in the successive fields to be punched. The plug wires (dashed lines) shown are those which will connect successive hubs for three read brushes with three different sets of contacts R18A–R18C, R19A–R19C, and R20A–R20C which are connected on their other sides by plug wires to the punch magnets for the columns in the desired fields. The sets of contacts are successively closed so that data from successive cards is punched into successive consolidation card fields.

The placement of cards in the read unit hopper depresses the associated card lever RHCL to close the card lever contacts RHCLC. The closing of these contacts results in the energization of relay R1, which is otherwise connected directly across the lines 714 and 716. The placement of cards in the punch unit hopper results in the energization of relay R5 because of the shifting of the associated hopper card lever PHCL which results in the closing of the card lever contacts PHCLC. The picking up of relays R1 and R5 results in the closing of the normally open contacts R1A and R5A, thus completing a circuit which sets the apparatus up for starting by the depression of the start key STK. The circuit is as follows: Line 714, the start key contacts, the R5A contacts, R1A contacts, relay R7, to line 716. The relay R7 will hold through contacts R7C, R2, P4, and PC9 until the end of the ensuing machine cycle. The picking up of relay R7 results in the closure of R7A points, thus completing a circuit through the driving motor 412 for the mechanically operated parts of the machine. The continuously running shafts of the machine will now be operated, and when the cam contact C1 is closed, a circuit will be completed from line 716, cam contacts C1, now closed contacts R7B, relay R8 to line 714. Relay R8 holds through the now closed R8A and C2 contacts.

The purpose of relay R8 is to insure that the machine is properly conditioned for the picking up of the read clutch 480 and the punch clutch 452. The magnets for these clutches are normally picked up when the R9A contacts are closed. The contacts R9A were closed when cam contacts C3 were closed to pick up relay R9. The circuit extended from line 716, through cam contacts C3, now closed contacts R8B, switch SP–GI–CS in off position, and relay R9 to line 714. If no provision existed for relay R8, the start key STK could be depressed while the contacts C3 are momentarily closed, with the result that insufficient time might exist to properly pulse the clutch magnets, thereby producing uncertain operation. Relay R8 insures that the full closed time of the contacts C3 is available to pulse the magnets because relay R7 must close the contacts R7B before the contacts C1 open earlier in the instant revolution of the continuously rotating shaft 482 to pick up relay R8. If the start key is depressed too late, it can pick up relay R8 in the following revolution of the shaft 482 if it is held depressed until the contacts C1 make again.

The punch and read clutch magnets 452c and 480c will, therefore, be picked up during the first revolution of the shaft 482 in which the relay R8 is picked up. The relay R8 will thus remain energized until the contacts C2 break a short time after the start of the next revolution of the shaft 482. The momentary closure of the R9A points completes a circuit from line 714, through the already closed R7D contacts, now closed R9A contacts, normally closed R15A contacts, and the read clutch magnet 480c to line 716. The momentary energization of the read clutch magnet will effect an unlatching of the read clutch which will engage shortly thereafter to start the first cycle as indicated on the sequence of events chart of Fig. 11.

A parallel circuit is completed through the punch clutch magnet 452c at the same time. This circuit extends from the now closed R9A points, through the normally closed R10A contacts, and the magnet 452c to the line 716. The energization of the clutch magnet immediately unlatches the clutch to permit its engagement simultaneously with the read clutch. It will thus be seen that, during the following or first machine cycle, a card will be fed in both the read unit and the punch unit. In the read unit the first record card will be fed from the bottom of the hopper to the control brushes CB. In the punch unit in the first machine cycle, the first consolidation card will be fed from the hopper to the punch brushes PB.

The first card in the punch unit arrives at the punch brushes at the end of the first machine cycle. Just before the end of the cycle, however, it operates the card lever PBCL to close the associated card lever contacts PBCLC, which place the relay R6 across the lines 714 and 716. In the read unit the first card also is operative just prior to the end of the cycle to shift the card lever RCL2. This results in the closure of the contacts RCLC2, which places the relay R3 across the lines 714 and 716.

The second machine cycle, which is necessary in order to advance the first card in the read unit to the read brushes and the first card in the punch unit to the die, is effected by depressing the start key again or by having held it depresed during the first machine cycle. If the start key was held depressed, the circuits will be completed during the first cycle as previously traced. The picking up of relay R9 at the end of the first cycle will result in the read clutch magnet and the punch clutch magnet again being energized. Thus in the second cycle the read and punch clutches will be operated.

In the second machine cycle the first card will be fed past the control brushes CB to the read brushes RB while the first card in the punch unit is fed past the punch brushes PB to the die 162. In the operation being discussed, the control brushes and punch brushes are not employed functionally and hence the data on the cards moving past them does not affect the operation of the machine. As these cards are fed to the read brushes and the die, however, the second card in the read unit will be fed to the control brushes, while the second card in the punch unit is fed to the punch brushes.

In the operation of the punch unit, it can be appreciated that, when there is to be a repunching of a card, it is undesirable to operate the punch unit clutch, so that the second card at the punch brushes will not be advanced to where it will interfere with the return movement of the first card through the die. In order to prevent the undesired operation of the punch clutch, while at the same time permitting the energization of the read clutch, the following is accomplished: During the second machine cycle, the first card in the punch unit shifts the die contact lever PDCL to close the die lever contacts PDCLC. The closing of these contacts completes a circuit between the lines 714 and 716 through the relay R10, which results in the opening of the R10A contacts in the circuit to the punch clutch magnet before the cam contacts C3 close to energize the relay R9 and close contacts R9A. Thus, when the R9A points close later in the third cycle, no circuit will be completed to magnet 452c. However, the R10C contacts will have closed to complete a circuit through the punch cam clutch magnet 464c. This circuit is as follows: From the now closed contacts R9A, through the now closed contacts R10C, the operations selecting switch OSS in the "R" position, the punch cam clutch magnet 464c to the line 716.

At the end of the second cycle, the machine also places itself in a self-operating condition, thus eliminating the need for holding the start key depressed after the initiation of the second cycle. Right at the end of the second machine cycle, the card lever contacts RCLC3 are closed by the arrival of the first card at the read brushes RB. This results in the picking up of relay R4 by connecting it across the lines 714 and 716. The energization of relay R4 closes the R4A points which completes a holding circuit for relay R7 also in series with the stop key SPK. This holding circuit extends from line 716 through relay R7, contacts R7C now closed, contacts R1B now closed, normally closed contacts R27C, now closed contacts R5B, now closed contacts R6A, now closed contacts R4A, and the normally closed stop key contacts, to line 714. It can be seen that the machine will now continue to operate as long as cards remain in the hoppers of both the punch unit and the read unit. On the other hand, the operation of the machine may be terminated at the end of any cycle by depressing the stop key to open the holding circuit for the relay R7. Relay R7 will be dropped then when one or more of the cam contacts R2, P4, and PC9 break.

In the third cycle, therefore, the first consolidation card will be advanced past the die 162 and punched at the same time that in the read unit the first card is fed past the read brushes; also the second card in the read unit will be fed from the bottom of the hopper into the control brushes CB. As the first consolidation card is fed through the die, the information read from the first record card by the read brushes will be transcribed digit by digit. The second card in the punch unit will wait at the punch brushes as the punch clutch is not being operated. The punching circuits through the read brushes RB and the punch magnets 192 will extend from line 714, circuit breaker contacts C5, contacts R1 closed during that portion of the machine cycle that the index point positions are moved past the read brushes and the punches 166, now closed contacts R4B, the contact roll 84 of the read unit, the read brushes RB, plug wires connected at one end to the brushes corresponding to the card columns containing the appropriate data, now closed relay contacts R18A through R18C connected to the other end of the plug wires, plug wires, corresponding punch magnets 192, cam contact PC8 closed only during the punching cycle and particularly during that portion of the punching cycle in which the index point positions pass the punches, to line 716. The relay R18 controlling the contacts R18A through R18C was energized because the first arm 690-1 of the stepping switch SS has a normal home position on the first segment which completes a circuit through the relay R18. This circuit extends from line 716, through stepping switch arm 690-1 in position 1, and relay R18, to line 714. The stepping switch SS is always restored to the first position before start key STK is depressed by depressing the reset switch RC which completes a circuit through the stepping switch reset coil SSRC.

Also in the third cycle, a circuit will also be completed through the stepping switch advance coil SSAC by the closure of cam contacts PC1. The circuit will extend from line 716, PC1 cam contacts, operations selecting switch OSS in the "R" position, now closed contacts R4C, now closed contacts R10B, non-transferred contacts R11B, and the stepping switch advance coil SSAC, to line 714. When the cam contact PC1 opens near the end of the cycle, the arms 690 of the stepping switch will be advanced from the first to the second position. Relay R19 will be picked up for the fourth cycle.

Since the dial switch was set to 3 and, as indicated before, requires that there be three passes over the die of a consolidation card before it is ejected, the first consolidation card must be returned through the die at the end of the third cycle, so that it may be punched for a second time in the fourth cycle. Thus, the second card in the punch unit will remain at the punch brushes. In the read unit, however, the first card will have passed through the read brushes and to the stacker, the second card will have been fed to the read brushes, while the third card was advanced to the control brushes.

Accordingly, at the end of the third cycle the read clutch and punch cam clutch magnets 480c and 464c will be energized through the circuits previously traced. The information that is on the second record card will be punched into a second field of the first consolidation card during the fourth cycle. This time the punching circuits will extend through plug wires from the read brushes RB to the now closed relay contacts R19A through R19C and through additional plug wires to the punch magnets for the second field. Relay contacts R19A through R19C will now be closed because the arm 690-1 of the stepping switch is on the second position. At the end of the fourth cycle, the stepping switch arm will be advanced from the second to the third position through the same circuits that were used to energize the stepping switch advance coil SSAC during the third cycle in its movement from the first to the second position. When the arm 690-1 of the stepping switch contacts the third position, relay R19 will have been dropped and relay R20 picked up to close circuits R20A–R20C.

At the same time, the second stepping switch arm 690-2 will have moved to the third position to complete a circuit from line 716 through the third arm of the operations selecting switch OSS3 in "R" position, third position of the stepping switch, wire connection to the third position of the dial switch DS, dial switch, pick-up coil of relay R11 to line 714. The relay R11 holds by establishing a circuit through its hold coil, which can be traced from line 716, through normally closed contacts PC6, normally closed contacts R26C, now closed contacts R11A, and the hold coil of relay R11, to line 714. The contacts R11C are thus closed at the end of the fourth machine cycle and enable the energization of the punch clutch magnet 452c when the relay R9 is picked up to close the R9A contacts. The circuit will extend from contacts R9A through now closed contacts R11C, and the punch clutch magnet 452c to the line 716. All three clutch magnets will be pulsed near the end of the fourth cycle with the result that all three clutches operate in the fifth cycle.

In the fifth machine cycle, therefore, the first consolidation card will be fed past the punches for the third time, while the second consolidation card is fed to the die and the third consolidation card is fed to the punch brushes PB. In the read unit the third card will move past the read brushes, while the fourth card is moved past the control brushes to the read brushes and the fifth card is fed from the bottom of the hopper to the control brushes. Because relay R20 is energized during this fifth cycle, the contacts R20A through R20I will be closed, so that punching circuits will no longer extend through the now open R19A–C contacts, but instead, through the R20A to R20C contacts.

The stepping switch will be reset near the end of the fifth cycle. After the punching has been completed for that cycle, the cam contact PC1 is closed. A circuit will thus be completed from line 716, through the now closed PC1 contacts, the second arm of the operations selecting switch OSS2 in the "R" position, now closed R4C contacts, now closed R10B contacts, the now transferred points of the R11B contacts, and the stepping switch reset coil SSRC, to the line 714. During the resetting of the stepping switch, the relay R11 is maintained energized by a hold circuit through the R11A contact points. This circuit also includes the normally closed R26C contacts and the normally closed PC6 cam contacts. The hold circuit prevents the deenergization of the relay R11 the instant the arm 690-2 leaves the third position on its way back to the first position. Deenergization of the relay R11 would allow the R11 contacts to restore to their normal position too soon and possibly interfere with the restoration of the arms 690 due to inadvertent energization of the stepping switch advance coil SSAC. The relay R11 will be dropped when the contacts PC6 open near the end of the cycle. Thus by the end of the fifth cycle, the apparatus will be in condition to punch the next or second consolidation card with data contained in the fourth, fifth, and sixth record cards.

As has been pointed out, the dial switch has three positions in addition to the "off" position, and these were respectively denominated as 1, 2, and 3, and indicate the number of times that a consolidation card will be punched. The operation just explained assumed that the dial switch had been set on the third position. If the switch had been set on one of the other two positions, for example, the first position, each consolidation card would have been punched only once, and there would have been only straight reproducing. Referring more particularly to the wiring diagram, if the dial switch were set on the first position, relay R11 would be energized in every punching cycle. The R11C contacts would close every cycle to energize the punch clutch magnet 452c to eject the punched consolidation card and feed a succeeding one. If the dial switch had been set upon the second position, the relay R11 would be energized in every other cycle.

It may also be well to point out again that, while the dial switch has been shown as having only three positions, actually the number of positions it provided would be determined by commercial expediency. Assuming the extreme, the maximum number of fields could correspond to the total number of columns in a card; in the case of the standard IBM card, the total number of columns is eighty, and it can be appreciated that it is mechanically possible to provide a machine which will successively punch all eighty columns of a card.

In the sixth cycle, only the read and punch cam clutches 480 and 464 will be operated due to the dropping of relay R11 before the relay R9 was energized near the end of the fifth cycle. Thus in the sixth cycle, the new or second consolidation card will be punched for the first time with data read from the fourth record card passing the reading brushes. Other cycles will follow, and the apparatus will operate in the fashion described so long as cards remain in the hoppers of both the read unit and the punch unit. If the punch unit hopper should empty in a particular cycle, the punch magazine card lever contacts PHCLC will open to break the circuit through the relay R5. The dropping out of the relay R5 will open the contacts R5B in the stop key circuit, with the result that the relay R7 will be dropped out near the end of that cycle when one or more of the contacts R2, P4, and PC9 open. The dropping of the relay R7 stops the operation of the machine at the end of that cycle by opening up the R7D contacts, which breaks the circuits to the respective clutch magnets before the relay R9 is picked up to close the R9A contacts. The dropping of the R7 relay also results in the opening of the R7A contacts which breaks the circuit through the driving motor 412. The motor then coasts to a stop. It may be noted, however, that the motor 678 continues to drive the D. C. generator 680.

In practice, when such an event occurs and there are still cards in the read unit whose data is to be transcribed, additional cards would be placed in the punch unit hopper. This would result in the closing of the punch magazine card lever contacts PHCLC again to pick up the relay R5. The energization of relay R5 would close the R5A contacts in the start key circuit, enabling the depression of the start key again to pick up the relay R7 and initiate operation of the machine. Continued operation of the machine would be insured by the closing of the R5B contacts in the stop key circuit.

In normal operations the machine is most likely to be brought to a stop by the emptying of the hopper of the read unit because three cards are fed from the read unit hopper for every one that is fed from the punch unit hopper. There occurs a cycle in which the last card is fed from the read unit hopper. When this occurs, the read magazine card lever contacts RHCLC shift to open the circuit through relay R1. The dropping of the relay R1 effects the opening of the R1A contacts in the stop key circuit, with the result that the operation of the apparatus will cease at the end of that cycle when one or more of the R2, P4, and PC9 contacts open to drop out the relay R7. Further operation of the machine by the depression of the start key circuit cannot be obtained due to the opening of the contacts R5A in the start key circuit.

It will be apparent that the machine may be conditioned for further operation if additional cards are placed in the read unit hopper. This would result in the picking up of the relay R1 again, which would close the R1A and R1B contacts respectively in the start key and stop key circuits. A depression of a start key thereafter would result in continued operation of the machine, the relay R7 again holding through the stop key circuit.

Turning now, however, to the situation in which the card just fed from the read unit hopper constitutes the last of the record cards from which data is to be transcribed, it will be apparent that at least three more machine cycles are necessary to clear the read unit. It will also be apparent that if the punch unit is to be clear of cards at the end of operations, the punch unit hopper should be emptied at this time; it need not be emptied in order to clear the remaining record cards out of the read unit. Since the contacts R1A are now in an open condition, the depression of the start key STK cannot pick up the relay R7 to initiate another cycle. For this reason, the run-out key ROK is provided, and the depression thereof enables the cards remaining in the apparatus to be processed. The depression of key ROK completes a circuit through the relay R16. The picking up of relay R16 completes a circuit through the relay R7 by closing the R16A contacts. The picking up of relay R7 is effective as before to close the contacts R7D which enables the proper clutch magnets to be energized when the relay R9 is picked up near the end of the current revolution of the continuously rotating cam shaft 482. It will be evident that the read clutch magnet and the punch clutch magnet will be energized by the circuits previously traced and that this will cause the third last machine cycle to immediately ensue.

Whether or not the punch clutch 452 should be operated in the third last cycle depends upon the position to which the dial switch DS was set and the position to which the stepping switch arms 690 had advanced. Assuming that in the fourth last cycle the card in the punch unit had been punched for the first time, it would be clear that the stepping switch arms would be in the second positions. It is assumed that the dial switch would still be set to 3.

Summing up the operation of the fourth last cycle, it can be seen that during that cycle the following took place in the read unit: (1) the fourth last record card was ejected to the stacker by the operation of the punch cam clutch; (2) the third last record card was moved past the read brushes RB so that the data thereon could be transcribed on the consolidation card; (3) the second last record card was moved past the control brushes CB; (4) the last card in the read unit was fed from the hopper to the control brushes. In the punch unit the second last consolidation card was punched for the first time while the last consolidation card remains standing at the punch brushes, it being assumed that the hopper was emptied so that the punch unit will also be cleared of cards. The two clutches operated in this fourth last cycle were the read and punch cam ones.

In the third last cycle, initiated by depressing the key ROK, the third last card in the read unit is ejected while the second last card therein is fed past the read brushes and the last card is fed past the control brushes. Simultaneously, in the punch unit the second last consolidation card is punched for the second time, while the last card remains at the punch brushes. The punching circuits extend through the R19A, R19B, and R19C contacts. The relay R19 became energized at the end of the fourth last cycle when the stepping switch advanced from the first to the second position in the manner already made known. In this third last cycle, after the punching operations have been completed, the stepping switch arms will be advanced from the second to the third position, thus deenergizing the relay R19 and energizing the relays R20 and R11. The relay R11 will hold in the usual manner through the R11A contacts, the normally closed R26C contacts, and the normally closed PC6 contacts.

In order to effect the second last cycle, the runout key must again be depressed. Conveniently, such a runout key is held depressed during the last cycles until the apparatus has been cleared of the cards; thus the last cycles immediately follow each other, too. Relay R16 remains energized for the duration to hold closed the contacts R16A and thereby maintain the relay R7 in an energized condition to close the R7D contacts. It results that when the relays R8 and R9 are picked up at the end of each cycle, the circuits can be completed through the different clutch magnets. The energization of the relay R11 in the third last cycle would also cause the punch clutch magnet 452c to be picked up at the end of that cycle together with the read and punch clutch magnets 480c and 464c. Thus, in the second last cycle the second last record card in the read unit would be ejected, while the last card therein is fed past the read brushes. In the punch unit the second last consolidation card will be punched for the third time from data contained on the last card in the read unit and thereafter ejected. The last card in the punch unit would be moved past the punch brushes to the die. In this second last cycle the punch brush card lever contacts PBCLC would open to drop out the relay R6. Contacts R6C would thus restore to their normally closed position, thus conditioning a circuit through the punch clutch magnet 452c.

Continued depression of the run-out key would result in the immediate following of the last cycle. Only one card would remain in the respective units; the read unit card being that which has just been fed past the read brushes and resides between the third pair of feed rolls 90 and 92, the punch unit card being at the die station. In this last cycle all three clutches would now be operated, the read and punch cam clutch magnets being pulsed at the end of the second last cycle through the usual circuits. The punch clutch magnet 452c would be picked up through the recently closed R6C contacts, the circuit extending from contacts R9A, through contacts R16B, the fourth operations selecting switch arm OSS4 in the "R" position, contacts R6C, contacts R16C, and the punch clutch magnet 452c, to line 716. Operation of the read clutch is not required in this last cycle but does take place and does no harm. No punching can occur in this cycle from erroneous readings that may take place at the read brushes RB because the relay R4 was dropped when the card lever contacts RCLC3 opened late in the second last cycle to open the R4B contacts in the circuit to the read brushes. The run-out key may now be released once the last cycle has been initiated. The machine will stop at the end of this cycle because the R16A points open to drop out the relay R7 controlling the normally open R7D points in circuit with all of the clutch magnets. Dropping of relay R7 also opens the R7A points to deenergize the driving motor 412. The motor 678 drives the generator 680, however, as long as the main switch MS remains closed.

A condition may arise in which the last record card passes the read brushes RB before the consolidation card at the die has been punched the number of times to which the dial switch was set. If the punch unit hopper was emptied as earlier assumed, the partially punched card would have been ejected anyway because punch unit clutch magnet would have been picked up just before the start of the last cycle by the closing of a circuit from line 716, through the punch unit clutch magnet 452c, now closed R16C contacts, normally closed R6C contacts, fourth operations selecting switch arm OSS4 in "R" position, now closed R16B contacts, R9A contacts, and R7D contacts, to line 714.

In the event that the punch hopper had not been emptied, the punch clutch would not be operated as the card at the punch brushes would have kept relay R6 energized and thus contacts R6C open. The partially punched card can be ejected, however, by holding the run-out key depressed until the machine has been sent through a number of cycles sufficient to advance the stepping switch to the level at which the dial switch was set. Then relay R11 will be picked up to close the contacts R11C and place the punch clutch magnet 452c in circuit with the contacts R9A and R7D. Spurious punchings would not occur during these cycles because the dropping of relay R4 would have opened contacts R4B to break the circuit through the read brushes.

*Consolidation by groups*

This is an example of reproducing repetitive operations in which the record cards bear numbers identifying the group to which they belong and data from respective groups of record cards are transcribed onto respective consolidation cards. As long as successive ones of the record or master cards bear the same control number, the data thereon are punched on the same consolidation card. Upon a change in the control number, the old card is ejected and a new card is fed to the punching station.

In this example, therefore, the cards placed in the hopper of the read unit are arranged in numbered groups; each cards bears a control number representative of its group. The information on the cards of one group is punched into successive fields of one consolidation card, the number of punchings being equal to the number of cards in the group. While, as in the aforedescribed type of operation, the number of fields may be determined by the capacity of the card, in the wiring diagram shown in Fig. 12, the number of punchings has been arbitrarily limited to three fields; the information bearing fields have also been arbitrarily limited to three columns. Therefore, the control number is limited to numbers of three digits. It will be obvious, though, that the number of cards as well as the size of the fields may be increased according to the demands of a particular situation. The wiring described is intended to be representative only. The cards of a group must all be associated together, of course, and it will be apparent that the number of cards in the punch hopper should at least equal the number of groups of cards placed in the read hopper.

The apparatus is set up by closing the main switch MS which places the motor generator unit in operation as before. All other electrical controls are placed in the same condition as in the previous operation except the dial switch DS. Since the number of times that a card will be punched will be determined by the number of cards in the group, the dial switch is no longer needed to determine the number of times that a consolidation card will be punched. Therefore, it is thrown to the "off" position. (It may be placed on any number, however, if it is desired to fix the maximum number of punchings per consolidation card and cause the excess to be effected on the next one.) It will be evident, therefore, that the operations selecting switch OSS is in the "R" position and that the SP—GI—CS and the R—GI—CS switches are in the "off" condition. Plug wires may make the same connections disclosed in the previously described operation.

With cards present in both hoppers of the apparatus, the apparatus will be in condition for operation. Relays R1 and R5 will have been picked up to close the contacts R1A and R5A in the start key circuit and the contacts R1B and R5B in the stop key circuit. Depression of the start key STK now will pick up the relay R7 to close the R7A contacts and start the operation of the driving motor 412. Relays R8 and R9 will be picked up in the usual manner to close the R9A contacts to complete the circuits through the read and punch clutch magnets 480c and 452c. No circuit will be completed through the punch cam clutch magnet 464c at this time because the R10C contacts are open due to the lack of a consolidation card at the punching station.

The engagement of the read and punch clutches initiates the first cycle (see Fig. 13). In this first cycle, the bottom card in the read unit hopper will be fed to the control brushes CB while the bottom card in the punch unit hopper is fed to the punch brushes PB. Relays R3 and R6 will be energized near the end of the first cycle when the cards close the control brush card lever contacts RCLC2 and the punch brush card lever contacts PBCLC, as shown by the timing chart of Fig. 7. If the start key was only momentarily depressed, R7 will drop out when the cam contacts R2 and P4 open near the end of the first cycle. The stop key circuit was ineffective to hold the relay R7 due to the open condition of the R4A contacts. Thus, the clutches latch up at the end of the first cycle, and the motor 412 coasts to a stop. The second cycle is effected by again depressing the start key STK. This results in the reenergization of the relay R7 and the subsequent energization of relays R8 and R9 to complete again the circuits through the read clutch and punch clutch magnets 480c and 452c. Thus, in the second cycle, the first record card in the read unit is fed to the read brushes RB, while the second card therein is fed to the control brushes CB. In the punch unit the first consolidation card is fed to the die, while the second card is fed to the punch brushes.

It may be pointed out at this point that detection of a change in the group control number is enabled by plugging the control and read brushes corresponding to the number bearing card columns to respective sides or coils of corresponding differentially wound relays. Thus, in this example, three brushes of the control ones are respectively connected to one side of the three differential relays R12, R13, and R14, while corresponding ones of three read brushes are respectively connected to the other side of these relays. Each relay coil is connected on its other side to the power line 716. In the second cycle, no card passes the read brushes while the first card passes the control brushes. The differentially wound relays will be effective, however, to shift contacts controlled by them. The circuits through the relays R12–R14 would be completed from line 714, through the periodically closed circuit breaker C5, cam contacts R1, now closed contacts R3A, the contact roll 70, the control brushes CB, and one coil of one or more of the differentially wound relays R12, R13, and R14, to the line 716. No canceling circuits would be completed from the read brushes to the other coils of the relays because the R4B contacts in series therewith are open due to the lack of a card at the read brushes.

The differentially wound relays R12 through R14 control, respectively, contacts R12A, R13A, and R14A, now in series with relay R15. Relay R15 controls a normally closed contact R15A in the read clutch magnet circuit, and hence prevents operation of the read clutch in the ensuing cycle. The purpose for this will become apparent later. However, at this time, that is, the second cycle, the energization of the relays R12, R13, and R14 is ineffective to pick up relay R15 because the R4D points in series with the relay R15 are not closed until a card is at the read brushes.

The machine stops at the end of the second cycle (unless, of course, the start key has been kept depressed) due to the dropping out of relay R7 near the end of the second cycle when the contacts R2 and P4 open. The clutches will latch up, and the motor will coast to a stop. Relays R4 and R10, however, are picked up near the end of the second cycle due to the arrival of the first record card at the read brushes and of the first consolidation card at the die 162. It should be observed that the read brush contacts RCLC3 close too late in the second cycle to pick up relay R4 in time to maintain a hold or stop circuit for the relay R7.

In order to start the third machine cycle, the start key must be depressed again. This will result in the picking up of the read clutch and punch cam clutch magnets 480c and 464c. The punch cam clutch magnet is pulsed at this time because of the closing of the R10C contacts in circuit therewith due to the arrival of the card at the die. The picking up of relay R10, however, is effective because of the opening of the R10A contacts to prevent energization of the punch clutch magnet 452c.

In this third cycle the first record card will be fed past the read brushes while the first consolidation card is fed past the die. The punching circuits during this cycle will extend from the read brushes RB through the now closed R18A, R18B, and R18C contacts to the punch magnets due to the fact that the arm 690–1 of the stepping switch will be in the first position. Also during this cycle as the record cards move past the control and read brushes, the control number on the first card will be compared with the control number in the second card. Assuming the control numbers on the first card and the second card to be the same, that is, that both cards belong to the same group, the differential relays R12 through R14 will be ineffective to close their corresponding contacts. Thus, relay R15 will not be energized to shift the R15A contacts, and prevent the operation of the read clutch 480 in the ensuing cycle.

Near the end of the cycle the stepping switch advance coil SSAC is energized by the usual circuit from line 716, cam contact PC1, second arm of the operations selecting switch OSS2 in the "R" position, now closed R4C contacts, now closed R10B contacts, the non-transferred contacts R11B, and the stepping switch advance coil SSAC to line 714. Thus, relay R18 would be dropped and relay R19 picked up through shifting of the stepping switch arm 690–1. Relay R7 would hold through the stop key circuit, and when relay R9 was picked up near the end of the third cycle, a circuit would again be completed through the read and punch cam clutch magnets 480c and 464c. Hence, the fourth cycle automatically follows.

In the fourth cycle the first consolidation card will be punched for the second time because the second record card in the read unit, which now passes the read brushes, belongs to the same group as the first card. The punching circuits will extend through the now closed R19A, R19B, and R19C contacts to the punch magnets 192 for the second field. The second card in the read unit will also be compared against the third card therein, and if it is assumed that the control number is still the same, it will be apparent that the differentially wound relays R12–R14 will not be effective to close the circuit through relay R15. Thus, this will be a three-card group, and the first consolidation card will be repunched again. The read and punch cam clutch magnets 480c and 464c will be energized near the end of the fourth cycle in the usual way. Also, the stepping switch arm 690–1 will be advanced to the third position, thus dropping the relay R19 and picking up the relay R20.

The fifth cycle begins when the read clutch and punch cam clutches engage. In this cycle the first consolidation card will be punched for the third time from data contained on the third record card passing the read brushes. The punching circuits will extend through the contacts R20A, R20B, and R20C. In the read unit the fourth card will move past the control brushes concurrently with the movement of the third card past the read brushes. The numbers on these cards will be compared by the differential relays, and if it is assumed that a control break occurs, that is, the fourth card bears a number different from that of the first three cards, one or more of the contacts R12A, R13A, or R14A will be closed to pick up relay R15. The circuit will extend from line 716, one or more of the contacts R12A, R13A, and R14A, the second arm of the SP–GI–CS–2 switch in the off position, the R–GI–CS switch in the off position, relay R15, and contacts R4D, to line 714. Relay R15 will hold through the R15B contacts and the cam contact PC4. The contacts R15C also will be closed to energize relay R11, which will hold through the R11A contacts, normally closed R26A contacts, and cam contacts PC6. The picking up of relay R11 will transfer the R11B contacts to allow the energization of stepping switch reset coil SSRC when the cam contacts PC1 close near the end of the fifth cycle.

It may be noted that the control break effective to pick up the relay R11 and thus condition the circuit through the punch clutch magnet 452c occurred in the fifth cycle, which thus was too late to operate the punch clutch in that cycle. Therefore at the end of the fifth cycle, the first consolidation card will be returned past the die. It thus becomes necessary to send the machine through a cycle in which the read clutch is not engaged while the punch clutch and the punch cam clutch are engaged to eject the first consolidation card from the punching station and into the stacker. The interruption of the circuit to the read clutch magnet 480c was effected during the fifth cycle by the opening of the R15A contacts in series therewith when the relay R15 was picked up. Furthermore, the picking up of the relay R11 was effective to close the R11C contacts providing a circuit through the punch clutch magnet 452c. The circuit through the punch cam clutch magnet 464c is made in the usual manner through the R10C contacts. Thus, in the sixth cycle, which automatically follows the fifth cycle, the punch and punch cam clutches are operated but not the read clutch.

In this sixth cycle, no erroneous circuits will be completed through the read brushes or control brushes because the normally open cam contacts R1 will not be closed due to the unengaged condition of the read clutch. Relay R15 will drop out early in the sixth cycle when the cam contacts PC4 open the hold circuit. Relay R11 will be dropped out late in the sixth cycle when the cam contacts PC6 open to drop the hold coil. The late dropping of the relay R11 results in a second energization of the stepping switch reset coil, but this does no harm as the stepping switch is already in the restored position. It will be apparent that in the punch unit the second consolidation card was advanced to the die, while the third consolidation card was fed from the hopper and disposed at the punch brushes PB.

The seventh cycle automatically follows because relay R7 remained energized and relay R was picked up near the end of the sixth cycle. The read clutch magnet is picked up at the end of the sixth cycle because relay R15 was dropped permitting the R15A contacts to close. The punch cam clutch magnet will be picked up in the usual fashion. The dropping of the relay R11 resulted in the opening of the R11C contacts, so that the punch clutch magnet is not energized. In this seventh cycle, therefore, the fourth master card is fed past the read brushes, while the second consolidation card is moved past the punches. The punching circuits, since the stepping switch was restored to the first position, extend through the R18A, R18B, and R18C contacts. Simultaneous with the movement of the fourth master card past the read brushes, there occurs the movement of the fifth master card past the control brushes. Assuming these cards to bear the same control numbers, that is, that they both belong to the same group, it will be evident that none of the differential relays R12, R13, or R14 are effective to close one or more of the associated contacts R12A, R13A, or R14A and pick up the relay R15. Thus in the next or eighth cycle, only the read and punch cam clutches will be engaged.

If it is assumed that the sixth card is the last card in the read unit, it will be evident that the next or eighth cycle of the machine does not immediately follow. The machine comes to a stop at the end of the seventh cycle due to the dropping of relay R1 when the read unit hopper empties. The dropping of relay R1 resulted in the opening of the R1B contacts in the stop key circuit, with the result that the relay R7 was dropped near the end of the seventh cycle when the contacts R2 and P4 opened. The dropping of relay R7 opens the contacts R7D in series with the various clutch magnets so that they cannot be energized when the contacts R9A are closed at the end of the seventh cycle.

At this point is may be well to point out that preferably the punch unit hopper is emptied so that it too may be cleared of cards. Thus it is assumed that the punch unit hopper is emptied after the seventh cycle, with the result that the relay R5 is dropped. Dropping of relay R5, of course, opens the contacts R5A in the start key circuit, but as this accomplished nothing that the dropping of relay R1 has not already done, this action is meaningless.

In order to feed the remaining cards through the machine, it is necessary to depress the run-out key ROK, since the contacts R1A and R5A are open in the start key circuit, and for purposes of this example, it is assumed that several momentary depressions of the start key are to be effected. The eighth cycle, therefore, will be initiated upon the first depression of the key ROK. Depression of the run-out key effects the energization of relay R7 in the usual manner, with the result that when relays R8 and R9 are picked up, circuits will be completed through the read clutch magnet and the punch cam clutch magnet, since these were set up for energization at the end of the seventh cycle. In the eighth cycle, therefore, the fifth card in the read unit will pass by the read brushes, and the data therefrom will be punched in the second field of the second consolidation card passing the punches for the second time. The punching circuits will extend through the relay contacts R19A, R19B, and R19C, since the stepping switch was advanced to the second position near the end of the seventh cycle.

At the same time that the fifth card is passing the read brushes, the sixth card is passing the control brushes. Assuming the fifth card to be the last one of a group of two, the sixth card will bear a different control number. This difference in the control numbers will effect a differential or effective energization of one or more of the relays R12, R13, and R14 to complete a circuit through the relay R15. The R15c contacts will close to pick up relay R11. Thus the circuit through the read clutch magnet will be opened due to the breaking of the contacts R15A while the circuit through the punch clutch magnet will be closed due to the making of the contacts R11C. However, the machine latches up at the end of the eighth cycle because the relay R7 drops out. The run-out key ROK must be depressed in order to initiate the ninth cycle.

In the ninth cycle the punch clutch and the punch cam clutch operate to eject the second consolidation card in the punch unit while advancing the third and last consolidation card to the die. Relays R15 and R11 are dropped in this ninth cycle because relay R7 drops again, and it results that the machine latches up at the end thereof. The R15A contacts in the circuit with the read clutch magnet are closed again while the R11C contacts in circuit with the punch clutch magnet are opened again. Thus, at the end of the ninth cycle the read clutch and the punch cam clutch magnets 480c and 452c are conditioned to be pulsed again to unlatch the respective clutches for engagement in the tenth cycle. No circuits were completed in the ninth cycle through the read brushes, as the cam contacts R1 remained open thereout.

During the tenth cycle, initiated by another depression of the run-out key ROK, the read clutch and the punch cam clutch are operated for the reasons explained. The sixth record card is moved past the read brushes while the third consolidation card is moved past the die. The punching circuits extend through the R18A, R18B, and R18C contacts. Since there is no card at the control brushes, relay R3 will have been dropped in the eighth cycle to open up the R3A contacts; circuits will be completed to only one side of the differentially wound relays R12, R13, and R14, with the result that the relays R15 and R11 are again picked up. Thus, when the machine latches up at the end of the tenth cycle, the R15A contacts in the read clutch magnet circuit will have been opened while the R11C contacts in the punch clutch magnet circuit will have been closed. The sixth record card will have moved through the brushes and be between the rolls 90 and 92 while the third consolidation card is back at the die.

The depression of the run-out key ROK this time effects an energization of the punch clutch magnet and the punch cam clutch magnet. It may be observed that operation of the read clutch is not needed as there no longer are any cards in the read unit which can be advanced by it. In the ensuing or eleventh cycle, the operation of the punch cam clutch will not only move the third consolidation card past the die but it will also operate the feed rolls 90 and 92 and the stacker cam 104 to move the sixth record card into the read unit stacker. The punch clutch will effect ejection of the third consolidation card after it has been moved past the die. Hence, when the machine latches up at the end of the eleventh cycle, it will be clear of cards in both the punch unit and the read unit.

The apparatus has just been described in representative operations under the control of number bearing record cards. It repunches the consolidation card as long as there is no break in the record card control number, and when such a break occurs, it undergoes a cycle in which no punching is undertaken, but rather the consolidation card is ejected and a new one brought up to the die. From a consideration of the operations above described, it will be readily apparent that the apparatus can handle any combination of differently sized groups, providing that sufficient cards are maintained in the punch unit hopper and the repeat punching capacity is not exceeded.

In consolidating data from record cards bearing group identifying numbers, it may be desired to record such numbers on the respective consolidation cards. Conveniently, this is accomplished by plugging the read brushes RB corresponding to the record card number containing columns to the punch magnets 192 corresponding to the consolidation card columns in which it is desired to record such number. Preferably, such connection is made through normally open contacts closed only in one punching cycle for a consolidation card.

The recording of the group identifying numbers on the consolidation cards may be effected whether the apparatus is operated under the control of the dial switch DS or according to breaks in the control numbers on the record cards. Representative plugging necessary to effect such recording is shown in Fig. 12d. Thus, the read brushes for the columns bearing the group numbers are plugged to operate punch magnets through relay contacts R18J, R18K, and R18L. The contacts R18J, R18K, and R18L are under the control of the same relay, R18, that closes the contacts R18A through R18I, and thus it can be seen that when the apparatus punches the first field in the consolidation card, it will also punch the group number in an auxiliary field therein. When other fields are being punched, contacts R18J, R18K, and R18L are open, thus preventing needless repetitive punching of the same number. It will be evident that the punching of this number in the consolidation card is independent of whether the apparatus is operating under the dial switch control or the break in the group number control, as under either system the stepping switch energizes the relay R18 only when punching a consolidation card for the first time.

*Consolidation by groups on related cards*

In this type of operation, the record cards and the consolidation cards bear numbers indicative of the group to which they belong. Data from a group of record cards is punched only in a consolidation card bearing the same group number. A predetermined number of record cards occurs in each group, and the dial switch DS is set to this number. It is a feature of this invention that if less than the usual number of record cards is present in a group, the apparatus will come to a stop and indicate the reason why. Fig. 14 is a pertinent wiring diagram, and Fig. 15 is a pertinent sequence of events chart.

In order to enable the machine to perform this type of operation, the reproducing-group indication-compare switch R–GI–CS, which has been in the "off" position in the previously described operations, is now thrown to the "on" position. The operations selecting switch OSS remains at the "R" position, while the summary punching-group indication-compare switch SP–GI–CS remains in the "off" position. As already pointed out, the dial switch DS is adjusted according to the number of record cards which should appear in each group.

As before, the machine would be placed in condition for operation by closing the main switch MS, which completes the circuit to the motor 678 driving the generator 680. At this point cards are or have been placed in the respective hoppers of the read unit and the punch unit. This has or does cause the shifting of the card levers RHCL and PHCL to where they close the card lever contacts RHCLC and PHCLC to respectively complete the circuits through the relays R1 and R5. The energization of relays R1 and R5 results in the closure of the contacts R1A and R5A to close the circuit through the start key.

Depression of the start key will now initiate operation. Assuming the start key to be momentarily depressed, a circuit will be completed through the relay R7 which will then hold through the now closed contacts R7C and the now closed cam contacts R2, P4, and PC9. Contacts R7A will be closed to complete a circuit through the driving motor 412. Contacts R7D will be closed to set up the circuits through the various clutch magnets.

A cycle will now follow as soon as one or more of the various clutch magnets are energized and engage. None of this can take place, however, until the relay R9 is picked up to close the R9A contacts in series along with the contacts R7D in the various clutch magnet circuits. Relay R9, however, cannot be picked up before the cam contacts C1 make to pick up relay R8. When the cam contacts C1 close, a circuit is completed from line 716, through the cam contacts C1, now closed contacts R7B, and relay R8, to line 714. Relay R8 will then hold through its R8A contacts in circuit with the now closed cam contacts C2. Relay R9 will make just before the start of the first cycle upon the closure of the C3 cam contacts in circuit with the now closed R8B contacts and relay R9. The picking up of the relay R9 just before the start of the cycle results in the closing of the R9A contacts, which completes the circuit to one or more of the various clutch magnets in time to permit their immediate engagement to effect the first cycle.

Viewing the wiring diagram of Fig. 14 more closely, it will be seen that a circuit will be completed to the read clutch magnet 480c through the normally closed R15A contacts and to the punch clutch magnet 452c through the normally closed R10A contacts. Thus, in the first cycle, the read clutch and the punch clutch are operated. Because of the operation of the read clutch and the punch clutch, the first record card will be fed from the read unit hopper to the control brushes, and the first consolidation card will be fed from the hopper to the punch brushes. Relays R3 and R6 will be picked up near the end of the cycle because of the shifting of the card lever contacts RCLC2 and the punch brush card lever contacts PBCLC. Relay R7 will drop out at the end of the cycle, however, when the cam contacts R2 and P4 break, for the reason that the R4A contacts in the stop key circuit have not closed because of the absence of a card at the read brushes. The contacts R7D in circuit with the various clutch magnets will be opened before the cam operated contact C3 is closed to pick up the relay R9 and close the R9A contacts also in circuit with the clutch magnets. Thus, the machine will come to a halt at the end of the first cycle, and the driving motor 412 will stop because of the opening of the R7A contacts in series with it.

In order to continue operation, it is again necessary to depress the start key STK. Relay R7 will again be energized, and circuits to various clutch magnets completed when the relays R8 and R9 are energized. The read clutch and the punch clutch magnets will be picked up again through the circuits traced for the first cycle, and the respective clutches will operate in the second cycle. In the read unit, the first record card will be advanced past the control brushes CB to the read brushes RB while the second card is fed from the hopper to the control brushes. In the punch unit, the first consolidation card will be fed past the punch brushes PB to the die 162 while the second card is fed from the hopper to the punch brushes.

In this second cycle, the group number already punched in the consolidation card is compared with the group number on the first record card. In order to accomplish this, the punch brushes corresponding to the consolidation card columns or field bearing the group number are respectively plug-connected to one side or coil of differential relays R12, R13, and R14 through corresponding normally open transfer contacts R21A, R21B, and R21C while the control brushes CB corresponding to the record card columns or field bearing the group number are respectively and directly plug-connected to the other side or coil of the differential relays R12, R13, and R14. The transfer contacts R21A, R21B, and R21C are controlled by relay R21 which is energized during a punch clutch cycle only by closing of the cam contacts P1. Since the punch clutch is always energized when a card is passing the punch brushes, it will be apparent that the number on the consolidation card passing the punch brushes will be compared with the number on the record card passing the control brushes. If the numbers are the same, the differential relays will have no effect on the corresponding contacts R12A, R13A, and R14A, with the result that no circuit will be completed through the switch SP–GI–CS in "off" position and reproducing-group indication-compare switch R–GI–CS in "on" position to energize the relay R27. On the other hand, if the numbers are different, one or more of the contacts R12A, R13A, and R14A will be closed to pick up the relay R27. Relay R27 will hold by closing its R27A contacts in series with the discrepancy switch DCS. The energization of relay R27 will also result in the opening of the R27C contacts in the stop key circuit, with the result that the machine will latch up at the end of whatever cycle a difference is detected between the group number on the consolidation card passing the punch brushes and on the record card passing the control brushes. Relay R27 will also close the R27B contacts in circuit with a red signal lamp to effect a lighting up of the same. The lighting of the signal lamp will indicate that a difference exists in a group number of the aforementioned cards.

At the same time that the group number on the consolidation card passing the punch brushes PB is being compared with the group number on the record card passing the control brushes CB, the consolidation card group number is also being stored for comparison with that on the next record card to pass the control brushes. Thus, the punch brushes, plug-connected to the transfer contacts R21A, R21B, and R21C, are also plug-connected through normally open contacts R21D, R21E, and R21F to the units, tens, and hundreds order columns of pick-up coils of the storage relays. Circuits through the particular pick-up coils of each order are serially set up by emitters which are operated when the punch clutch is operated: emitters PE1, PE2, and PE3 connecting the other sides of the pick-up coils for the units, tens, and hundreds orders relays STU0–STU9, STT0–STT9, and STH0–STH9, to the line 716. Since the contacts R21D, R21E, and R21F are also closed when the relay R21 is energized, it will be apparent that, whenever a consolidation card passes the punch brushes, the number thereon will be entered in the storage relays. The number is held in storage by the completion of circuits through hold coils corresponding to the pulsed pick-up coils. Each pick-up coil closes, when pulsed, a corresponding "A" contact, for example, pick-up coil for relay STU0 closes contacts STU0A which completes a circuit from line 714, through the contacts STU0A, the corresponding hold coil, and the cam contacts P2, to line 716. Contacts P2 remain closed for the remainder of this punch clutch cycle and open shortly after the start of the next punch clutch cycle. Thus, a number entered into the storage relays remains there until a new consolidation card is fed to the die. To enable reading out of the number in storage, each relay also closed corresponding "B" contacts to condition a circuit, the completion of which is a representation of the corresponding digit.

As the first cards in the read unit and the punch unit respectively approach the read brushes RB and the die 162, they depress the card levers RCL3 and PDCL to close the card lever contacts PCLC3 and PDCLC. This results in the energization of relays R4 and R10. The picking up of relay R10 opens the R10A contacts while closing the R10C contacts. It will thus be apparent that the apparatus is conditioned to pulse the read clutch magnet and the punch cam clutch magnet but not the punch clutch magnet at the end of the cycle. It will also be observed that the relay R4 is picked up in time to close the R4A contacts in the stop key circuit before one or more of the cam contacts R2 and PC9 are open.

If it is assumed that the number on the first consolidation card agrees with the number on the first record card, and it is so assumed, it will be apparent that none of the differential relays are rendered effective to close the associated contacts R12A, R13A, and R14A in the second cycle. Thus, relay R27 will not be picked up to stop the apparatus. The third cycle ensues automatically.

In the read unit during this third cycle, the first record card will be moved past the read brushes while the second card is moved past the control brushes. In the punch unit the first consolidation card will be advanced past the die while the second consolidation card is held at the punch brushes. The punch circuits will extend from the read brushes through the R18A, R18B, R18C contacts to the punch magnet 192 corresponding to the first field in the consolidation card.

It will be evident that the next card which will be moved past the read brushes is the second record card. The number on this card must agree with the number on the first card presently at the die if its data is to be recorded therein, and for this reason it is compared with the number of that card which was stored in the preceding cycle. This comparison is accomplished by pulsing the corresponding digit representing ones of each order of the storage relays "B" contacts in synchronism with the movement of the index point positions on the second card past the control brushes. These circuits would extend from line 714, through the read-out emitter PCE, which is operated whenever the punch cam clutch is operated, successive storage relay "B" contacts in each of the units, tens, and hundreds orders, the non-transferred points of the respective ones of relay contacts R21A, R21B, and R21C, coils of the respective differential relays R12, R13, and R14 to the other side of the line. If the number is the same, and it is so assumed, the circuits which would be closed are the same as those which would extend from the control brushes through the other coils of differential relays R12, R13, and R14 so that none of the differential relays are effective to close the contacts R12A, R13A, and R14A in circuit with the relay R27. Since the relay R27 will not be energized, the next or fourth cycle will automatically follow since the relay R7 will hold through the stop key circuit. The read clutch magnet and the punch cam clutch magnet will be energized near the end of the third cycle, and the stepping switch will advance from the first position to the second position so that the relay R18 is dropped while relay R19 is energized and the punching circuits for the next cycle extend through the contacts R19A, R19B, R19C.

The punching circuits, extending through the R19A, R19B, and R19C contacts, enable the data on the second record card to be punched in the second field of the first consolidation card during the fourth cycle. In the punch unit the second consolidation card remains at the punch brushes. In the read unit, while the second record card passes the read brushes, the third card moves past the control brushes and the fourth one moves to the control brushes. In moving past the control brushes the number on the third record card is compared with the first consolidation card number in storage, and if it is the same, and it is so assumed, it will be evident that the fifth cycle follows automatically. The stepping switch will be advanced to the third position so that relay R19 is dropped while relay R20 is energized and the punching circuits in the fifth cycle extend through the R20A, R20B, and R20C contacts. In the third position, the second arm 690–2 of the stepping switch will, with the dial switch DS adjusted to the third position, as was assumed, complete a circuit through the relay R11 in the usual manner. The energization of the relay R11 closes the contacts R11C, so that when the R9A contacts close near the end of the fourth cycle, the punch clutch magnet, as well as the read clutch and punch cam clutch magnets, will be energized.

In the fifth cycle, therefore, the first consolidation card will be moved past the die for the last time, while the second consolidation card is moved past the punch brushes. In the read unit the third record card will be moved past the read brushes while the fourth one is moved past the control brushes and the fifth one is moved to the control brushes. The data on the third record card will be punched in the third field of the first consolidation card via the R20A, R20B, and R20C punching circuits. The operation of the punch clutch during the fifth cycle effects the opening of the P2 cam contacts near the start thereof, with the result that the hold coils in the storage relays are dropped and the number stored therein erased. The contacts P2 close again, however, before any point positions on the second consolidation card pass the punch brushes, with the result that the number thereon will be entered into the storage relays. At the same time, the number thereon will be compared with the number of the fourth record card passing the control brushes, with the result that if the number is the same, and it is so assumed, none of the differential relays R12, R13, and R14 will be effective to close their associated contacts to pick up the relay R27 and stop the machine.

The energized condition of the relay R11 in this cycle results in the transferred condition of the R11B contacts, so that when the PC1 contacts close near the end of this cycle, the stepping switch reset coil is energized to restore the stepping switch to the first position. It will be apparent, therefore, that at the end of the fifth cycle the machine has restored itself to the condition that existed at the end of the second cycle when it was set up to punch for the first time the first consolidation card. The numbers on the consolidation card and on the record card were compared during this cycle, and since they are arbitrarily assumed to be the same, the sixth cycle will automatically ensue with the punching circuits set up to punch the first field in the second consolidation card. The stepping switch advance coil is dropped near the end of the fifth cycle when the cam contacts PC6 open to drop the relay R11, thus permitting a re-transfer of the R11B contacts. The dropping of relay R11 breaks the circuit through the punch clutch magnet 452c, with the result that only the read clutch and punch cam clutch magnets are energized.

In the sixth cycle, therefore, only the read clutch and the punch cam clutch are operated. In the punch unit the second consolidation card will be reciprocated past the die, while the third consolidation card awaits at the punch brushes. In the read unit the fourth record card is moved past the read brushes, and the data therefrom is punched in the second consolidation card via the R18A, R18B, and R18C contact punching circuits. The fifth record card is moved past the control brushes, while the sixth one is moved to the control brushes.

If it is now assumed that the second record card group is an incomplete group, specifically, that only the first card thereof, that is, the fourth record card, is present, then it will be apparent that the fifth card belongs to a different group and bears a different number. Consequently, during the sixth cycle, when the number on the fifth card is compared with the second consolidation card number in the storage relays, one or more of the differential relays R12, R13, and R14 will be energized to close their respective contacts R12A, R13A, and R14A. The closing of one or more of these contacts will pick up the relay R27. Relay R27 will hold by closing its R27A contacts also in circuit with the discrepancy switch DCS. At the same time, it will close R27B contacts, which will complete the circuit through the red signal lamp to indicate the reason why the apparatus stopped. The machine is halted at the end of the sixth cycle due to the opening of the R27C contacts in the stop key circuit, which causes the relay R7 controlling the R7D contacts in the various clutch magnet circuits to drop out when the R2 and PC9 cam contacts open.

When the machine comes to a stop as a result of an incomplete record card group, it is best to empty the hoppers of the read and the punch units so that the cards can be properly rearranged. The removal of the cards from these hoppers results in the shifting of the hopper card levers and the opening of the respective contacts, thereby dropping relays R1 and R5. The dropping of these relays opens the contacts R1A and R5A in the start key circuit so that the start key cannot be utilized to run out the cards in the apparatus. Hence, the run-out key ROK must be depressed, and this will complete a circuit through the relay R16. The picking up of relay R16 closes the R16A contacts to complete a circuit through the relay R7. As a result of relay R7 being energized, the R7D contacts in the common circuit with the respective clutch magnets are closed, as well as the R7B contacts in circuit with relay R8. Relay R8 is picked up when the contacts C1 close to close the contacts R8B in circuit with relay R9. Relay R9 closes when the contacts C3 close to complete the circuit from the line 714 through now closed contacts R7D, now closed contacts R9A to the clutch magnets. The read clutch magnet 480c will be picked up at this time because the contacts R15A are closed. The punch cam clutch magnet 464c will be energized through both the R10C contacts and the now closed R16B contacts. The punch clutch magnet 452c will not be energized because contacts R10A, R11C, and R6C are all open. It follows that in the seventh cycle, the fifth card at the read brushes will be advanced past the read brush while the sixth card is moved past the control brushes to the read brushes. In the punch unit the second consolidation card will be reciprocated past the die, while the third consolidation card remains at the punch brushes. When the cam contacts PC1 close near the end of the cycle, the stepping switch SS will be advanced to the third position in which its second arm 690-2 completes a circuit through the dial switch DS in the third position to pick up relay R11.

The apparatus will proceed into the eight cycle if the run-out key ROK has been held depressed, thus preventing the opening of the cam contacts R2 and PC9 near the end of the seventh cycle from dropping the relay R7. Relays R8 and R9 will be picked up so that circuits will again be completed to clutch magnets. Due to the picking up of the relay R11 in the seventh cycle, the punch clutch magnet 452c will be energized in addition to the read clutch and punch cam clutch magnets 480c and 464c because of the closing of the contacts R11C. Thus, when the eighth cycle is initiated, all three clutches will be engaged. In the read unit the sixth card will be fed past the read brushes RB, while in the punch unit the second consolidation card will be moved past the die and ejected to the stacker and the third one is advanced to the die.

If the run-out key ROK is still being held depressed, the apparatus will automatically proceed into the ninth cycle. This cycle is necessary to clear the apparatus of cards because the sixth record card in the read unit will be between the rolls 90 and 92 and the third consolidation card in the punch unit will be at the die. As in the seventh cycle, circuits will be completed to the magnets for all of the clutches; however, a different circuit is completed through punch clutch magnet 452c as the stepping switch SS was restored to first position due to the picking up of relay R11. The circuit through the magnet 452c extends from contacts R9A, contacts R16B, fourth operations selecting switch arm OSS4 in "R" position, contacts R6C now closed because there no longer is a card at punch brushes, and contacts R16C to the punch clutch magnet. In the ninth cycle, therefore, the sixth record card will be fed to the read unit stacker while the third consolidation card is fed to the punch unit stacker. The machine will latch up at the end of the ninth cycle with all of the cards out of the apparatus.

The process of consolidation may now be resumed. Presumably the discrepancy would be corrected so that consolidation could be continued from where it was left off. If the cards are placed in the respective hoppers, depression of the start key STK would initiate operation as described earlier.

Assuming now that no further discrepancies occurred, the apparatus would continue operating unitil one of the hoppers was emptied. Normally, this should occur in the punch unit hopper, as the last consolidation card would, in the ordinary course of events, be fed from that hopper while several record cards still remained in the read unit hopper. For convenience, then, two extra cards should be placed at the top of the consolidation cards in the punch unit hopper to prevent the apparatus from coming to a stop until the last record card has been fed from the read unit hopper. This event should occur during the fourth last cycle.

Because the read unit hopper has been emptied, the apparatus will latch up at the end of the fourth last cycle. This occurs because the emptying of the read unit hopper results in the shifting of the hopper card lever RHCL to where the corresponding card lever contacts RHCLC open to break the circuit through relay R1. The dropping of relay R1 results in the opening of the R1B contacts in the stop key circuit, which causes the relay R7 to drop out because the cam operated contacts R2 and PC9 open then. The dropping of relay R1 also opens the R1A contacts in the start key circuit, forcing further operation of the apparatus to be initiated through the run-out key ROK.

At this time the second blank or extra card that had been placed at the top of the consolidation cards and is now the only card in the punch unit hopper should be removed therefrom. This is not necessary but has the effect of eliminating an extra cycle to run it out of the punch unit after the other cards have been removed. In the fourth last cycle, the third last record card should have been advanced past the read brushes and the data thereon punched on the last consolidation card. The second last record card should have been advanced past the control brushes and the number thereon compared with that stored in the storage relay contacts and found equal. The last record card, the third of a group, should have been fed from the hopper to the control brushes. A blank card rests in front of the punch brushes PB.

The third last cycle follows automatically if the run-out key ROK is still depressed. Relays R16 and R7 remain energized and relays R8 and R9 are picked up at the end of the fourth last cycle, resulting in the picking up of the read clutch magnet 480c and the punch cam clutch magnet 464c. The second last record card will be advanced past the read brushes and the data thereon punched in the second field of the last consolidation card. The last record card will be advanced past the control brushes, and its number will be compared with the number in the storage relays and should be the same. The extra card at the punch brushes will remain thereat.

Assuming the run-out key ROK to have been held depressed, the second last cycle will immediately follow the third last cycle. In the third last cycle, however, in addition to the read clutch magnet and the punch cam clutch magnet, the punch clutch magnet would also have been energized due to the closing of the R11C contacts when the relay R11 was picked up due to the advancing of the stepping switch arm 690-2 to the third position. Thus, during the second last cycle all three clutches will be operated and the last record card will be advanced past the read brushes so that its data can be punched on the last consolidation card being advanced over the die. The last consolidation card will pass on to the stacker because the punch clutch was operated and the extra card in the punch unit that was resting at the punch brushes will be advanced to the die. The last record card in the read unit will be between the rolls 90 and 92 at the end of the cycle. Thus, one more cycle is needed to clear the apparatus of cards.

If the run-out key is still depressed, the magnets for all three clutches will again have been picked up at the end of the second last cycle. The circuit for the punch clutch magnet 452c will extend through the operations selecting switch arm OSS4 in the "R" position, contacts R6C and R16C instead of through the contacts R11C. The operation of the punch cam clutch and the punch clutch will result in the feeding of the extra card in the punch unit into the punch unit stacker. The operation of the read unit clutch will have no particular effect, but the last card in the read unit will be advanced to the stacker due to the operation of the punch cam clutch which controls the rolls 90 and 92 in the read unit. All of the cards will have now been processed.

*Summary-repetitive punch*

In summary punching, information accumulated in an accounting machine is from time to time punched in cards in a punching machine. Generally, the accounting machine contains accumulators which, upon a control break, are read out of and into the punching machine. A control break occurs when the data or total accumulated belongs to a group different from that of the data or total next to be accumulated. The first order of totals accumulated may be referred to as minor group totals while the second order of totals, that is, totals of groups of minor group totals, may be referred to as major group totals.

It is a feature of this invention that data or totals successively accumulated in accounting machines may, upon the occurrence of control breaks, be punched on successive fields of consolidation cards. Three different operations are described. In the first one, a predetermined number of data groups are successively punched on each consolidation card. The number of punchings which a card undergoes in this operation is controlled by the setting of the dial switch DS. In the second operation disclosed, all the minor groups of a major group are punched on one consolidation card; instead of the dial switch being employed to determine the number of successive punchings which a card will undergo, such determination is effected by a major control break in the accounting machine. Upon such a major control break, which occurs with the last minor control break, the total not only of the last minor group but also of the major group (sum of minor group totals) may be recorded. Provision may also be made in this operation for the recording of the major group identification number on the consolidation card. In the third operation, the consolidation cards placed in the punch unit already bear the numbers of the major groups to which they pertain. Therefore, it is essential that the cards in the punch unit be in the same order that the data is handled in the accounting machine. Comparison is made of the card number and the major group number before any punching is effected to assure that the data will be entered on the proper cards. If there is a lack of correspondence between the card number and the major group number, the apparatus stops and indicates why it has stopped.

*Consolidation of predetermined numbers of minor group totals*

In this operation (Figs. 16 and 17) the hopper of the read unit is left empty. In an accounting machine, such as a tabulator, data will be collected, as from record cards, into an accumulator therein. For the purposes of this operation, this accumulator will be the No. 1 one on the wiring diagram. Whenever a control change occurs in the data being accumulated, the accounting machine will transfer the contacts 684 so as to place a relay R23 across the lines 714 and 716 and in series with a capacitor 682. The relay R23 will thus be energized for a period partially determined by the length of time that is required to charge the capacitor 682.

The picking up of relay R23 is used to place the punch unit in operation. The punch unit will then undergo a cycle of operation in which the data stored in accumulator No. 1 will be read out and recorded in the first field of a consolidation card at the die. At the end of this punch unit cycle, the cam contacts PC7 in the punch unit will be momentarialy closed (see Fig. 7) to emit a signal to the accounting machine which will cause resumption of the tabulating operation; the punch unit itself ceases operation at the end of the cycle. Successive minor group breaks will cause successive cycles of operation of the repetitive punch. The number of times which a particular consolidation card will be punched will be determined by the setting of the dial switch DS, in the instant case, three. Thus, three minor groups will be recorded on a consolidation card before the next card is presented for punching.

In setting up the apparatus to perform these functions, the outputs of the accumulator No. 1, connected with the punch unit by plug wires and cable terminating in outlet hubs on a plugboard, would be connected by plug wires to the hubs of switches of the R18, R19, and R20 series. Since all of the data emits from the same accumulator but is punched in different fields of the consolidation cards, the outlet hubs for the accumulator are respectively connected to the R18A through R18C, the R19A through R19C, and the R20A through R20C switch hubs. The exit hubs of these switches would be connected to the punch magnets 192 corresponding to the fields in which it is desired to record the data.

For summary punching operations, the operations selecting switch OSS is thrown from the R position to the S position. The reproducing-group indication-compare switch R–GI–CS is thrown to the "off" position. For this particular summary punch operation, the summary punch-group indication-compare switch SP–GI–CS is also thrown to the "off" position. The dial switch DS is arbitrarily set to three.

Before operation of the accounting machine can be started, it is necessary to have a consolidation card at the die 162 of the punch unit. Accordingly, after a sufficient number of cards has been placed in the hopper of the punch unit, the start key is depressed. This completes a circuit through relay R7 because the placement of the cards in the punch unit hopper closed the card lever contacts PHCLC to pick up the relay R5 and close the contacts R5A in series with it, thereby initiating operation of the punch unit. The circuit will extend from line 714, through the start key STK, contacts R5A, the operations selecting switch first arm OSS1 in the S position, and relay R7, to line 716. The start key may be released and the relay R7 would hold until the end of the first cycle through the cam contacts R2, P4, and PC9. It would not hold through the stop key circuit as it did during reproducing operations because the normally open R1B contacts therein are not closed due to the lack of cards in the read unit hopper. Preferably, the start key will be held depressed until the second cycle of the punch unit has been begun so as to eliminate any delay.

The picking up of relay R7 initiates operation by closing the R7A contacts in circuit with the driving motor 412 and the R7B contacts in circuit with the relay R8. Relay R8 is picked up when the contacts C1 close and by closing contacts R8B in circuit with relay R9, enables the latter to be picked up through the cam contacts C3 and the summary punching-group indicating-compare switch first arm SP–GI–CS1 in the "off" position. Picking up of relay R9 closes the contacts R9A to complete circuits with various clutch magnets through the already closed R7D contacts. At this time circuits will be completed to the punch clutch magnet 452c through the normally closed R10A contacts and to the read clutch magnet 480c through the normally closed R15A contacts. The operation of the read clutch 480 is unnecessary, but on the other hand it does no harm. Its sole effect, as far as the operation of the punch unit is concerned, may reside in the operation of the cam contacts R2 in the hold circuit of relay R7, but this is immaterial as one or the other, if not both, of the cam contacts P4 and PC9 are also operated whenever the read clutch is operated in this type of operation.

The first cycle of the punch unit will be undergone when the punch clutch 452 engages. As a result of the punch clutch operation, the first card will be fed from the bottom of the stack of cards in the punch unit hopper and advanced to the punch brushes PB. The relay R6 will be picked up as a result of the disposition of a card at the punch brushes.

The second cycle will immediately follow the first one if the start key STK is being held depressed. Relay R8 is picked up in the latter half of the first cycle and upon the picking up of relay R9, the same circuits will again be completed to the punch clutch and read clutch magnets through the closed R9A and R7D contacts. In this second cycle the first consolidation card will be advanced to the die, while the second one will be advanced from the bottom of the hopper to the punch brushes. Because of a card at the die which closes the card lever contacts PDCLC, the relay R10 is picked up. This opens the R10A contacts in circuit with the punch clutch magnet. The R10C contacts will be closed; they are ineffective, however, to establish a circuit to the punch cam clutch magnet 464c through the operations selecting switch fourth arm OSS4 because the R6C contacts are open due to the presence of cards at the punch brushes. If the start key is released during the second cycle, before the R9 relay picks up at the end, circuits will not be completed to different ones of the clutch magnets because the R7D contacts will be open; then the punch unit will latch up at the end of the second cycle. Should the start key be held depressed throughout the second cycle, however, no further feeding of consolidation cards would ensue because of the opening of the R10A contacts. All that would happen is that the read clutch 480 would be sent through cycles which in no way disturb the condition of the punch unit. Thus, the operator would release the start key as soon as he detected that cards were no longer being fed from the punch unit hopper. The punch unit is now ready for operation in conjunction with the accounting machine; however, the reset switch RS would be depressed to insure that the stepping switch SS was in the first position thereby insuring that the first card would be punched for all positions to which the dial switch had been set.

The operation of the accounting machine would now be initiated in some suitable way. When a control break occurs (this may be identified as a minor group control break), the accounting machine would transfer contacts 684 to pulse the pick-up coil of relay R23. The hold coil of relay R23 will be energized through the R23A contacts in circuit with the normally closed R26C contacts and the cam contacts PC6.

The picking up of relay R23 initiates a cycle of operation of the punch unit, closing the contacts R23B to shunt the start key in circuit with the relay R7. The picking up of relay R7 will initiate the motor 412 operation by closing the R7A contacts and partially establish the circuits through the clutch magnets by closing the R7D contacts and finally establish the circuits through these clutch magnets by enabling the picking up of relays R8 and R9 in the usual manner to close the R9A contacts. The punch cam clutch magnet 464c will be energized at this time in addition to the read clutch magnet through the now closed R23C contacts. The operation of the punch cam clutch will effect the third cycle of the punch unit and advance the card step by step through the die in the usual manner. Because the punch clutch is not operated, the punch cam clutch will restore the consolidation card to the initial die position at the end of the cycle.

The punching of the data stored in the accumulator No. 1 is effected with the advance of the card in steps over the die by the completion of circuits from the emitter PCE to the read-out elements of the accumulator No. 1. The circuits through the read-out elements would extend from the line 714, through the cam contacts C5, the hub of the emitter PCE, the respective segments of that emitter, the respective contacts R23D through R23M, the respective read-outs of each order of accumulator No. 1, the outlet hubs for the respective orders, the respective plug wires, the respective hubs of contacts R18A through R18C, the other hubs of these contacts, respective plug wires, respective punch magnets 192 corresponding to a first field of the card, and the cam contacts PC8, to the line 716. Since the hub of the emitter PCE is synchronized with the advancement of consolidation cards through the die, the respective index point positions will be perforated whenever a read-out was accomplished at a corresponding time in the accumulator.

Near the end of the third cycle, the PC7 cam contacts momentarily close to deliver a pulse to the accounting machine over wires 730 and 732. A moment later the cam contacts PC6 open to stop the operation of the punch unit by dropping out the hold coil for the relay R23, and this in turn drops out the relay R7 due to the opening of the contacts R23B. Thus the R7D contacts are opened before the relay R9 makes at the end of the cycle with the result that another cycle does not ensue. Of course, the R7A contacts in the motor circuit are also opened with the result that the motor coasts to a stop. The motor and the rest of the punch unit parts have sufficient inertia to carry the machine through the end of the cycle. Before the PC6 contacts open to drop relay R23, the PC1 contacts make to energize the stepping switch advance coil SSAC through the contacts R23O. This advances the stepping switch SS from the first to the second position to drop the relay R18 and pick up the relay R19. The circuit through the advance coil SSAC extends from line 716, through the contacts PC1, the operations selecting switch second arm OSS2 in the S position, the now closed R23O contacts, the now closed R10B contacts, the non-transferred points of contacts R11B, and the advance coil SSAC, to the line 714. In this way the circuits from the accumulator will extend, in the next cycle, through the punch magnets for the second field of the consolidation card because the R18A through R18C contacts opened when the R19A through R19C contacts were closed.

The accounting machine will undergo another tabulating operation following the third cycle of the punch unit. The transferred points of contacts 684 will have been restored and the capacitor 682 will discharge through the resistor 688. The values of the capacitor and resistor are chosen so as to give the necessary pick-up pulse for the relay R23. Upon another control break, the tabulating machine will again transfer the contacts to pick up the relay R23. A second punching cycle, the fourth punch unit cycle, will ensure, the data read out of the accumulator being punched in the second field of the consolidation card. Near the end of the cycle, the cam contacts PC7 will again be momentarily closed to signal the accounting machine that that cycle is practically completed. The PC1 cam contacts will close to advance the stepping switch to the third position in which the relay R20 is picked up. The picking up of relay R20, together with the dropping of relay R19, sets up the contacts R20A through R20C to permit the data from the accumulator to be punched in the third field of the consolidation card in the next or fifth punch unit cycle. The advancement of the stepping switch to the third position also conditions the picking-up coil of the relay R11 in the next cycle because the dial switch DS is adjusted to the third position. Relay R11 is not picked up in this cycle because the PC6 contacts break to drop the relay R23 and open the contacts R23N in the relay R11 pick-up circuit before the stepping switch arm 690-2 is advanced to the third position by the action of the spring 696 (Fig. 9) after the advance coil SSAC is dropped.

At the end of the tabulating operation, the contacts 684 will again be transferred to pulse the pick-up coil of relay R23. Relay R23 holds in the usual manner and initiates a punch unit cycle through the closure of the contacts R23B. The punch cam clutch magnet 464c will be picked up as before. However, because the stepping switch is in the third position, the closure of the R23N contacts will have picked up the relay R11. Picking up of relay R11 results in the closure of the R11C contacts in circuit with the punch clutch magnet 452c. When the R7D and R9A contacts close, all three of the clutch magnets are pulsed. Thus, during the fifth cycle, the data will be punched in the third field of the consolidation card, and, thereafter, instead of being returned through the die, the card will be ejected into the punch unit stacker. The second card in the punch unit will be advanced to the die, while the third card is disposed at the punch brushes. Hence, in the next or sixth cycle of the punch unit, a new consolidation card will be punched. It will be punched in the first field because the stepping switch reset coil SSRC instead of the stepping switch advance coil SSAC was pulsed upon the closure of the PC1 contacts due to the transferred condition of the points of the R11B contacts. The PC7 contacts make at the end of the cycle as before to signal the accounting machine of the end of the cycle, and the PC6 contacts open as before to drop out the relay R23, before the relay R9 picks up, to stop the operation of the punch unit.

The apparatus described will undergo repeated operations of the type described until all of the tabulating machine operations have been completed unless an insufficient supply of cards has been placed in the punch unit hopper. If such an event should occur, relay R5 would be dropped, and the R5A contacts in the circuit with the R23B contacts shunting the start key would be opened, with the result that the punch unit would not undergo operaion when the contacts 684 were transferred to emit a signal from the accounting machine. The placement of additional cards in the hopper, however, would again result in the picking up of relay R5 and the closing of contacts R5A, with the result that the apparatus would proceed as before, as relay R23A holds whether or not cards are in the punch hopper.

If the apparatus comes to a stop as a result of the completion of the tabulating operations, the pulsing of the accounting machine at the end of a punch unit cycle by the closing of the PC7 contacts will fail to initiate further tabulating machine operations. Nor will relay R23 be energized again. No further punching will lbe necessary in the punch unit. However, there will be two cards in the passage through the punch unit, one of which may or may not be punched depending upon whether the last punching in the punch unit was the third punching of a card or not. Irrespective of what the punched condition of the card at the die is, in order to facilitate the clearance of the machine if such is desired, and generally this is so, the remaining cards in the punch unit hopper would be removed. Thus, the card at the die would be the second last card in the punch unit while the card at the punch brushes would constitute the last card. These cards are gotten out of the punch unit by depressing the run-out key ROK. Depression of the run-out key completes a circuit through the relay R16 which closes the R16A contacts to pick up the relay R7. If the run-out key is held depressed, all of the cards will be run out of the machine in succession. On the other hand, if the run-out key is only momentarily depressed, the relay R7 which holds through the cam contacts R2, P4, and PC9 will drop out at the end of the ensuing or second last cycle with one card still in the machine. In any event, the picking up of relay R7 will result in the picking up of the different ones of the clutch magnets in the usual manner. The read clutch magnet 480c will be operated as before through the relay contacts R15A. The circuit through the punch cam clutch magnet 464c will extend through the contacts R16B. The circuit through the punch clutch magnet 452c will extend through the R16C contacts, the operations selecting switch fourth arm OSS4 in the S position, and the R16B contacts. Thus, regardless of what stage the punching of the card at the die is in, it will be ejected onto the stacker, and the last card in the machine will be advanced to the die. The next cycle of the machine will follow immediately if the run-out key is still depressed and, because of the closure of the R16B and C contacts, will insure the ejection of the last card into the stacker. No more cards will be in the punch unit, and the operation will have been completed.

*Consolidation of minor group totals by major groups*

In this type of operation (Figs. 18 and 19), the determination of the number of times that a consolidation card will be punched is effected by a change in the major group control. Thus, a consolidation card will be punched in successive fields for each minor group, and when a major group change is detected, the consolidation card will be punched for the last time and ejected into the stacker while the next card is moved to the die. As an additional feature, the apparatus may be set up so that the total of the minor groups of the major groups is punched into the respective consolidation card along with the last minor group total. As another feature of the invention, the apparatus may be set up so that the identification number of the major group is also punched into the consolidation card, preferably during the recording of the first minor group total.

As was the case in the preceding operation, the accounting machine signals the punch unit of a minor group control break by transferring the contacts 684. Now, however, the accounting machine also signals the punch unit of a major group control break by transferring contacts 680. This connects the pick-up coil of relay R22 in series with capacitor 678. Such connection would enable the capacitor to charge up through the relay with the result that the pick-up coil of the relay is pulsed for a period partially determined by the charging-up time of the capacitor.

The accounting machine has been symbolically shown as having, in addition to the accumulator 1 already mentioned, accumulators 2 and 3. Accumulator 1 may be used to collect the respective minor group totals. Accumulator 2 would be used to collect the totals of the minor group totals, that is, the major group total. Accumulator 3 would store the identification number of the major group to which the instant minor groups pertain. The output of each order of these accumulators would be plug-connected to a cable which terminates at the outlet hubs of a plugboard for the punch unit. The outlets for accumulator No. 1, which collects the minor group totals, would be connected to the contacts R18A through R18C, R19A through R19C, and R20A through R20C. These contacts would be plug-connected on the other side to the magnets 192 controlling the punches for corresponding fields of consolidation cards. The outlet hubs for the accumulator No. 2 on the punch unit would be plug-connected to one side of contacts R22A through R22C. In turn, the other side of these contacts would be plug-connected to the magnets 192 controlling the punches corresponding to the fields of consolidation cards in which it is desired to record the major group totals. The output hubs for accumulator No. 3 would be plug-connected to one side of contacts such as R18J through R18L closed only when the first minor group total is being recorded. The other side of the contacts R18J through R18L are plug-connected to the magnets 192 which control the punches corresponding to the consolidation card field in which it is desired to record the major group indication number. It will be evident that the use of either or both of the accumulators 2 or 3 may be dispensed with to the end that only the minor group totals of each major group would be recorded.

As in the previously described operation, the operations selecting switch OSS would be in the S or summary punching position. The summary-punch group-indication compare switch SP–GI–CS and the reproducing group-indication compare switch R–GI–CS would remain in the "off" position. Since in this type of operation the number of minor group totals which will be recorded on a card is automatically determined by the number of minor groups in each major group, the dial switch is no longer needed and, accordingly, it is turned to the "off" position. If the main switch MS of the punch unit is closed and cards are placed in the hopper of the punch unit, the punch unit will be in condition for operation.

Depression of the start key STK is necessary to condition the punch unit for operation with the accounting machine. If the start key is held depressed until the second punch unit cycle is started, the bottom consolidation card in the hopper will be advanced to the die while the second card will be advanced to the punch brushes. The punch unit will now be in condition to record the first minor group total and also the major group indication number if desired, upon receiving the proper signals from the accounting machine.

The accounting machine would be placed in operation in the customary manner. When a minor group total had been collected in accumulator No. 1, the minor group control break would effect a transfer of the contacts 684 to pulse the pickup coil of relay R23. The hold coil of relay R23 would be picked up through the now closed R23A contacts, the normally closed R26C contacts, and the now closed cam contacts PC6. The punch unit would be placed in operation by the closing of the R23B contacts in circuit with the relay R7. Relay R7 holds not only through the R23B contacts but also through the now closed R7C contacts and the now closed cam contacts R2, P4, and PC9. The contacts R9A would be closed in the usual fashion along with the contacts R7D to pulse the punch cam clutch magnet 464c in the usual manner through the R23C contacts. The read clutch magnet 480c will also be picked up through the normally closed R15A contacts but, as was pointed out in the description of the preceding operation, the operation of the read clutch is superfluous and in no way affects the operation of the apparatus. Thus, the third punch unit cycle will ensue with the punching circuits extending from accumulator No. 1 through the R18A through R18C contacts and the magnets 192 for the punches corresponding to the field of the consolidation card in which it is desired to punch the first minor group total. The circuits extend through the R18 contacts because the stepping switch would have been placed in the first position by the depression of the reset key RS before the tabulating machine was placed in operation. This would have placed the arm 690-1 in circuit with the relay R18 to energize it. Thus, the R18A through R18C contacts would have been closed when the accounting machine signalled that a minor group total had been collected in accumulator No. 1. As in the previous operation, the reading out of the accumulator would have been effected through the R23D through R23M contacts by the read-out emitter PCE.

If it was desired to record the major group indication number and the plugging had been completed as earlier described, circuits would also have been completed through the R18J through R18L contacts to the punch magnets corresponding to the consolidation field in which the identification number is to be recorded. This number will be recorded only once, since the stepping switch will advance to the position in which it is in circuit with the relay R19 and out of circuit with the relay R18 when the cam contacts PC1 make near the end of the third cycle.

The punch unit will latch up at the end of the cycle and initiate operation of the tabulating machine by closing the cam contacts PC7 and opening the cam contacts PC6. The closing of the cam contacts PC7 signals the accounting machine through the normally closed R26D contacts that the punch unit has practically completed its cycle. Slightly later the cam contacts PC6 open to drop out the relay R23. This opens the R23B contacts in series with the relay R7, dropping it out before the relay R9 picks up and before the cam contacts PC9 and R2 close after a momentary opening. Contacts R7D will be open when the contacts R9A close so that no circuit will be completed through a clutch magnet of the punch unit to initiate an immediately succeeding cycle. The stepping switch was advanced to the second position, in which relay R19 is energized, by the closing of the cam contacts PC1 just before the relay R23 was dropped to open the contacts R23O. The circuit through the stepping switch advance coil SSAC would have extended from line 716 through cam contacts PC1, the operations selecting switch second arm OSS2 in the S position, the R23O contacts, the now closed R10B contacts, the non-transferred points of transfer contacts R11B, and the stepping switch advance coil SSAC, to line 714. Thus, when the punch unit completes the third cycle, it will latch up after having set up the punching circuits to extend through the R19A through C contacts during the next cycle.

The tabulating machine would now proceed until a second minor group total had been collected in accumulator No. 1. If it is assumed that a major group change does not occur at this time, then the contacts 684 alone will be transferred. The punch unit will operate through the fourth cycle recording the second minor group total in accumulator No. 1 through the contacts R19A through R19C into a second field of the first consolidation card. The punch unit will signal the accounting machine of the completion of the fourth cycle and set up the punching circuits to extend through the R20A through R20C contacts before latching up.

Further operation of the accounting machine will result in the collection of a third minor group total in accumulator No. 1. If it is assumed that, concurrently with the minor group control break, a major group control break also occurs, both of the contacts 684 and 680 will be transferred. Thus, the pick-up coils of relays R23 and R22 will be pulsed. Relay R23 will hold in the usual manner to initiate the fifth cycle of the punch unit. The hold coil of relay R22 will hold through the now closed R22D contacts, the normally closed R26C contacts, and the now closed cam contacts PC6. Relay R22 also closed the R22E contacts in series with the pick-up coil of relay R11. Relay R11 is thus energized and also holds through the closing of the R11A contacts in series with its hold coil and the R26C contacts and the cam contacts PC6. The picking up of relay R11 also closes the R11C contacts in series with the punch clutch magnet 452C so that in the fifth cycle the punch clutch as well as the punch cam clutch and the read clutch are operated. The minor group total collected in accumulator No. 1 will be read out in the usual fashion and through the R20A through R20C contacts which are now closed and the magnets 192 corresponding to the punches for the consolidation card field in which it is desired to record the third minor group total.

The major group total will be recorded if the proper plug connections have been made as earlier described through the R22A through R22C contacts now closed because relay R22 is energized. The other side of these contacts R22A through R22C are plug-connected to the magnets 192 corresponding to the consolidation card field in which it is desired to record the major group total. The fifth cycle of the punch unit will be terminated in the usual manner—the accounting machine being signalled of the end of the punch unit cycle by the closing of the cam contacts PC7 while the punch unit is prevented from continuing operation by the opening of the cam contacts PC6 to drop out the relays R23 and R22. The opening of the cam contacts PC6 also drops out the relay R11 to open the R11C contacts in circuit with the punch clutch magnet.

The apparatus would continue operation in the fashion described above. Assuming plenty of cards were maintained in the punch unit hopper, the accounting machine would eventually come to a stop when the last major group had been recorded on a consolidation card. At this time, then, there would be a blank card at the die, a blank card at the punch brushes, and probably additional cards in the punch unit hopper. If it is desired to clear the punch unit of the blank cards, the run-out key ROK would be depressed after the hopper had been emptied. It should be observed, however, that if there is no desire to clear the machine of blank cards, there is no need to depress the run-out key, as the last major group control break would have resulted in the ejection of the card last recorded on in the punch unit into the hopper.

*Consolidation of minor group totals of respective major groups on related cards*

In this operation (Figs. 20 and 21), minor group totals are punched on consolidation cards respectively bearing the pertinent major group identification numbers. It is necessary therefore, before punching each minor group, to compare the indication number of the relevant major group with the number borne by the consolidation card at the die. A minor control break initiates a comparing cycle, and this cycle is immediately followed by a punching cycle if the numbers were found to agree. If a discrepancy exists, the punch unit stops at the end of the comparing cycle and lights the red signal lamp. A major control break, which necessarily occurs with a minor control break, effects the ejection of the punched consolidation card and the feeding of another to the die during the ensuing punching cycle.

In order to enable the apparatus to carry out this operation, the punch unit plugboard outlet hubs for the respective orders of accumulator No. 3, which stores the major group indication number in the tabulating machine, are plugged to one side of the differential relays R12, R13, and R14. The other side of these differential relays are respectively plugged to the B contacts associated with the units, tens, and hundreds orders of storage relays. In addition, punch brushes PB are respectively and directly through hubs 734, 736, and 738 plugged to the storage relay pick-up coils STU0–STU9, STT0–STT9, and STH0–STH9 to permit the number on the card being advanced past the punch brushes to be entered into storage. During a comparing cycle the major group indication number is read out of accumulator No. 3 in the accounting machine while the consolidation card number is read out of the storage relays, and if they are the same, none of the differential relays R12, R13, and R14 are effective to close the associated contacts R12A, R13A, and R14A. On the other hand, if the compared numbers are different, then one or more of the differential relays will be effective to close momentarily one or more of the contacts R12A, R13A, and R14A. In this way a signal will be delivered to the punch unit indicating that a discrepancy exists, and, as a result, the punch unit will be brought to a halt.

The punch unit is set up for this type of operation by shifting the summary-punch group-indication compare switch SP–GI–CS from the "off" position to the "on" position. The reproducing group-indication compare switch R–GI–CS is left in the "off" position as well as the dial switch DS. The operations selecting switch OSS is left in the S position. The reset switch RS may be depressed to pulse the stepping switch reset coil SSRC to insure that the stepping switch is in the first position in which the relay R18 is energized and holds closed the contacts R18A through R18C so that the first minor group total read from the accounting machine will be entered into the first field of the consolidation card.

The punch unit would be conditioned for operation with the accounting machine in the usual manner. Depression of the start key STK as usual would pick up relay R7 and would initiate two card feed cycles in which the bottom or first consolidation card in the punch hopper would be fed to the die while the second card therein is disposed at the punch brushes. The first consolidation card, in passing the punch brushes during the second cycle, would have its number entered into storage. The circuits would extend from line 714, through the cam contacts C5, the cam contacts P3, the contacts R6B, the common brush for the contact roll 152, the contact roll 152, the respective punch brushes PB, plug wires, various ones of the pick-up coils of the storage relays in the units, tens, and hundreds orders, the units, tens, and hundreds orders read-in emitters PE1, PE2, and PE3, to line 716. The storage relays pulsed during this passage of the card past the punch brushes would hold through the corresponding hold coils. The circuit for these hold coils extends from line 714, through the now closed A contacts of the corresponding storage relays, and the cam contacts P2, to line 716. The relays energized would also close their corresponding units order contacts STU0B through STU9B, tens order contacts STT0B through STT9B, and hundreds order contacts STH0B through STH9B so that the stored number can be read out.

The operation of the accounting machine may be initiated after the completion of the second punch unit cycle. When the accounting machine has collected a minor group total in accumulator No. 1, as well as the number identifying the major group to which it pertains in accumulator No. 3, the minor control break will effect a transfer of contacts 684 to pulse the pick-up coil of the relay R23. Relay R23 will hold in the usual manner. The operation of the punch unit will be initiated due to the closure of the R23B contacts shunting the start key STK. Relay R7 will be energized and, in turn, will pick up relay R8. When the cam contact C3 makes, a circuit will be completed from line 716, through the cam contacts C3, the now closed contacts R8B, and switch arm SP–GI–CS1 in the "on" position, the now transferred contacts R10D, the non-transferred contacts R25A, the now closed contacts R23P, the normally closed contacts R26E, and relay R24, to line 714. The relay R24 will hold through the now closed R24A points and the cam contacts C6. It will be observed that relay R24 was picked up instead of relay R9, so that no circuits will be completed through any of the clutch magnets and that, instead, a comparing cycle is initiated.

The relay R24 effects the comparing cycle by closing the contacts R24B in circuit with the read-out emitter CE. The complete circuit will extend from line 714, through the cam contacts C5, the contacts R24B, the distributor brush of the read-out emitter CE, the respective segments of the read-out emitter, the respective closed B contacts of the storage relays, plug wires, coils of the differential relays R12, R13, and R14, to line 716. At the same time, parallel circuits will extend through the read-outs of accumulator No. 3. The complete circuits also extend from line 714, through the contacts C5, the contacts R24B, the read-out emitter CE, the now closed R23D through R23M contacts, the read-outs of accumulator No. 3, plug wires, and the other coils of the differential relays R12, R13, and R14, to line 716. If the consolidation card number in storage and the number of the major group to which the minor group pertains are the same, and it is so assumed, none of the differential relays will be operated, and the machine will pass into a punching cycle in which the first minor group total is recorded on the first field of the consolidation card.

This cycle will be the fourth cycle of the punch unit, as the comparing cycle may be deemed the third cycle. This fourth or punching cycle will be initiated since the relay R8 will be picked up again in the comparing cycle when the cam contacts C1 make because the R23B contacts are still closed and maintain the relay R7 energized. The relay R9 is picked up at the end of the comparing cycle because of the closed condition of the R24C contacts. The closed R24C contacts enable the relay R25 to be picked up through the R26B contacts near the end of the third cycle when the cam contacts C7 momentarily close. Relay R25 holds through the closure of the R25B contacts in series with the closed cam contacts C2. The energization of relay R25 also transfers the contacts R25A, thereby transferring the circuit through contacts C3 from relay R24 to relay R9. The complete circuit for relay R9 is as follows: from line 716, through the cam contacts C3, the now closed relay contacts R8B, the switch arm SP–GI–CS1 in the "on" position, the now transferred contacts R10D, the now transferred contacts R25A, and relay R9, to line 714. Thus, the R9A contacts in the common portion of the circuits with the clutch magnets are closed, and since the R7D contacts also in that circuit are closed because the R23B contacts in the relay R7 circuit are closed, a punching cycle may occur. The punch cam clutch magnet 464 will be energized through the now closed R23C contacts. The read clutch magnet will also be energized through the R15A contacts, but this is superfluous and in no way affects the operation of the punch unit. The punch clutch magnet will not be pulsed at this time because the R10A contacts, the R10C contacts, and the R16C contacts are open.

The punching circuits during this fourth cycle will extend through the R18A through R18C contacts. Thus the first minor group total collected in accumulator No. 1 will be read out and recorded in the first field of the consolidation card through the read-out emitter PCE. The end of the fourth cycle will be signalled to the accounting machine by the closing of the cam contacts PC7, and the opening of the cam contacts PC6 will stop the operation of the punch unit in the usual manner. The stepping switch will have advanced to the second position in which the relay R18 is dropped and the relay R19 is energized to open the contacts R18A through R18C and close the contacts R19A through R19C so that the punching circuits in the next punching cycle will extend through the latter.

The accounting machine will now go through the operation of accumulating a second minor group total and will indicate the minor group control break in the usual manner by picking up the relay R23. If the next or third minor group belongs to the same major group, there will be no major control break at this time, with the result that relay R22 will not be picked up. Thus, the machine will go through the comparing and punching cycles, that is, the fifth and sixth cycles, as it went through the third and fourth cycles.

When the sixth cycle has been completed, the accounting machine will collect the next minor group total. When the minor control break occurs, relay R23 will be picked up. Simultaneously with this control change, the accounting machine may also detect that a major group control break is taking place, with the result that relay R22 also is picked up. Both relays R23 and R22 hold in the usual fashion.

A comparing or seventh cycle will be initiated because of the closure of the R23P contacts resulting in the picking up of relay R24. At the end of the comparing cycle, the punching cycle, which in this case is the eighth cycle, will be initiated by the picking up of relay R9 in the manner heretofore described. Thus, circuits to the clutch magnets will be completed when the R7D and R9A contacts are closed.

The picking up of the relay R22 will also cause the punch clutch magnet 452c to be energized at this time. Relay R22 closes the R22E contacts in circuit with the pickup coil of the relay R11. Relay R11 also held during the comparing cycle through the closure of the R11A contacts in series with the R26C contacts and the cam contacts PC6. The energization of relay R11 closes the R11C contacts so that when the relay contacts R9A closed, a circuit was completed to the punch clutch magnet 452c as well as to the punch cam clutch magnet 464c and the read clutch magnet 480c. Thus, in the eighth cycle, after the third minor group total has been recorded in the consolidation card, and the major group total has also been entered therein due to the closure of the R22A through R22C contacts in the circuit with the accumulator No. 2, the first consolidation card will be ejected into the stacker, while the second consolidation card is moved past the punch brushes to the die and the third card is fed from the bottom of the hopper to the punch brushes. The operation of the punch clutch also resulted in the opening of the P2 cam contacts, with the result that the number held in the storage relays was erased early in the eighth cycle. The P2 cam contacts almost immediately close, however, so that the group identification number on the second consolidation card could be read into the storage relays as it passed the punch brushes. The punching circuits during this eighth cycle extended through the R20A through R20C contacts because the stepping switch had advanced to the third position in which the relay R20 was energized when the cam contacts PC1 made near the end of the sixth cycle. The punch unit will signal the acounting machine of the termination of the eighth cycle and will latch up at the end of that cycle in the usual manner.

Continued operation of this type will occur until either the accounting machine operations are completed provided two extra cards were placed on top of the pile of consolidation cards in the punch hopper or a disagreement is detected between the number of the major group being processed by the accounting machine and the number on the consolidation card fed to the die. The disagreement would have been detected in the cycle in which a new consolidation card was fed to the die. When such a comparing cycle occurs, one or more of the differential relays R12, R13, and R14 will be momentarily rendered effective to close one or more of the relay contacts R12A, R13A, and R14A. The closure of one or more of these points would result in the pulsing of the relay R26 through the switch arm SP–GI–CS2 now in the "on" position. Relay R26 would hold through the discrepancy switch DCS and the now closed R26A contacts. Picking up of the relay R26 will also close the R26F contacts in series with the red signal lamp to indicate to the operator of the apparatus the reason for a stoppage. The stoppage is effected at the end of a comparing cycle in which the disagreement is detected through the opening of the R26C contacts in series with the relay R23. The dropping of relay R23 will open the R23B contacts to drop relay R7. Contacts R7D and R7A will open to stop the punch unit. Because the red signal lamp is on, the operator will know that there is a disparity between the arrangement of the cards in the punch unit and the order of the major groups in the tabulating machine. After correcting the fault, operations are again initiated in the usual way after depressing the switch DCS which breaks the hold circuit through the relay R26 and turns out the red signal lamp.

When the summary punching operation has been completed, only the two extra cards will remain in the machine. This is because a major control break necessarily exists when the last minor group total has been accumulated. If desired, the extra cards may be run out of the machine by depressing the run-out key ROK for two cycles.

While there have been shown and described and pointed out the fundamental novel features of the invention as applied to preferred embodiments, it will be understood that various omissions and substitutions and changes in the form and details of the devices illustrated and in their operation may be made by those skilled in the art, without departing from the spirit of the invention. It is the intention, therefore, to be limited only as indicated by the scope of the following claims.

What is claimed is:

1. In a mechanism for recording data on portions of record media as manifestations in columns of index point positions, a plurality of selectively conditionable means for successively creating manifestations at different index point positions in corresponding columns of portions of record media moved relative to them, means for effecting repeated relative movement in the record media columnar direction between said means and successive record media portions to enable successive recordings on each portion, and means for conditioning different ones of said plurality of means for successive relative movements between said plurality of means and said record media portions.

2. In a mechanism for successively recording data on different fields of portions of record media as manifestations in columns of index point positions, a plurality of selectively conditionable means for successively creating in successive fields manifestations at different index point positions in corresponding columns on record media portions moved relative to them, means for effecting repeated relative movement in the record media columnar direction between said means and successive portions to enable the successive recording of data in successive fields of each portion, and means for conditioning different ones of said plurality of means for successive relative movements between said plurality of means and said record media portions.

3. In a mechanism for successively recording data on different fields of portions of record media as manifestations in columns of index point positions, a plurality of selectively conditionable means for successively creating in successive fields manifestations at different index point positions in corresponding columns on record media portions moved past them, means for repeatedly moving in the columnar direction portions past said means to enable recording of data in successive fields thereon, means for conditioning different ones of said plurality of means for successive movements of said portions past said means, and means for feeding successive record media portions and ejecting preceding portions from the moving means.

4. In a mechanism for recording data on cards as manifestations in columns of index point positions, selectively actuable individual means for successively creating manifestations at different index point positions in corresponding columns of cards moved past them, means for moving cards from an initial position so as to present successively the different index point positions of each column to the corresponding individual means and thereafter to restore the cards to the initial position, and selectively actuable means for intercepting moved cards before they are restored while feeding succeeding ones to said moving means.

5. In a mechanism for successively recording data on different fields of cards as manifestations in columns of index point positions, selectively actuable individual means for successively creating manifestations at different index point positions in corresponding columns of cards moved past them, means for moving the cards from an initial position so as to present successively the different index point positions of each column to the individual means and thereafter to restore the cards to the initial position, means operable to condition successive ones or groups of said individual means for actuation during succeeding movement of each card, and selectively actuable means for intercepting moved cards before they are restored while feeding succeeding ones to said moving means.

6. In a card advancing mechanism, selectively operable means including a pair of cooperating feed rolls for feeding cards successively to a position, means for separating feed rolls after a card has been advanced to said position to permit the free withdrawal from and reinsertion therebetween of said card, means for grasping the card and advancing it step by step from said position and thereafter restoring the card to said position, and means operable during operation of the card feeding means to seize the grasped card at the end of the step by step movement and eject it.

7. In a card advancing mechanism, selectively actuable means for successively advancing cards to a position, a member movable in a fixed path, means for moving said member from a normal position adjacent the fed card position step by step and thereafter restoring said member to the normal position, a toggled card latching lever associated with said member and biased to open and closed positions, means operable after operation of the selectively actuable means to adjust said lever to the closed position in which it latches the card to said member, means operable during operation of the selectively actuable means to adjust the latching lever to the open position in which the card is released, and means movable concurrently with the operation of said last mentioned means to shift the card out of the return path of said member and eject it.

8. In an apparatus for consolidating successively presented data respectively designated by coded combinations of time-spaced manifestations by recording them in succession on different fields of cards as coded combinations of manifestations at various index point positions in columns thereof, means for successively presenting the data, means for reciprocating the cards in a fixed path and in the columnar direction from and to an initial position, and means adjacent said card path for recording such data as presented on successive fields of successive cards on successive reciprocations.

9. In an apparatus for consolidating successively presented data respectively designated by coded combinations of time-spaced manifestations by recording them in succession on different fields of cards as coded combinations of manifestations at various index point positions in columns thereof, means for successively presenting the data, means for reciprocating the cards in a fixed path and in the columnar direction from and to an initial position, and means adjacent said card path for recording successive numbers of such data on each of successive cards on successive reciprocations.

10. In an apparatus for consolidating successively presented data respectively designated by coded combinations of time-spaced manifestations by recording them in succession on different fields of cards as coded combinations of manifestations at various index point positions in columns thereof, means for successively presenting the data, means for reciprocating the cards in a fixed path and in the columnar direction from and to an initial position, and means adjacent said card path for successively recording predetermined numbers of such data on each of successive cards on successive reciprocations.

11. In an apparatus for consolidating by numbered groups on successive cards successively presented and group identified data respectively designated by coded combinations of time-spaced manifestations by recording them in different card fields as coded combinations of manifestations at various index point positions in columns thereof, first means for successively presenting data and indicating when the next one belongs to a group different from that of the immediately presented one, means for reciprocating the cards in a fixed path and in the columnar direction from and to an initial position, and other means adjacent said card path controlled by the first means for recording successive ones of such data on the same card on successive reciprocations until the next one belongs to a different group.

12. In an apparatus for consolidating by numbered groups on successive cards successively presented and group identified data respectively designated by coded combinations of time-spaced manifestations by recording them in different card fields as coded combinations of manifestations at various index point positions in columns thereof, first means for successively presenting data and indicating when the next one belongs to a group different from that of the immediately presented one, means for reciprocating the cards in a fixed path and in the columnar direction from and to an initial position, and other means adjacent said card path controlled by the first means for successively recording on successive cards on successive reciprocations the data of the respective groups.

13. In an apparatus for successively recording data on cards respectively bearing data group identification numbers, first means for successively presenting data and indicating the respective groups to which they belong, second means for sensing and indicating the group identification numbers on cards, third means for comparing the data group number indicated by the first means with the card number indicated by the second means, fourth means for comparing the group numbers of successive data, and other means responsive to the third and fourth means and controlled by the first means for successively recording on the cards data belonging to corresponding groups.

14. In an apparatus for consolidating on cards successively presented and group identified data respectively designated by coded combinations of time-spaced manifestations by recording them in different card fields as coded combinations of manifestations at various index point positions in columns thereof, means for successively presenting data, means for indicating the numbers of the groups to which they belong, means for comparing the group numbers of successive data, means for reciprocating the cards in a fixed path and in the columnar direction from and to an initial position, first means adjacent said card path and responsive to said comparing means for recording the presented data on successive reciprocations in successive fields of a card when numbers are equal, and second means responsive to said comparing means for causing said first means to record on the next card when numbers are different.

15. In an apparatus for consolidating on cards successively presented and group identified data respectively designated by coded combinations of time-spaced manifestations by recording them in different card fields as coded combinations of manifestations at various index point positions in columns thereof, selectively actuable means for recording successive data in successive fields of cards thereat and including means for reciprocating the cards in the columnar direction so as to present successive index point positions during the recording of the respective data, selectively actuable means for feeding successive cards to and ejecting preceding cards from said recording means, means for successively presenting data to said recording means, means for indicating the numbers of the groups to which they belong, means for comparing the group numbers of sucessive data, first means responsive to said comparing means for actuating said recording means to record the data in a field of a card when the numbers are equal, and second means responsive to said comparing means for actuating the feeding means to feed the next card when the numbers are different.

16. In an apparatus for successively recording data on cards respectively bearing data group identification numbers, means for successively presenting data, means for indicating the numbers of the groups to which they belong, means for sensing and indicating the group identification numbers on the cards, means for comparing the group numbers of successive data, first means responsive to said comparing means for recording the presented data in successive fields of the corresponding card when the numbers are equal, second means responsive to said comparing means for causing said first means to record on the next card when the numbers are different, means for comparing the number on the new card with the new data group number, and means responsive to said last mentioned comparing means for stopping the apparatus when the numbers are different.

17. In an apparatus for successively recording data on cards respectively bearing data group identification numbers, selectively actuable means for recording successive data in successive fields of cards thereat, selectively actuable means for feeding successive cards to and ejecting preceding cards from said recording means, means for successively presenting data to said recording means, means for indicating the numbers of the groups to which they belong, means for sensing and indicating the group identification numbers on the cards, means for comparing the group numbers of successive data, first means responsive to said comparing means for actuating said recording means to record the data in a field of the corresponding card when the numbers are equal, second means responsive to said comparing means for actuating the feeding means to feed the next card when the numbers are different, means for comparing the number on the new card with the data group number, and means responsive to said last mentioned comparing means for stopping the apparatus when the numbers are different.

18. In a cyclically operated mechanism for successively transcribing data recorded as manifestations at different columnar index point positions from successive record cards onto each point successive consolidation cards as manifestations at different columnar index of positions in successive fields thereof, first means for successively creating manifestations at the different columnar index point positions on consolidation cards, second means for moving the same consolidation card in the columnar direction past said first means in successive cycles, and means for sensing record cards during operation of the second means so as to enable the first means to record successively data on the consolidation card being moved past it.

19. In a cyclically operated mechanism for successively transcribing data recorded as manifestations at different columnar index point positions from successive record cards onto each point successive consolidation cards as manifestations at different columnar index of positions in successive fields thereof, first means for successively creating manifestations at the different columnar index point positions on consolidation cards, second means for moving the same consolidation card in the columnar direction past the first means in successive cycles, third means selectively actuable to feed cards to and preceding cards from said second means, means for sensing record cards during operation of the second means so as to enable the first means to record successively data on the consolidation card being moved past it, and settable means for operating the third means after each predetermined number of operations of the second means.

20. In a cyclically operated mechanism for transcribing data recorded as manifestations at different columnar index point positions from successive record cards also bearing numbers identifying the group to which the data pertains onto each of successive consolidation cards as manifestations at different columnar index point positions, first means for successively creating manifestations at the different columnar index point positions on consolidation cards, second means for moving the same consolidation card past the first means in the columnar direction to enable the successive creation of manifestations at different index point positions in successive cycles, third means selectively actuable to feed cards to and preceding cards from the second means, fourth means for sensing successive record cards during operation of the second means so as to enable the first means to record data on the consolidation card being moved past it and so as to indicate the group number of the data being transcribed, fifth means for sensing the succeeding record card concurrently with the sensing by the fourth means to indicate the group number of the data thereon, means for comparing the number sensed by the fourth means with the number sensed by the fifth means, and means responsive to said comparing means for operating the third means when the numbers are different.

21. In a cyclically operated mechanism for transcribing data recorded as manifestations at different columnar index point positions from successive record cards also bearing numbers identifying the group to which the data pertains onto each of successive consolidation cards as manifestations at different columnar index point positions, first means for successively creating manifestations at the different columnar index point positions on consolidation cards, second means for moving the same consolidation card past the first means in the columnar direction to enable the successive creation of manifestations at different index point positions in successive cycles, third means selectively actuable to feed cards to and preceding cards from the second means, fourth means for sensing successive record cards during operation of the second means so as to enable the first means to record data on the consolidation card being moved past it and so as to indicate the group number of the data being transcribed, fifth means for sensing the succeeding record card concurrently with the sensing by the fourth means to indicate the group number of the data thereon, means for comparing the number sensed by the fourth means with the number sensed by the fifth means, means responsive to said comparing means for operating the third means when the numbers are different, and additional means responsive to said comparing means for rendering the first means effective to record the group identifying number on the new consolidation card fed to the second means by the third means.

22. In a cyclically operated mechanism for transcribing data recorded as manifestations at different columnar index point positions from successive record cards also bearing numbers identifying the group to which the data pertains onto each of successive consolidation cards, first means for successively creating manifestations at the different columnar index point positions on consolidation cards, second means for moving the same consolidation card past the first means in successive cycles, third means selectively actuable to feed cards to and preceding cards from said second means, means for sensing record cards during operation of the second means so as to enable the first means to record data on the consolidation card being moved past it, settable means for operating the third means after each predetermined number of operations of the second means, and means operative during one operation of the second means after each operation of the third means for rendering the first means effective to record the group identifying number on the consolidation card.

23. In a cyclically operated mechanism for transcribing data recorded as manifestations at different columnar index point positions from successive record cards also bearing data group identification numbers onto each of successive consolidation cards respectively bearing corresponding data group identification numbers, first means for successively creating manifestations in successive fields of consolidation cards, second means for moving the same consolidation card past said first means in successive cycles, third means to feed cards to and preceding cards from said second means, fourth means for sensing successive record cards during operation of the second means so as to enable the first means to record data on the consolidation card being moved past it, fifth means for sensing the succeeding record card concurrently with the sensing by the fourth means to indicate the group number of the data thereon, sixth means for sensing and indicating as the fifth means senses a record card the number of the new consolidation card to be recorded upon, means for comparing the numbers indicated by the fifth and sixth means, and means responsive to said comparing means for stopping the apparatus if the numbers are different.

24. In a cyclically operated mechanism for transcribing data recorded as manifestations at different columnar index point positions from record cards also bearing data group identification numbers onto consolidation cards respectively bearing corresponding data group identification numbers, first means for successively creating manifestations in successive fields of consolidation cards, second means for moving the same consolidation card past the first means in successive cycles, third means selectively operable for feeding successive cards to and preceding cards from the second means, fourth means for sensing the number on the consolidation card as it is fed by the third means to the second means, fifth means for sensing successive record cards during the operation of the second means so as to enable the first means to record data on the consolidation card, sixth means for sensing the following record card concurrently with the sensing by the fourth and fifth means, means settable to the number of record cards in each group for operating the third means after each such number of operations of the second means, means for comparing the number indicated by the fourth means with the number indicated by the sixth means, and means responsive to said comparing means for stopping the apparatus whenever the identification numbers are different.

25. In a cyclically operated mechanism for transcribing data recorded as manifestations at different columnar index point positions from successive record cards also bearing data group identification numbers onto each of successive consolidation cards respectively bearing corresponding data group identification numbers, first means for successively creating manifestations in successive fields of consolidation cards, second means for moving the same consolidation card past said first means in successive cycles, third means selectively operable to feed cards to and preceding cards from said second means, fourth means for sensing successive record cards during operation of the second means so as to enable the first means to record data on the consolidation card being moved past it and so as to indicate the group number of the data being transcribed, fifth means for sensing the succeeding record card concurrently with the sensing by the fourth means to indicate the group number of the data thereon, sixth means for sensing and indicating as the fifth means senses a record card the number of the new consolidation card to be recorded upon, means settable to the number of record cards in each group for operating the third means after each such number of operations of the second means, means for comparing the numbers indicated by the fifth and sixth means, means responsive to said comparing means for stopping the apparatus if the numbers are different, means for comparing the numbers indicated by the fourth and fifth means, and means responsive to said last mentioned comparing means when the second means has been operated less than the number to which the third means operating means has been set for stopping the apparatus if the numbers are different.

26. In a cyclically operated mechanism for transcribing data recorded as manifestations at different columnar index point positions from successive record cards also bearing data group identification numbers onto each of successive consolidation cards respectively bearing corresponding data group identification numbers, first means for successively creating manifestations in successive fields of consolidation cards, second means for moving the same consolidation card past said first means in successive cycles, third means selectively operable to feed cards to and preceding cards from said second means, fourth means for sensing successive record cards during operation of the second means so as to enable the first means to record data on the consolidation card being moved past it and so as to indicate the group number of the data being transcribed, fifth means for sensing the succeeding record card concurrently with the sensing by the fourth means to indicate the group number of the data thereon, sixth means for sensing and indicating as the fifth means senses a record card the number of the new consolidation card to be recorded upon, means settable to the number of record cards in each group for operating the third means after each such number of operations of the second means, seventh means for comparing the numbers indicated by the fifth and sixth means, eighth means responsive to said comparing means for stopping the apparatus if the numbers are different, ninth means for storing and indicating the number sensed by the sixth means, tenth means for comparing the number stored by the ninth means with the subsequent numbers sensed by the fifth means, and means responsive to said tenth means when the second means has been operated less than the number to which the third means operating means has been set for stopping the apparatus if the numbers are different.

27. In a cyclically operated mechanism for transcribing data recorded as manifestations at different columnar index point positions from successive record cards also bearing data group identification numbers onto each of successive consolidation cards, first means for successively creating manifestations in successive fields of consolidation cards, second means for moving the same consolidation card past said first means in successive cycles, third means selectively operable to feed cards to and preceding cards from said second means, fourth means for sensing successive record cards during operation of the second means so as to enable the first means to record data on the consolidation card being moved past it and so as to indicate the group number of the data being transcribed, fifth means for sensing the succeeding record card concurrently with the sensing by the fourth means to indicate the group number of the data thereon, means settable to the number of record cards in each group for operating the third means after each such number of operations of the second means, means for comprising the numbers indicated by the fourth and fifth means, and means responsive to said comparing means when the second means has been operated less than the number of times to which the third means operating means has been set for stopping the apparatus if the numbers are different.

28. In a cyclically operated mechanism for successively recording data from successive cards in successive cycles onto each of successive consolidation cards as manifestations at different columnar index point positions in successive fields thereof, means for recording on successive fields of cards in successive cycles, means for moving the same consolidation card in the columnar direction past said recording means in each of successive cycles, selectively actuable means for feeding a new card to and the preceding card from said moving means in a cycle, means for sensing successive record cards in successive cycles and indicating the data to the recording means, and means for actuating the feeding means.

29. In a cyclically operated apparatus for consolidating on cards successively presented data respectively designated by coded combinations of time-spaced manifestations by recording them in different card fields as coded combinations of manifestations at various index point positions in columns thereof, means for reciprocating the cards in a fixed path and in the columnar direction from and to an initial position, selectively actuable means adjacent said card path for recording on successive fields of successive cards, a data receiving device, and means operable to actuate the recording means and read the data out of said device and indicate it to said recording means.

30. In a cyclically operated apparatus for successively recording as manifestations at different columnar index point positions on consolidation cards data successively obtained, first means selectively actuable for successively creating manifestations in successive fields of consolidation cards, second means for moving the same consolidation card in the columnar direction repeatedly past said first means, means for feeding cards to and preceding cards from said second means, a data receiving device, and means operative upon entry of the data into said receiving device to actuate the first means and read the data out of said device and indicate it to said first means.

31. In a cyclically operated apparatus for recording as manifestations at different columnar index point positions on consolidation cards data successively obtained, first means selectively actuable for successively creating manifestations in successive fields of consolidation cards, second means for moving the same consolidation card repeatedly past said first means, selectively actuable third means for feeding cards to and preceding cards from said second means, a data receiving device, means operative upon entry of the data into said receiving device to actuate the first means and read the data out of said device and indicate it to said first means, and settable means for operating the third means after each predetermined number of operations of the second means.

32. In a cyclically operated apparatus for recording as manifestations at different columnar index point positions on consolidation cards data successively obtained, first means selectively actuable for successively creating manifestations in successive fields of consolidation cards, second means for moving the same consolidation card repeatedly past said first means, selectively actuable third means for feeding cards to and preceding cards from said second means, a data receiving device, means operative upon entry of the data into said receiving device to actuate the first means and read out data from said device and indicate it to said first means, settable means for actuating the third means after each predetermined number of operations of the second means, a device for accumulating the entries into said data receiving device, and means actuated by the settable means after each predetermined number of operations of the second means for causing the total to be read out of the accumulating device and indicated to the first means.

33. In a cyclically operated apparatus for recording as manifestations at different columnar index point positions on consolidation cards data successively obtained, first means selectively actuable for successively creasing manifestations in successive fields of consolidation cards, second means for moving the same consolidation card repeatedly past said first means, selectively actuable third means for feeding cards to and preceding cards from said second means, a data receiving device, means operative upon entry of the data into said receiving device to actuate the first means and read out the data from said device and indicate it to said first means, settable means for operating the third means after each predetermined number of operations of the second means, another receiving device for entry of the number identifying the group to which the data entered in the data receiving device pertains, and means actuated by said settable means after every predetermined number of operations of the second means to read out of the another receiving device the group identification number and indicate it to the first means.

34. In a cyclically operated apparatus for recording as manifestations at different columnar index point positions on consolidation cards data successively obtained, first means selectively actuable for successively creasing manifestations in successive fields of consolidation cards, second means for moving the same consolidation card repeatedly past said first means, selectively actuable third means for feeding cards to and preceding cards from said second means, a data receiving device, means operative upon entry of the data into said receiving device to actuate the first means and read out the data from said device and indicate it to said first means, settable means for operating the third means after each predetermined number of operations of the second means, another receiving device for entry of the number identifying the group to which the data entered in the data receiving device pertains, means actuated by said settable means after every predetermined number of operations of the second means to read out of the another receiving device the group identification number and indicate it to the first means, a device for accumulating the entries into said data receiving device, and means actuated by the settable means after every predetermined number of operations of the second means for causing the total to be read out of the accumulating device and indicated to the first means.

35. In a cyclically operated apparatus for recording as manifestations at different columnar index point positions on successive consolidation cards groups of data successively obtained, first means selectively actuable for successively creating manifestations in successive fields of consolidation cards, second means for moving the same consolidation card repeatedly past said first means, selectively actuable third means for feeding cards to and preceding cards from said second means, a data receiving device, means actuated upon entry of the data into said receiving device to actuate the first means and read the data out of said device and indicate it to said first means, and means for actuating the third means whenever the next data to be entered in the receiving device belongs to a different group.

36. In a cyclically operated apparatus for recording as manifestations at different columnar index point positions on successive consolidation cards groups of data successively obtained, first means selectively actuable for successively creating manifestations in successive fields of consolidation cards, second means for moving the same consolidation card repeatedly past said first means, selectively actuable third means for feeding cards to and preceding cards from said second means, a data receiving device, fourth means operative upon entry of the data into said receiving device to actuate the first means and read out the data from said device and indicate it to said first means, a device for accumulating the entries into said data receiving device, and means for rendering the fourth means effective to also read out the total entered in the accumulating device and indicate it to the first means and for actuating the third means whenever the next data to be entered in the receiving device belongs to a different group.

37. In a cyclically operated apparatus for recording as manifestations at different columnar index point positions on consolidation cards respectively bearing data group identification numbers data successively obtained, first means for successively creating manifestations in successive fields of consolidation cards, selectively actuable second means for moving the same consolidation card past the first means each time it is actuated, third means for feeding cards to and preceding cards from said second means, a data receiving and indicating device, fourth means operative upon entry of the data into said receiving device to actuate the first and second means to record the data indicated by said device, fifth means for sensing and indicating the group number on the card moved by the third means to the second means, sixth means for storing and indicating the number indicated by the fifth means, a device for receiving and indicating the number of the group to which the data collected in the data receiving and indicating device pertains, means for comparing the number indicated by the sixth means with the number indicated by the second mentioned device, and means responsive to said comparing means for stopping the machine if a difference exists in the numbers.

38. In a cyclically operated apparatus for recording as manifestations at different columnar index point positions on consolidation cards respectively bearing data group indentification numbers data successively obtained, means for successively creating manifestations in successive fields of consolidation cards, selectively actuable second means for moving the same consolidation card past the first means each time it is actuated, selectively actuable third means for feeding cards to and preceding cards from said second means, a data receiving and indicating device, fourth means operative upon entry of the data into said receiving device to actuate the first and second means to record the indicated data, fifth means for sensing and indicating the group number on the card moved by the third means to the second means, sixth means for storing and indicating the number indicated by the fifth means, a device for receiving and indicating the number of the group to which the data collected in the data receiving and indicating device pertains, means for comparing the number indicated by the sixth means with the number indicated by the second mentioned device, means responsive to said comparing means for stopping the machine if a difference exists in the numbers, means for indicating that the group identifying number of the data next to be received in the data receiving device belongs to a different group from that presently therein, and means responsive to such indication by the last mentioned means for actuating the third means.

39. In a cyclically operated apparatus for recording as manifestations at different columnar positions on consolidation cards respectively bearing data group identification numbers data successively obtained, means for successively creating manifestations in successive fields of consolidation cards, selectively actuable means for moving the same consolidation card past the first means each time it is actuated, selectively actuable third means for feeding cards to and preceding cards from said second means, a data receiving and indicating device, fourth means operative upon entry of the data into said receiving device to actuate the first and second means to record the indicated data, fifth means for sensing and indicating the group number on the card moved by the third means to the second means, sixth means for storing and indicating the number indicated by the fifth means, a device for receiving and indicating the number of the group to which the data collected in the data receiving device pertains, seventh means for comparing the number indicated by the sixth means with the number indicated by the second mentioned device, means responsive to said seventh means for stopping the machine if a difference exists in the number, a device for accumulating and indicating the entries made into the data receiving device, eighth means for indicating that the group identifying number of the data next to be received in the data receiving device belongs to a different group from that presently therein, means responsive to such indication by the eighth means for rendering the first means effective to record also the total indicated by the accumulating device and for actuating the third means.

40. In a cyclically operated machine for recording successively obtained data as manifestations at different columnar index point positions in successive fields on consolidation cards, selectively actuable first means for successively creating manifestations in successive column fields in successive cycles, selectively actuable second means for moving the same consolidation card in the columnar direction past the first means in each of successive cycles, selectively actuable third means for feeding a card to and the preceding card from the second means at the end of the cycle in which it is operated, fourth means for collecting and indicating data, means operative upon the collection of the data in the fourth means actuating the first and second means to record the indicated data, and means for actuating the third means.

41. In an apparatus for consolidating by recording as manifestations at different columnar index point positions in successive fields on consolidation cards data sucessively obtained, means for reciprocating the cards in a fixed path and in the columnar direction from and to an initial position, first means adjacent said card path for successively creating manifestations on successive reciprocations in successive fields on consolidation cards, second means for sensing record cards successively and indicating concurrently the data thereon to said first means for recordation, and third means for collecting data successively and indicating them concurrently to said first means for recordation.

42. In a recording mechanism for successively recording as manifestations at different columnar index point positions in successive fields on consolidation cards data successively obtained, first means for successively creating manifestations at the different columnar index point positions in successive fields on consolidation cards, other means for repeatedly moving the same consolidation card in the columnar direction past said first means, second means for sensing record cards successively and indicating concurrently the data thereon to the first means, third means for collecting data successively and indicating them concurrently to said first means, and means adjustable between conditions in which it renders the first means respectively responsive to the second means and to the third means.

43. In a cyclically operated mechanism for recording as manifestations at different columnar index point positions in successive fields on consolidation cards data successively presented, first means for successively creating manifestations in successive fields of successive consolidation cards, second means for moving the same consolidation card repeatedly past said first means, third means settable to the number of times that each consolidation card will be moved past the first means before it is ejected and replaced by a new one, fourth means for sensing record cards successively and indicating such data to said first means, fifth means for collecting data successively and indicating them to said first means, and means adjustable between conditions in which it renders the first means responsive respectively to the fourth means and to the fifth means.

44. In a cyclically operated mechanism for recording data as they are received in successive fields of consolidation cards, first means for successively creating manifestations at different columnar index point positions in successive fields of successive consolidation cards, second means for moving the same consolidation card repeatedly past said first means, selectively actuable third means for feeding cards to and preceding cards from the second means, fourth means for sensing records cards moved past it and indicating the data thereon, fifth means for moving record cards successively past said fourth means concurrently with the movement of consolidation cards past the first means by the second, sixth means for collecting data successively, seventh means for reading the data out of said collecting means and indicating it concurrently with the movement of consolidation cards past the first means, and means adjustable between conditions in which it renders the first means responsive respectively to the fourth means and to the seventh means.

45. In a cyclically operated mechanism for recording data as they are received in successive fields of consolidation cards, first means for successively creating manifestations at different columnar index point positions in successive fields of successive consolidation cards, second means for moving the same consolidation card repeatedly past said first means, selectively actuable third means for feeding cards to and preceding cards from the second means, fourth means for sensing record cards moved past it and indicating the data thereon, fifth means for moving record cards past said sensing means concurrently with the movement of consolidation cards past the first means by the second means, sixth means for collecting data successively, seventh means for reading the data out of said collecting means and indicating it concurrently with the movement of consolidation cards past the first means, eighth means settable to actuate the third means after each predetermined number of operations of the second means, and means adjustable between conditions in which it renders the first means responsive respectively to the fourth means and to the seventh means.

46. In a cyclically operated mechanism for successively recording data by number identified groups on successive consolidation cards, first means for successively creating manifestations representative of indicated data at different columnar index point positions in successive fields of successive consolidation cards, second means for repeatedly moving the same consolidation card past said first means, third means for sensing the data and the group identifying number on successive record cards and indicating the same, fourth means for sensing the group identifying number on the following record card concurrently with the sensing by the third means and for indicating the number, fifth means for moving successive record cards past the third and fourth means concurrently with the movement of a consolidation card past the first means, sixth means to compare the number indicated by the third means with the number indicated by the fourth means, seventh means for collecting data successively, eighth means to compare the number of the data in the seventh means with the number of the data next to be received therein, ninth means for reading the data out of said collecting means and indicating the same concurrently with the movement of a consolidation card past the first means, tenth means for feeding a new card to and the preceding card from the second means whenever the next data to be recorded belongs to a different group, and means adjustable between conditions in which it renders the first and tenth means responsive respectively to the third and sixth means and to the eighth and ninth means.

47. In a cyclically operated mechanism for successively recording data by number identified groups on successive consolidation cards respectively bearing corresponding group identifying numbers, first means for successively creating manifestations representative of indicated data at different columnar index point positions in successive fields of consolidation cards, selectively actuable second means for repeatedly moving the same consolidation card past said first means, selectively actuable third means for feeding cards to and preceding cards from said second means, fourth means for sensing and indicating the number on the consolidation card as it is moved by the third means to the second means, fifth means for sensing and indicating the data and number on a record card moved therepast, sixth means for sensing and indicating the group identifying number on the following record card concurrently with the sensing by the fifth means, seventh means for moving successive record cards past said fifth and sixth means and actuating the second means to move concurrently the consolidation card past the first means, eighth means for comparing the numbers indicated by the fifth and sixth means and for actuating the third means if a difference exists, ninth means for comparing the number indicated by the fourth and sixth means and stopping the apparatus if a difference exists, tenth means for accumulating and indicating data successively, eleventh means for receiving and indicating the group identifying number of the data collected in the tenth means, twelfth means for comparing the number indicated by the fourth means with the number indicated by the eleventh means and stopping the apparatus if a difference exists, thirteenth means for actuating the second means each time data has been accumulated in the tenth means, fourteenth means for actuating the third means each time the number next to be received in the eleventh means is different, and means adjustable between conditions in which it renders the first, second, and third means responsive respectively to the fifth, sixth, seventh, and eighth means and to the tenth, eleventh, twelfth, thirteenth, and fourteenth means.

48. In a mechanism for repeatedly moving a card past a row of punches, a member having a normal position adjacent said punches, means for moving said member in a fixed path away from and back to said normal position, a toggle lever carried by said member and biased to a position latching a card to said member and to an open position, means operated by the member moving means for first shifting the toggle lever to closed position, means operative to engage the toggle lever as the member is moved along its path and shift it to open position, means operable to seize the unlatched card and withdraw it from the path of said member, and selectively actuable means for operating simultaneously said unlatching means and said seizing means.

49. In a mechanism for repeatdely moving a card past a row of punches, a pivoted member having a normal position in which its free end is adjacent said punches, means for swinging said member away from and back to said normal position, pivoted means for guiding the card as it is moved by said member, a toggle lever carried by said member and biased to a position latching a card to said member and to an open position, means operated by the member swinging means for first shifting the toggle lever to closed position, means operative to engage the toggle lever as the member is moved along its path and shift it to open position, a rotatable feed roll movable against said card backed up by the pivoted guide means to displace it from the return path of said member and advance it, and selectively actuable means for simultaneously operating said unlatching means and moving and rotating said feed roll.

References Cited in the file of this patent

UNITED STATES PATENTS

| | | |
|---|---|---|
| 1,519,054 | Reynolds | Dec. 9, 1924 |
| 1,600,413 | Lake | Sept. 21, 1926 |
| 1,803,977 | Richter | May 5, 1931 |
| 1,867,025 | Peirce | July 12, 1932 |
| 2,543,935 | Rabenda et al. | Mar. 6, 1951 |
| 2,566,931 | Cunningham et al. | Sept. 4, 1951 |
| 2,647,581 | Gardinor et al. | Aug. 4, 1953 |

UNITED STATES PATENT OFFICE
CERTIFICATE OF CORRECTION

Patent No. 2,846,008                                            August 5, 1958

Arthur H. Dickinson

It is hereby certified that error appears in the printed specification of the above numbered patent requiring correction and that the said Letters Patent should read as corrected below.

Column 57, line 75, for "point" read -- of --; column 58, line 1, for "of" read -- point --; line 14, for "point" read -- of --; line 15, for "of" read -- point --; column 61, line 12, for "comprising" read "comparing --; column 62, lines 18 and 38, each occurrence, for "creasing" read -- creating --; column 66, line 61, for "repeatdely" read -- repeatedly --.

Signed and sealed this 2nd day of June 1959.

(SEAL)

Attest:

KARL H. AXLINE
Attesting Officer

ROBERT C. WATSON
Commissioner of Patents